United States Patent
Reynolds et al.

(10) Patent No.: US 9,800,059 B2
(45) Date of Patent: Oct. 24, 2017

(54) SUBSCRIPTION BASED MISO AND MIMO WIRELESS ENERGY TRANSFER

(71) Applicant: DUKE UNIVERSITY, Durham, NC (US)

(72) Inventors: Matthew Reynolds, Durham, NC (US); Daniel Arnitz, Durham, NC (US)

(73) Assignee: Duke University, Durham, NC (US)

( * ) Notice: Subject to any disclaimer, the term of this patent is extended or adjusted under 35 U.S.C. 154(b) by 293 days.

(21) Appl. No.: 14/429,477

(22) PCT Filed: Sep. 19, 2013

(86) PCT No.: PCT/US2013/060556
§ 371 (c)(1),
(2) Date: Mar. 19, 2015

(87) PCT Pub. No.: WO2014/047253
PCT Pub. Date: Mar. 27, 2014

(65) Prior Publication Data
US 2015/0229133 A1    Aug. 13, 2015

Related U.S. Application Data

(60) Provisional application No. 61/702,873, filed on Sep. 19, 2012.

(51) Int. Cl.
*H02J 1/10* (2006.01)
*H02J 5/00* (2016.01)
(Continued)

(52) U.S. Cl.
CPC .............. *H02J 5/005* (2013.01); *H02J 11/00* (2013.01); *H04B 7/0413* (2013.01);
(Continued)

(58) Field of Classification Search
CPC .. H02J 7/025; H02J 5/005; H02J 50/12; H02J 50/80
See application file for complete search history.

(56) References Cited

U.S. PATENT DOCUMENTS

| | | |
|---|---|---|
| 7,400,710 B2 | 7/2008 | Langberg et al. |
| 8,330,580 B2 | 12/2012 | Reynolds et al. |

(Continued)

OTHER PUBLICATIONS

International Search Report and Written Opinion for PCT/US2013/060556, dated Nov. 4, 2013.

*Primary Examiner* — Sibin Chen
(74) *Attorney, Agent, or Firm* — Talem IP Law, LLP

(57) ABSTRACT

Subscription based multiple-input-single-output and multiple-input-multiple-output wireless energy transfer enables selective charging and powering of mobile devices using a plurality of spatially distributed transmitters that are synchronized under the control of a transmitter controller. Amplitude, phase, and frequency of each transmitter is controlled to promote or deny the transfer of energy to particular mobile devices or positions through optimization techniques based on the incident power level at each mobile device subscribing to the system. Measurements related to the incident power level may be directly provided by the mobile device or the incident power is remotely determined through analysis of backscatter gains.

28 Claims, 38 Drawing Sheets

(51) Int. Cl.
*H04W 52/24* (2009.01)
*H04B 7/0413* (2017.01)
*H02J 11/00* (2006.01)
*H04B 17/318* (2015.01)
*H04W 52/28* (2009.01)
*H04W 52/22* (2009.01)

(52) U.S. Cl.
CPC .......... *H04B 17/318* (2015.01); *H04W 52/24* (2013.01); *H04W 52/245* (2013.01); *H04W 52/281* (2013.01); *H04W 52/225* (2013.01); *H04W 52/246* (2013.01); *Y10T 307/352* (2015.04)

(56) References Cited

U.S. PATENT DOCUMENTS

| | | | |
|---|---|---|---|
| 8,392,107 | B2 | 3/2013 | Patel et al. |
| 2009/0147872 | A1 | 6/2009 | Chong et al. |
| 2011/0026575 | A1 | 2/2011 | Shalom et al. |
| 2012/0062345 | A1* | 3/2012 | Kurs .................. H03H 7/40 333/235 |
| 2014/0035380 | A1* | 2/2014 | Stevens ................ H02J 5/005 307/104 |

* cited by examiner

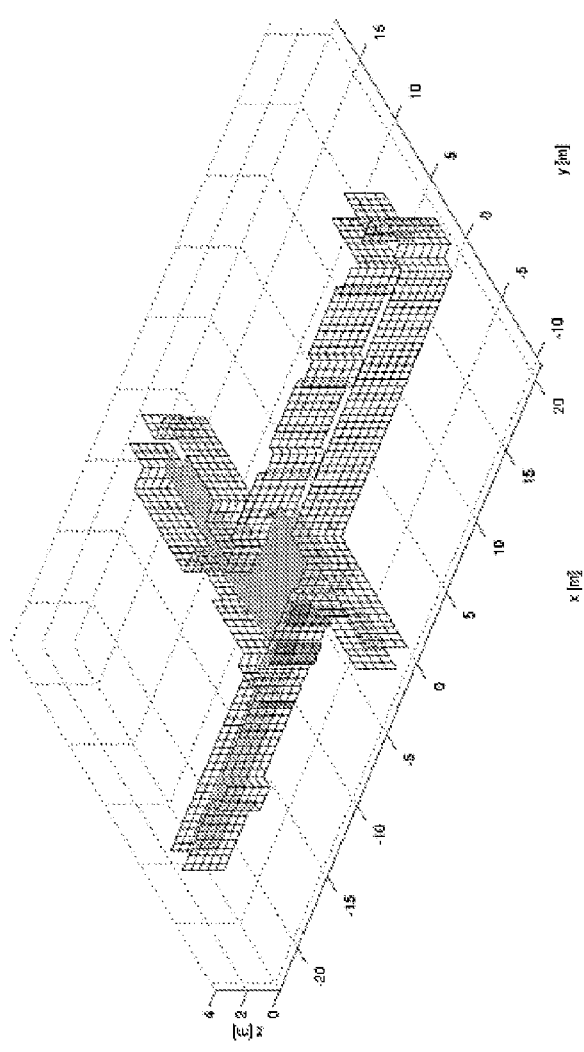
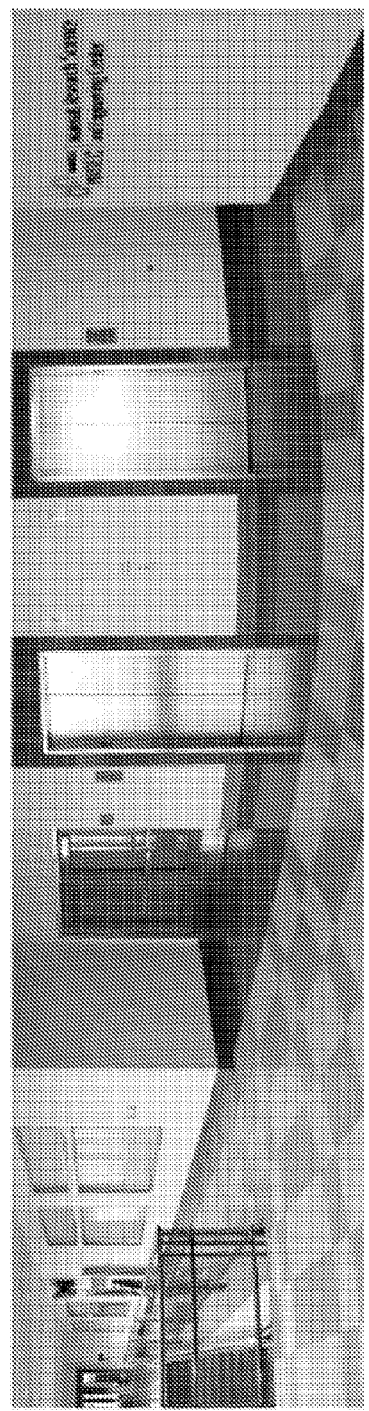
FIG. 15A
FIG. 15D

SUBSCRIPTION BASED MISO AND MIMO WIRELESS ENERGY TRANSFER

CROSS-REFERENCE TO RELATED APPLICATIONS

This application is the U.S. national stage application of International Application Serial No. PCT/US2013/060556, filed Sep. 19, 2013, which claims the benefit of U.S. Provisional Application Ser. No. 61/702,873, filed Sep. 19, 2012, which are hereby incorporated by reference in their entirety, including all figures, tables and drawings.

BACKGROUND

Even with the rising popularity of mobile devices, many of these devices are not truly wireless. Instead, many devices remain tethered to power cords—at least during the time that the mobile devices have their batteries re-charged. For some devices, energy harvesting techniques may be integrated to facilitate totally wireless operation. Often, energy harvesting devices are opportunistic, harvesting from whatever sources are available.

One popular energy harvesting technique involves radio-frequency (RF) sources such as wireless access points or dedicated base stations or power transmitters. RF energy sources include ambient sources and intentionally broadcast sources. Ambient RF energy can be obtained from mobile and WiFi networks; that is, nearby mobile phones, WiFi routers and devices, and base stations or broadcast radio towers generate ambient RF energy. Intentional RF energy sources can be operated in a manner that keeps energy storage devices fully charged or providing power for device activation. RF signals may be intentionally broadcast on unlicensed frequency bands (or in whitespace) in a continuous, scheduled, or on-demand basis. Intentional sources can be deployed in a network similar to WiFi routers or base stations where multiple transmitters provide coverage over a wide area. Current examples of intentional sources include RFID readers.

BRIEF SUMMARY

The present disclosure is directed to subscription based MISO and MIMO wireless power transfer. Systems and techniques are described that facilitate controlled deployment of wireless power transfer to specified devices in an environment. Implementations involve using spatially distributed and synchronized power transmitters to control wireless energy transfer.

A wireless power transfer system can include a plurality of transmitters and a transmitter controller that controls the plurality of transmitters to transfer energy to subscribed devices in a vicinity of one or more of the plurality of transmitters. The controller receives power information either directly from a subscribed device or via analysis of a backscatter signal from the subscribed device. The amplitude and phase of a signal transmitted from each of the plurality of transmitters are optimized according to a cost function to produce a maximum amount of energy transfer to a subscribed device and a minimum amount of energy transfer to any specified blocked devices.

In some implementations, the plurality of transmitters can be configured from access points or base stations providing wireless data transfer. For such implementations, in addition to data, the signal transmitted to a particular mobile device can include one or more frequency components with an amplitude and phase associated with optimized energy transfer (maximized or minimized depending on whether the mobile device is subscribed to receive the wireless energy). The transmitter controller can provide gain and phase control signals to the transmitters according to a current power level (e.g., incident power) of a subscribed device, channel characteristics of the radio-frequency channel from each transmitter to each device, and, in some cases, additional information such as the device's location. The current power level may be obtained directly from the device via a communication link or it can be inferred through backscatter techniques.

The power level for passive devices can be determined by the wireless power transfer system by analyzing backscatter signals received by a plurality of receivers associated with the system. Channel information is used to optimize gain and phase of each transmitter in order to maximize the energy transferred to the mobile device. In operation, a small fraction of the energy-bearing signals sent by the transmitters is reflected by any mobile (passive) device, which functions as a backscatter transponder. Any backscatter modulation type (e.g., ASK, PSK, QAM) may be carried out by the mobile device. The backscatter signal is observed by the receivers of the system and the power level at each receiver and the MIMO backscatter gain matrix can be measured from the backscatter signal. The power level at each receiver is optimized (maximized or minimized depending on the case) through singular value decomposition of the MIMO backscatter gain matrix, resulting in an autocovariance matrix that can be solved for gain and phase using a table look-up. In another implementation, the power level at each receiver is optimized using a cost function based on only the received power levels. In other implementations, any mathematical approach which yields an autocovariance estimate may be applied.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations and examples are described in connection with these drawings, the disclosure is not limited to the implementations and examples disclosed herein.

FIG. 10A illustrates gain factors for modulated backscatter (simplified with a single transmitter and receiver); and FIG. 10B illustrates differences in power levels.

FIGS. 15A-15D provide representations and images of the environment in which measurements were carried out. FIG. 15A shows a 3-D rendering with semi-transparent walls, FIG. 15B shows the 3-D rendering from above, FIG. 15C shows a photograph (from [x, y]=[−8,−1]m), and FIG. 15D shows panoramic image (from corner at [x, y]=[−5, 4]m).

FIG. 16A illustrates line-of-sight K-factor [dB], FIG. 16B illustrates RMS delay spread [ns], FIG. 16C illustrates 70% coherence bandwidth [MHz], and FIG. 16D illustrates 70% coherence distance [cm].

FIG. 18A illustrates minimized peak power, FIG. 18B illustrates minimized average power, FIG. 18C illustrates maximized minimum power (deep fades), and FIG. 18D illustrates maximized average power.

FIG. 19A illustrates minimized power and FIG. 19B illustrates maximized power.

FIG. 20A illustrates minimized power and FIG. 20B illustrates maximized power.

FIG. 21A illustrates minimized power and FIG. 21B illustrates maximized power.

FIG. 22A illustrates minimized power and FIG. 22B illustrates maximized power.

FIGS. 24A and 24B illustrate probability density functions (PDFs) for high SNR; and FIGS. 24C and 24D illustrate PDFs for low SNR.

FIGS. 25A and 25B illustrate PDFs for high SNR; and FIGS. 25C and 25D illustrate PDFs for low SNR. Ideal backscattering shown as gray lines.

FIG. 29A illustrates a single-channel ($P_{AV}$), avg. −33.3 dB; and FIG. 29B illustrates a backscatter channel ($P_{RX}$), avg. −33.3 dB.

FIG. 30A illustrates a single-channel ($P_{AV}$), avg. −48.5 dB; and FIG. 30B illustrates a backscatter channel ($P_{RX}$), avg. −48.4 dB.

FIG. 31A illustrates maximization, avg. −33.8 dB; and FIG. 31B illustrates minimization, avg. −41.1 dB.

FIG. 34A illustrates backscatter gain factor (magnitude) (see also FIG. 26A); and FIG. 34B illustrates power levels (received power PRX with and without applying the transmit amplitudes, the TX amplitude add-on, at the receivers).

DETAILED DESCRIPTION

Subscription based MISO and MIMO wireless power transfer is disclosed. Systems and techniques are described that facilitate controlled deployment of wireless power transfer to specified devices in an environment. Implementations involve using spatially distributed and synchronized power transmitters to control wireless energy transfer.

MISO (multiple-input-single-output) and MIMO (multiple-input-multiple-output) systems use multiple transmitters and receivers to increase the amount of information that can be transferred at a given time. In a wireless communication context, multiple transmitters and receivers enable the sending and receiving of multiple spatial streams at the same time. Embodiments use MIMO configurations to transfer energy to designated devices (or regions) within an operating environment.

A subscription provides specified, as opposed to arbitrary, access to a product or service. Subscriptions may include an economic model which determines how a resource (such as wireless power) should be allocated. As part of a subscription for energy transfer as described herein, embodiments provide controlled access to energy that can be used to operate or charge a device. Designated devices (interchangeably referred to as "mobile devices" and "mobile units") can be on the receiving end of MIMO wireless energy transfer. In some implementations, certain devices and/or regions may be blocked or otherwise minimized from energy transfer. The described systems can provide radio-frequency energy transfer as opposed to directing a spot beam to a particular position in space.

Figure 1:
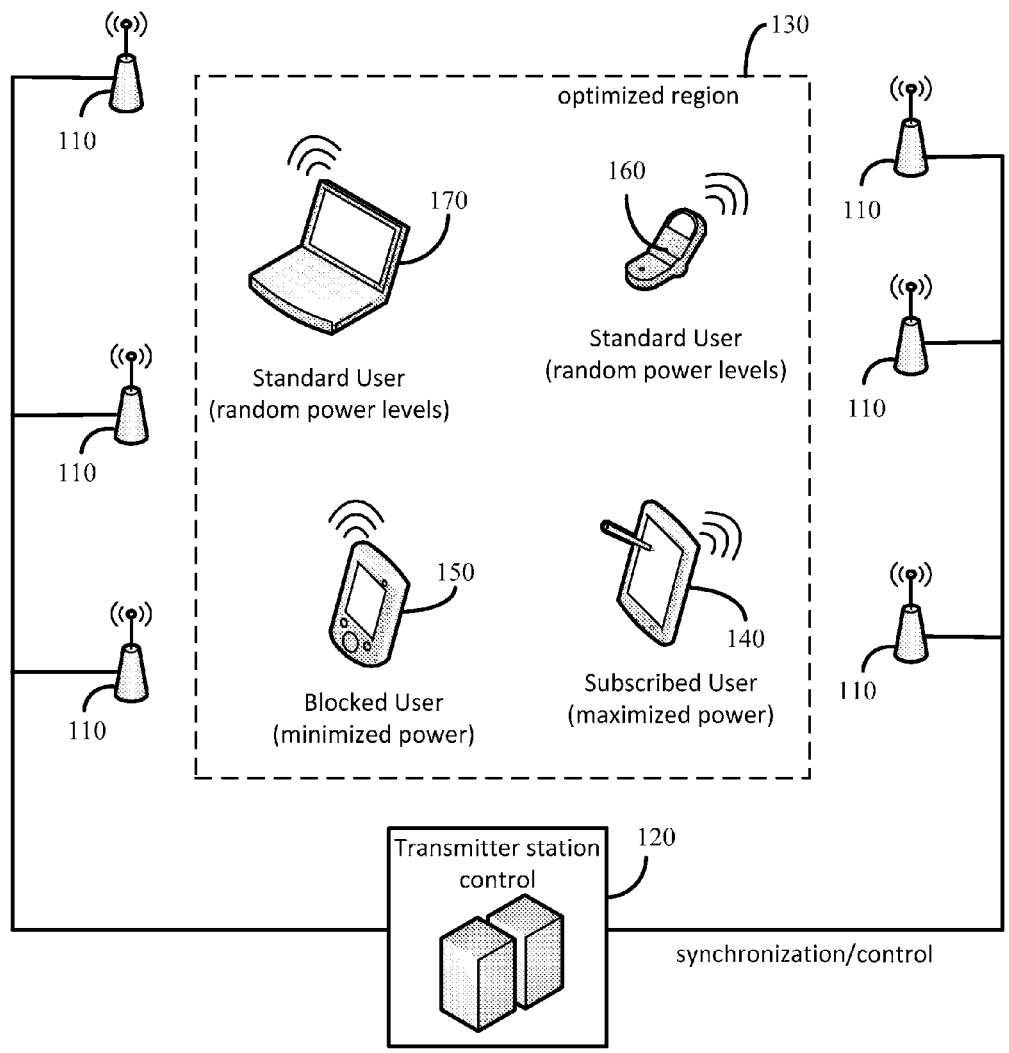
FIG. 1 illustrates a schematic of an operating environment according to one example embodiment presented in this disclosure.

FIG. 1 illustrates a schematic of an operating environment. Referring to FIG. 1, a plurality of power transmitters 110 synchronized and controlled by a transmitter station 120 can selectively direct power to one or more points within an optimized region 130. The power transmitters 110 can be in the form of base stations provided at different locations of a building, room, or area. The power transmitters 110 may be wired or wirelessly connected to the transmitter station control 120.

The combined transmitter system (with power transmitters 110 under transmitter station 120 control) can provide a mobile power harvesting device (e.g., mobile device 140) with a maximum amount of transferred energy. Moreover, the combined transmitter system can actively deny power as well, for example reducing interference for sensitive devices and minimizing power absorption for humans in those regions. The active denial of power can block a region (of certain size) or a user (or mobile device 150) through providing a minimum possible amount of incident energy, actively blocking devices from receiving energy from the RF signals emanating from the power transmitters 110. Other devices (e.g., devices 160, 170) may receive non-optimized random energy levels.

Figuratively speaking, a dark cloud of low power levels is enforced around blocked devices and regions, while an equivalent bright cloud of high power levels follow devices for which power (or energy) transfer is maximized. The system can provide different frequencies and for multiple users, for example maximizing the power for a mobile device harvesting at a frequency of 915 MHz while at the same time minimizing the power at the device's communication frequency range of 920-925 MHz and blocking a second device from receiving power.

The mobile devices in these scenarios can obtain power from an RF field, as support for their battery or other energy storage, to charge a battery, or as a primary source of power. Subscribed users can be added to a maximization (authenticated) group. Devices authenticated as being part of the maximization group receive a maximum transfer of energy from the system. Users may also choose, at their convenience, not to receive any power, keeping interference levels low.

In addition to maximizing power/energy transfer to subscribers, selected "blocked" users or interference-sensitive devices can be actively denied power. Non-subscribed users receive whatever power is randomly transferred to their position, or an amount of power subject to minimization. The amount of energy available for random transference may change depending on the optimization carried out for the subscribers in the vicinity.

The system transfers energy from multiple transmitters in an area, thus gaining the ability to control the levels of power available to different users and/or in different regions within the area of the multiple transmitters. This can be done either with the help of power measurements on the mobile devices or by remotely optimizing the power level, and works for narrowband and wideband energy transfer.

A transmission station may advertise its ability to enroll a subscriber or acknowledge a subscriber within its vicinity so that when a device is within the vicinity of the transmission station, the device and the transmission station can communicate with each other to establish that the device is authorized to receive maximum available energy (e.g., system verifies that the device is a subscribed device). In some cases, the transmission station may have a designated list of existing subscribers (in the maximization group). In other cases, the transmission station may communicate with the transmitter station control to determine whether the device is authorized as a subscriber. Subscribers can be authenticated, for example, using cryptography (e.g., for high-profile systems or systems where access has monetary value) or by using IDs (e.g., for simple asset tracking systems in warehouses).

Figure 2:
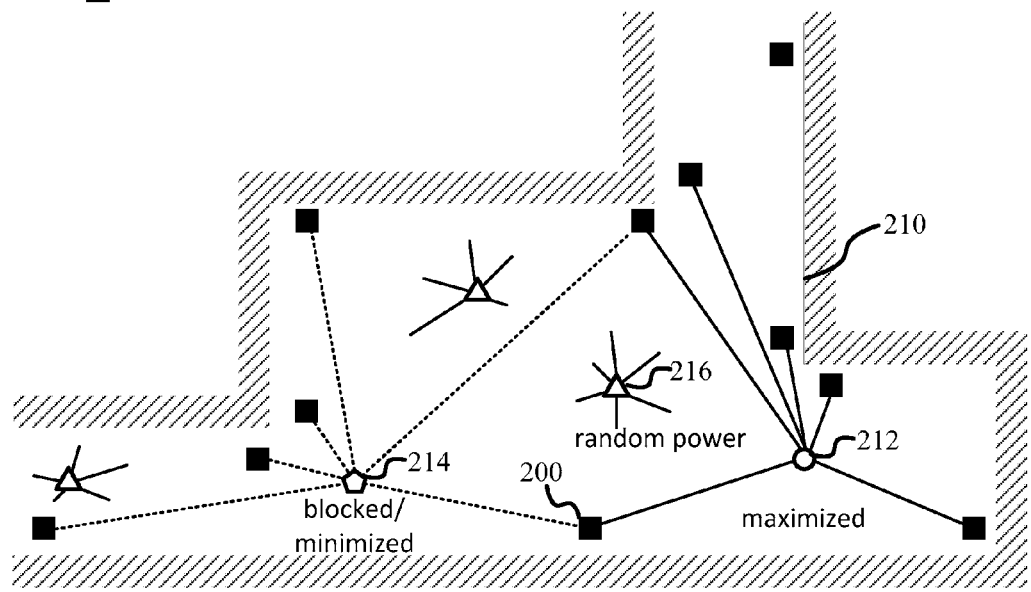
FIG. 2 illustrates an example operating environment in which multiple base stations (with transmitters) are provided at various locations in a building or region.

FIG. 2 illustrates an example operating environment in which multiple base stations 200 (with transmitters) are provided at various locations in a building or region 210. Multiple devices can be within the building or region 210. Transmitters close to subscribed users 212 are configured to transmit as much power as possible to the subscriber; transmitters close to blocked users 214 and/or zones are configured to actively deny power to the area in question. Standard (non-subscribed and not blocked) users 216 receive non-optimized random power levels from transmitters in the vicinity (for example, as ambient RF energy).

The selective transfer of energy to devices can be accomplished by the selection (and transmission) of transmitter frequencies, amplitudes, and phases that are optimized for a particular scenario. Different cost functions can be used by the system to achieve the different optimization goals for the scenarios in which the transmitters are being operated. In addition, constraints for the cost functions can be applied based on physical limitations, available resources, and economic aspects such as usage fees, bids or auction results, and usage agreements of the one or more devices powered by the energy transfer. Keeping the minimum (deep fade) power in an area above the power-on threshold of power harvesting devices, for example, ensures that all devices in that area are functional.

Figure 3A:
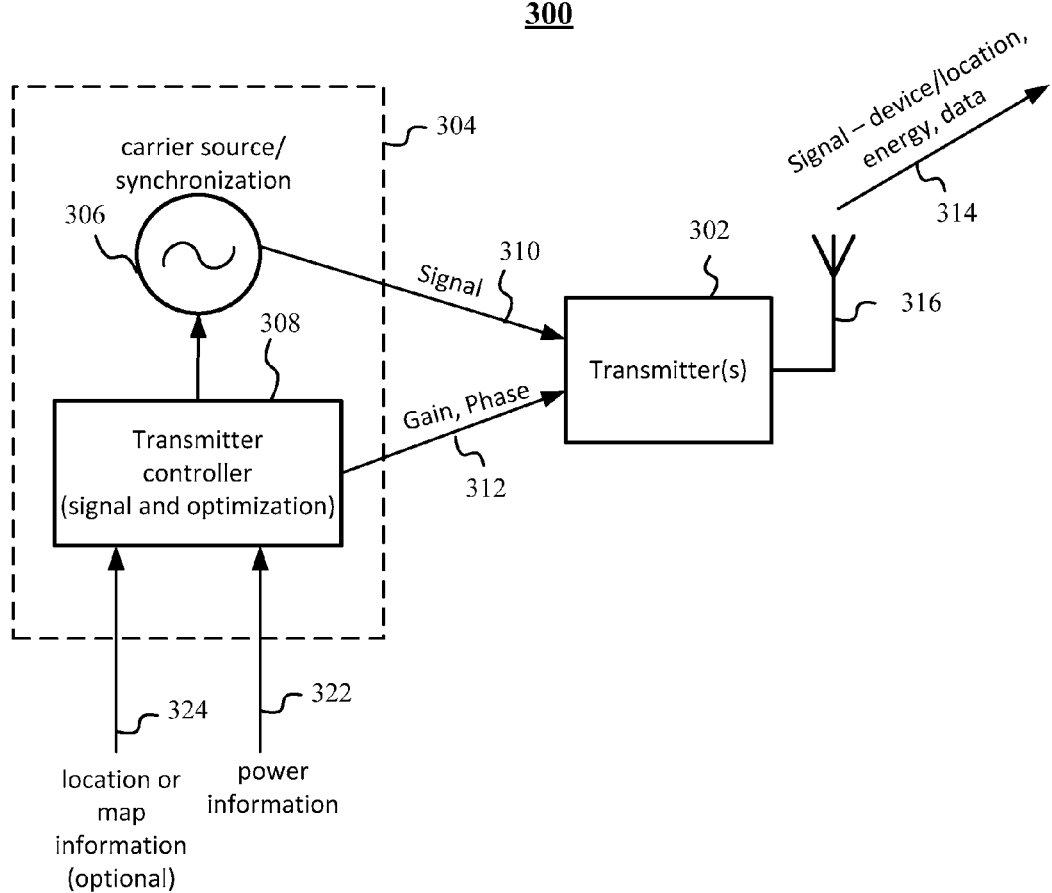
FIG. 3A illustrates a block diagram of an example transmitter system.

FIG. 3A illustrates a block diagram of a transmitter system 300 for transferring energy to power subscribers. The transmitter system 300 can include a plurality of transmitters 302 and control circuitry 304. The control circuitry 304 can include a carrier source/synchronization signal generator 306 and a transmitter controller 308. The control circuitry 304 may be located anywhere on the network of transmitters. In some implementations, some or all of the control circuitry 304 is located remotely from base stations or access points transmitting the signals. The control circuitry 304 may then communicate with the transmitters (and antennas) distributed about an area by wired, wireless, or a combination of wired and wireless connections. In some cases, part of the control circuitry 304 may be located in a box or at a base station with each transmitter 302.

A signal 310 can be generated by the control circuitry 304 and wirelessly transmitted on communication channel(s) via one or more of the plurality of transmitters 302. The signal 310 may encode data. The transmitter controller 308 can generate a gain (amplitude) and phase control signal 312 for each transmitter 302. The amplitude and phase of the output signal 314 can be used to optimize the transfer of energy to subscribed devices. That is, the output phase and amplitude over frequency of the signal 314 transmitted wirelessly from antennas 316 of each transmitter 302 can be controlled by the gain and phase control signal 312 to provide optimized energy delivery. The gain and phase adjustment may be particular to a certain frequency component of the signal 312 to facilitate avoidance of interference with frequency components encoding data and/or being used by other devices.

Figure 3B:
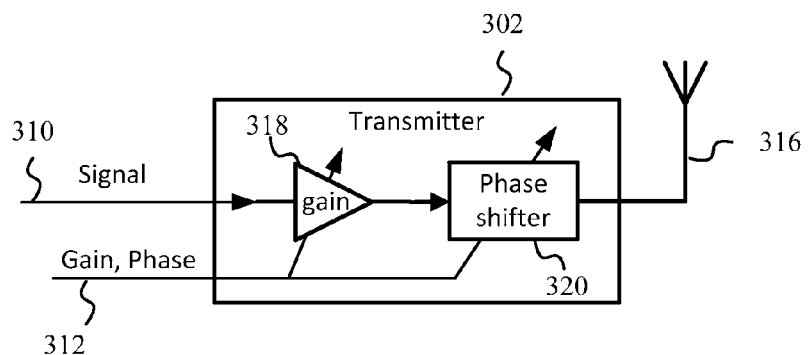
FIG. 3B illustrates an example transmitter that may be used in the transmitter system of FIG. 3A.

FIG. 3B illustrates an example transmitter that may be used in the transmitter system of FIG. 3A. As shown in FIG. 3B, the transmitter 302 can include an amplifier 318 and a phase shifter 320. The signal 310 (e.g., carrier signal) can be provided to the amplifier 318 and the gain and phase control signal 312 can be used to adjust the gain of the signal 310. The gain and phase control signal 312 can also be used to adjust the phase of the amplified signal (by controlling a variable phase shifter 320). The amplitude and phase adjusted signal can be transmitted from antenna 316.

Returning to FIG. 3A, both amplitude and phase can be controlled by a MIMO (Multi-Input Multi-Output) transmitter controller 308, and are set in a way that optimizes cost functions for the energy transfer. For example, the control can be via gain and phase control signals 312 for each transmitter 302.

Figure 3C:
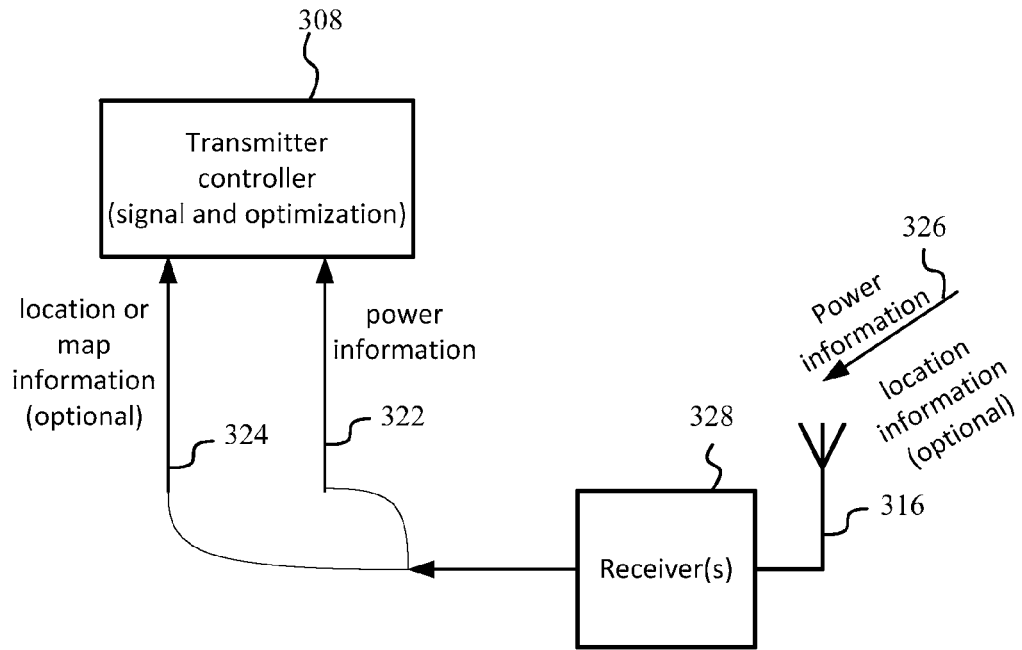
FIG. 3C illustrates a block diagram for a control loop for the transmitter system of FIG. 3A when power measurement is available on a mobile device.

The optimization may be based on feedback received by the transmitter system 300. For example, the transmitter system 300 can optimize energy transfer according to the power levels of the mobile devices within an area of influence. Thus, power information 322 and optionally location or map information 324 is used to optimize energy transfer. To this end, the transmitter system may include a plurality of receivers. The signals received via the receivers can be processed in two modes illustrated in FIGS. 3C and 3D. In some cases, the system receives information directly from the mobile devices and optimizes the amplitude and phase for each transmitter using power levels communicated by the mobile devices. For example, as shown in FIG. 3C, a signal 326 containing power information and, optionally location information (e.g., radio-frequency channel information), can be received by the receivers 328, which then provide this information 322, 324 to the transmitter controller 308.

Figure 3D:
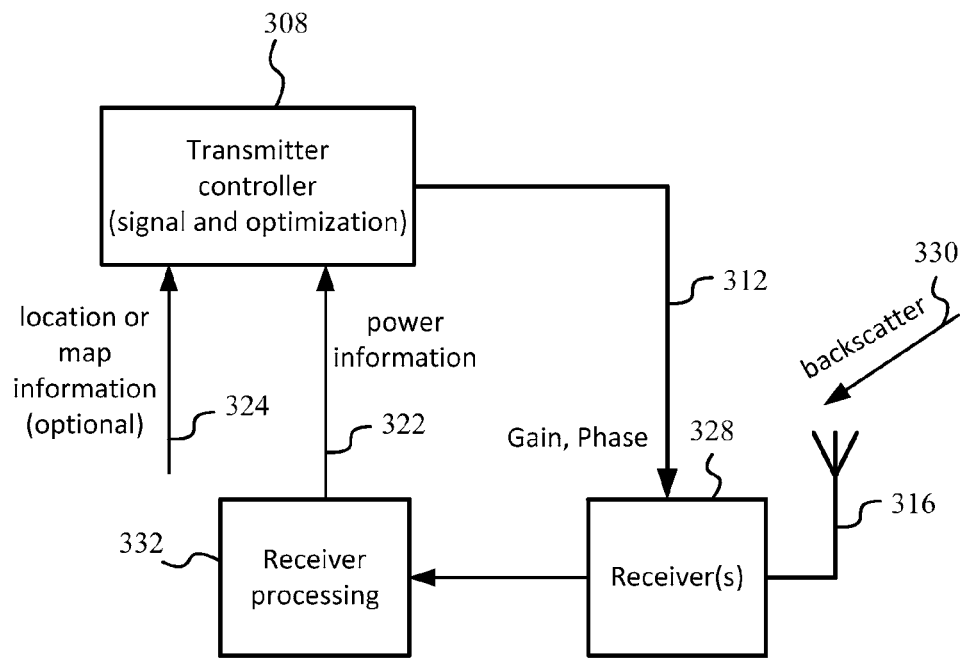
FIG. 3D illustrates a block diagram for a control loop for the transmitter system of FIG. 3A for a passive mobile device (not providing direct power measurement).

In other cases, the system remotely estimates the power levels of the mobile devices using signals reflected (backscattered) by the mobile devices and recorded by MIMO receivers. For example, as shown in FIG. 3D, a backscatter signal 330 can be received by the receivers 328 and undergo receiver processing 332 in order to generate power information 322, which is then used to optimize amplitude and phase for each transmitter. The receivers 328 may optionally also receive the gain and phase control signal 312 from the transmitter controller 308. These transmitter settings (gain and phase 312) can be applied at the receiver side to improve performance for nonlinear backscatter devices. Location and/or map information 324 may be obtained from storage or via other communication channels and used to optimize transmitted signals according to a particular scenario encountered by the system.

Location mapping may be carried out to designate regions or zones for energy transfer and/or blocking. The location mapping may involve programmed regions/zones or "hotspots" or be dynamic according to a location of a device in the area serviced by the system (or a combination of the two). The location mapping may be used to determine appropriate transmitters for transferring the energy (or lack thereof). In some implementations, recognized devices (e.g., recognized as a blocked device or a subscribed device) can be verified and signals (direct or backscatter) can be received for use in optimizing power transfer.

An energy transfer system using the transmitter system 300 of FIG. 3A may include one or both receiver processing configurations. To carry out subscription based MIMO wireless power transfer, the optimization logic and/or algorithms can be implemented as software stored on one or more storage media and executed by a processor associated with the system (for example, as part of a transmitter control or optimization controller/processor).

According to certain embodiments, a wireless power transfer system can include a plurality of transmitters and a transmitter controller that controls the plurality of transmitters to transfer energy to subscribed devices in a vicinity of one or more of the plurality of transmitters. The controller receives power information either directly from a subscribed device or via analysis of a backscatter signal from the subscribed device. The amplitude and phase of a signal transmitted from each of the plurality of transmitters are optimized to produce a maximum amount of energy transfer to a subscribed device and a minimum amount of energy transfer to any specified blocked devices.

Figure 4A:
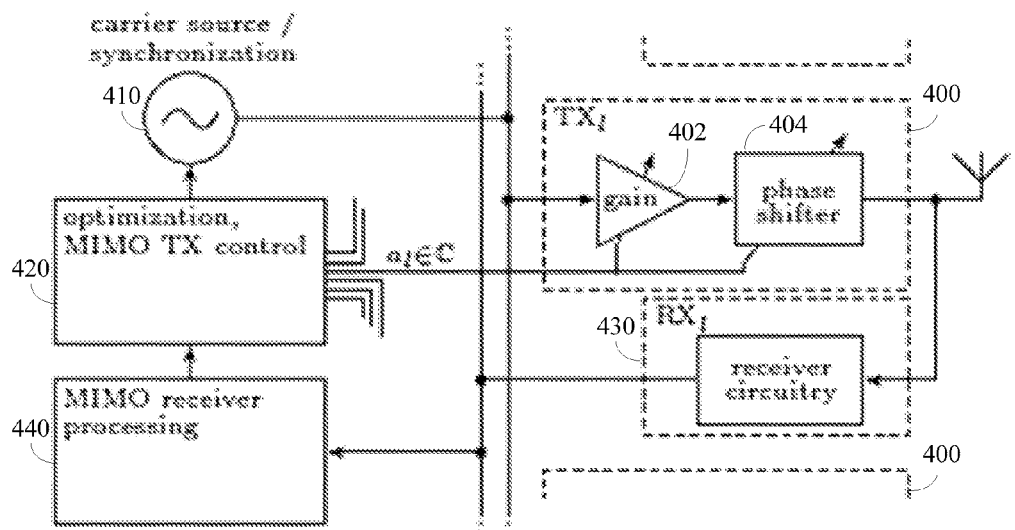
FIGS. 4A and 4B respectively illustrate block diagrams of a base station (with transmitters and receivers) and mobile device (mobile unit) that may receive energy transfer from the transmitter system including the base station.
Figure 4B:
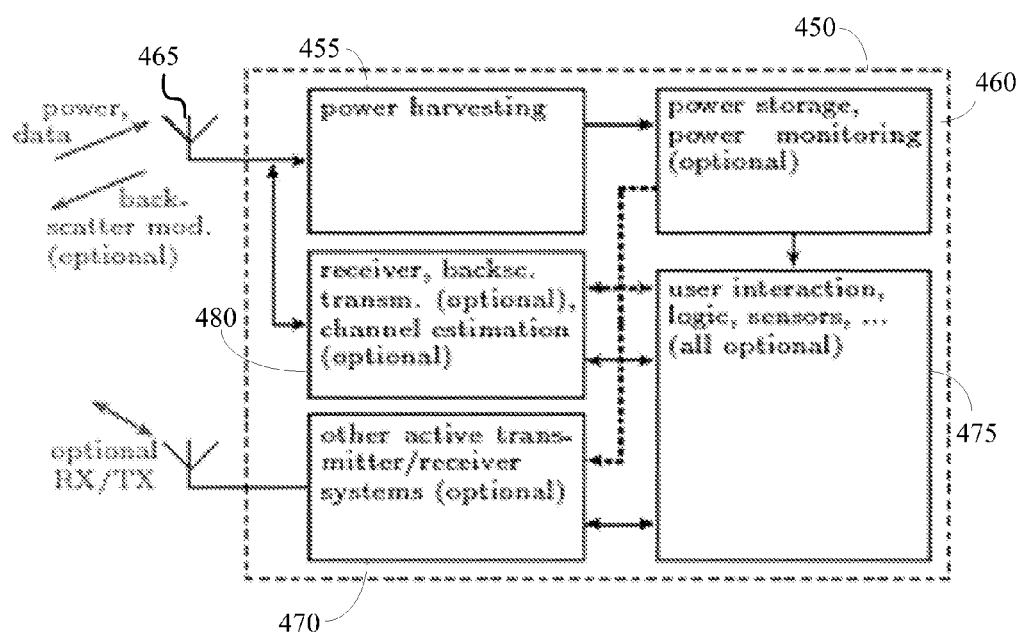

FIGS. 4A and 4B respectively illustrate block diagrams of a base station (with transmitters and receivers) and mobile device (mobile unit) that may receive energy transfer from the transmitter system including the base station. Mobile devices include sensing and/or communication devices such as tags, sensor nodes, transponders, or mobile communication devices such as cell phones and tablets. Mobile devices can also include laptops and other mobile computers.

Referring to FIG. 4A, a plurality of transmitters and receivers may make up a transmitter system. The transmitters and receivers can be distributed in a plurality of base stations. According to the implementation illustrated in FIG. 4A, a base station can include a transmitter 400 with amplifier 402 and phase shifter 404. The base station can receive a signal from a carrier source/synchronization generator 410 and a control signal from an optimization, MIMO transmitter control 420. The base station can further include receiver circuitry 430, which can provide received signals to the transmitter system for MIMO receiver processing 440.

Referring to FIG. 4B, a mobile unit 450 may include power harvesting circuitry 455, power storage 460 (with optional power monitoring circuit(s)), and a receiver and transmitter (element 465). The mobile unit 450 can harvest energy received from the transmitters (e.g., 400) and use the energy to complement or charge a local power source 460 or as a primary source of energy (instead of or in addition to a local power source). In some cases, the mobile unit 450 can use the receiver and a transmitter (element 465) to communicate with the energy transfer system. The transmitter of the mobile unit 450 can be passive (backscatter modulation) or active (in-band, out-of-band, and/or different media).

Data may be received using the same signals that are used for power/energy transfer (in-band), different signals and/or frequency ranges (out-of-band), or using different media (e.g., optical, acoustic). For implementations receiving data using different media, optional active transmitter/receiver systems 470 may be included. A variety of circuitry may optionally be included in the mobile unit 450. For example, a mobile unit 450 can also contain sensors 475 and/or have the ability to determine its own location, perform channel estimation (e.g., element 480), or monitor its own power level. Any information generated by the mobile unit may be used in power optimization.

For example, the mobile devices may or may not have the ability to measure and monitor their own power level. If they are capable of determining the available (incident) power level, then the system can directly use this information during optimization.

Figure 5A:
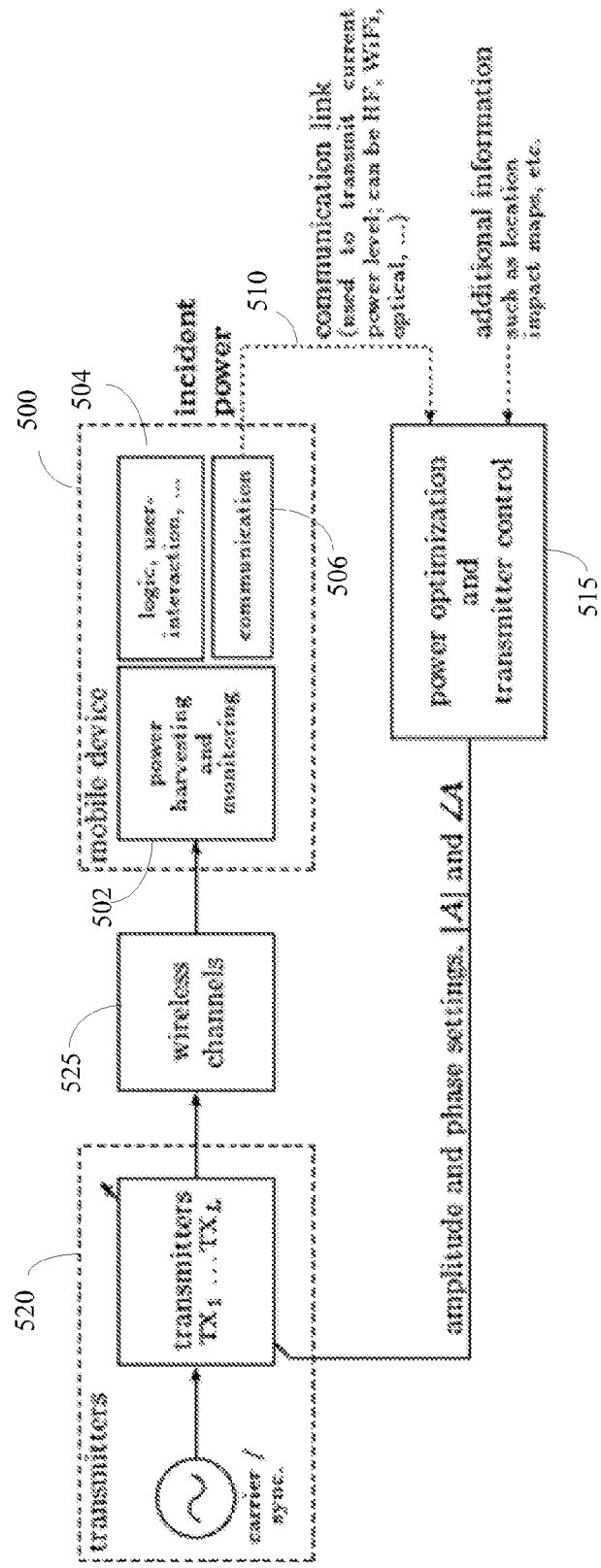
FIG. 5A illustrates a block diagram of an implementation of an example optimization process for a case where information about incident power levels are provided from a mobile device.

FIG. 5A illustrates a block diagram of an implementation of an example optimization process for a case where information about incident power levels is provided from a mobile device. Referring to FIG. 5A, a mobile device 500 (e.g., mobile unit 450 of FIG. 4B) can include power harvesting and monitoring circuitry 502, logic 504 (which may involve programmable circuitry and/or processor(s) and storage containing software), and communication circuitry 506 (such as RF, optical, or other transmission circuitry). The mobile device 500 can measure its incident power level, for example via the power monitoring circuit 502, and send the information about incident power to the transmitter system (base stations) over communication link 510. The communication link 510 used to transmit current power level can be RF, WiFi, optical, or other transmit/receive protocols.

A power optimization and transmitter control 515 (e.g., transmitter controller 308 of FIG. 3C, optimization, MIMO TX control 420 of FIG. 4A) can receive the information about incident power from the mobile device 500 over the communication link 510. The power optimization and transmitter control 515 can determine an optimized set of transmitter amplitudes (|A|) and phases (∠A) using the incident power information and, in some cases, additional information such as device location and/or impact maps. The values for amplitude and phase settings can then be used to configure a transmitter array 520, which then provides the appropriate energy on a propagating signal to the mobile device 500 over wireless channels 525.

In one implementation, the settings of transmitters determined to provide a good (e.g., above a threshold) impact on the optimized power level are updated using the amplitude and phase settings. The selected transmitters can be (but are not necessarily) the transmitters closest to (e.g., with a maximum channel gain) the mobile device (see FIG. 2). The power optimization and transmitter control can determine the base stations/transmitters closest to the mobile device through location information received by the mobile devices or by a localization subsystem. An "impact map" can be built and updated during normal operation. As a default, in some cases, if there is no impact map and/or the location information is not available, then all base stations in contact with the mobile can be optimized.

Figure 5B:
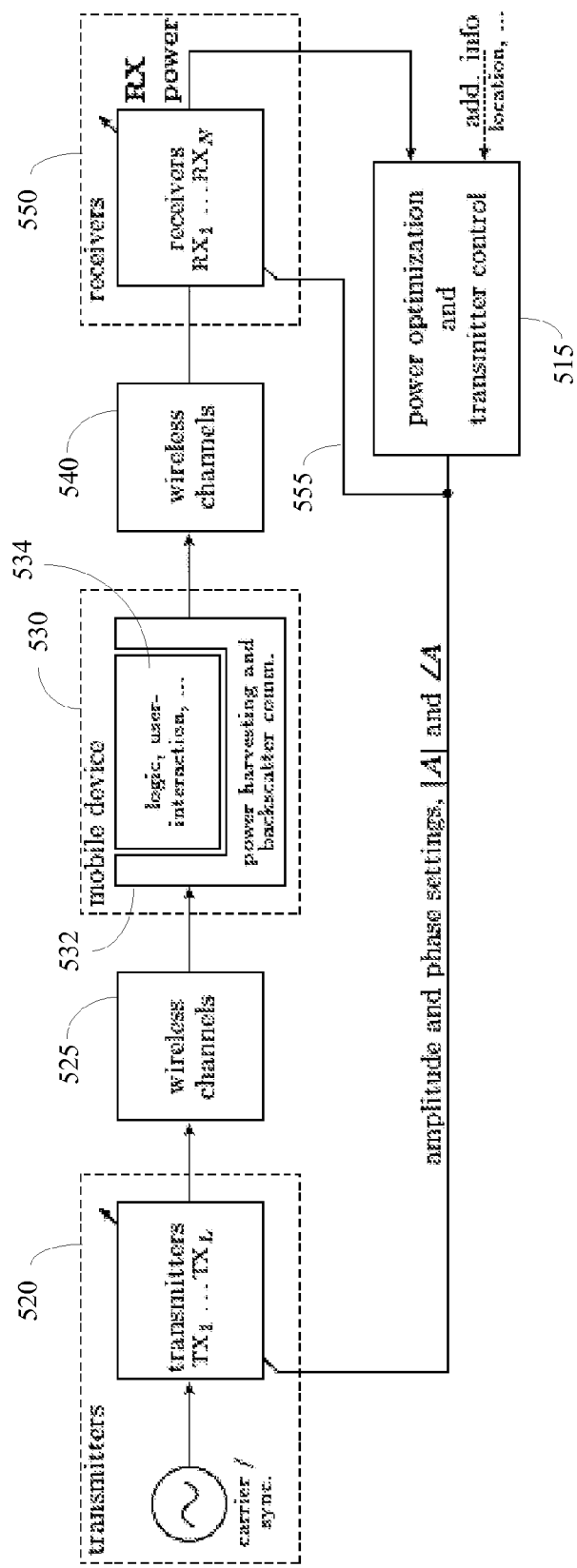
FIG. 5B illustrates a block diagram of an implementation of an example optimization process for a case where information about incident power levels of a mobile device are not provided directly by the mobile device.

In some cases, a mobile device does not have the ability (or the inclination) to measure and report its incident power level. FIG. 5B illustrates a block diagram of an implementation of an example optimization process for a case where information about incident power levels of a mobile device are not provided directly by the mobile device. Examples of such mobile devices are fully passive devices, such as those without their own power source but rely on an RF field as a primary source of power. Passive devices can communicate using backscatter modulation. That is, passive devices reflect parts of the incident power in a modulated fashion. This behavior is used by the system to remotely optimize the energy transfer for devices with nonlinear (power-dependent) backscatter characteristics.

Devices that fall under the category of devices with nonlinear backscatter characteristics include passive devices that solely rely on RF power harvesting for their power. Semi-passive devices (e.g., battery-assisted passive) devices that have their own power source, but use modulated backscatter for communication purposes may fall into the category of a device with nonlinear backscatter characteristics under some circumstances. However, nonlinearity is typically caused by the power harvesting circuitry so some semi-passive devices can have a linear backscatter characteristic.

Referring to FIG. 5B, a mobile device 530 subscribed to the energy transfer system may include power harvesting and backscatter communication circuitry 532 and, in some cases, logic circuitry 534 for carrying out one or more processes. The mobile device 530 may be any backscatter device (passive, semi-passive, battery-assisted passive, and passive devices with long-term energy storage). Remote power optimization can be carried out through receiving the backscatter signal from the mobile device over wireless channels 540 and through MIMO receivers 550. Backscatter signals may be used to estimate incident power level for the nonlinear backscatter devices. Backscatter signals can be stored by the MIMO receivers 550 and the signal undergo processing (e.g., using receiver processing 332 of FIG. 3D or MIMO receiver processing 440 of FIG. 4A).

The optimization in the case illustrated in FIG. 5B is based on the backscatter power received by the MIMO receivers 550 instead of on the incident power level at the mobile device as described with respect to FIG. 5A (since the incident power level at the backscatter mobile device is not directly measured). Similar elements as presented in FIG. 5A are provided with same reference numbers. Once again, side information such as the location of mobile devices can be factored into the optimization.

In order to improve performance for nonlinear backscatter devices, the transmitter settings generated by the power optimization and transmitter control 515 can optionally also be applied at the receiver side (555).

Figure 6A:
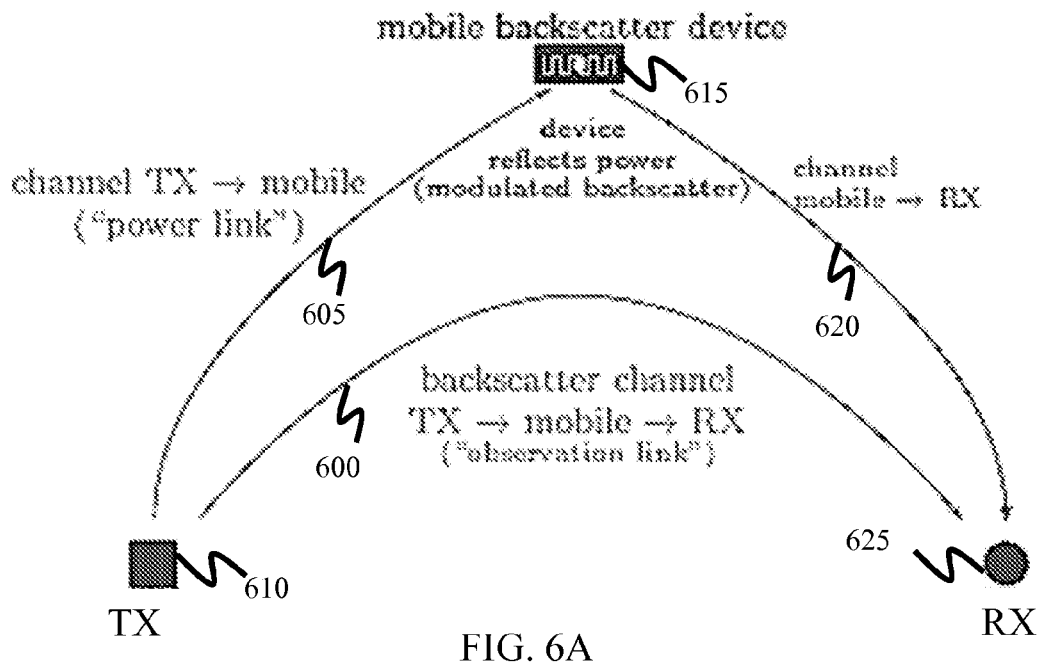
FIG. 6A illustrates a backscatter channel.

FIG. 6A illustrates a backscatter channel. Backscatter devices, which include passive and semi-passive (a.k.a. battery assisted passive) devices, communicate with their environment through backscatter modulation, i.e., by changing the amount of energy they reflect. This forms an overall channel known as a "backscatter channel" 600, consisting of the channel 605 from a transmitter 610 to the backscatter device 615 (which determines the power level at the device), the backscatter reflection coefficient (ratio between incident and reflected signal), and the channel 620 from the backscatter device 615 to a receiver 625.

The overall backscatter channel is a degenerate "pinhole" channel with special properties that can complicate any attempted control. Not least among these properties is the typical nonlinearity of passive backscatter devices.

In order to transfer energy to devices that do not or cannot provide their power level (or channel gains or channel impulse responses), various implementations include receivers as part of the base stations (see FIGS. 3D, 4A, and 5B). The combination of a plurality of transmitters and a plurality of receivers forms a multi-input multi-output (MIMO) system that can measure several observations of the backscatter responses sent by a backscatter device.

A backscatter system can operate by reflecting a signal transmitted by another device (such as a base station) in a time-variant fashion, thus adding modulation to the reflected signal. This modulated backscatter signal is subsequently recorded by the receiver, which can be but does not have to be co-located with the transmitter.

Figure 6B:
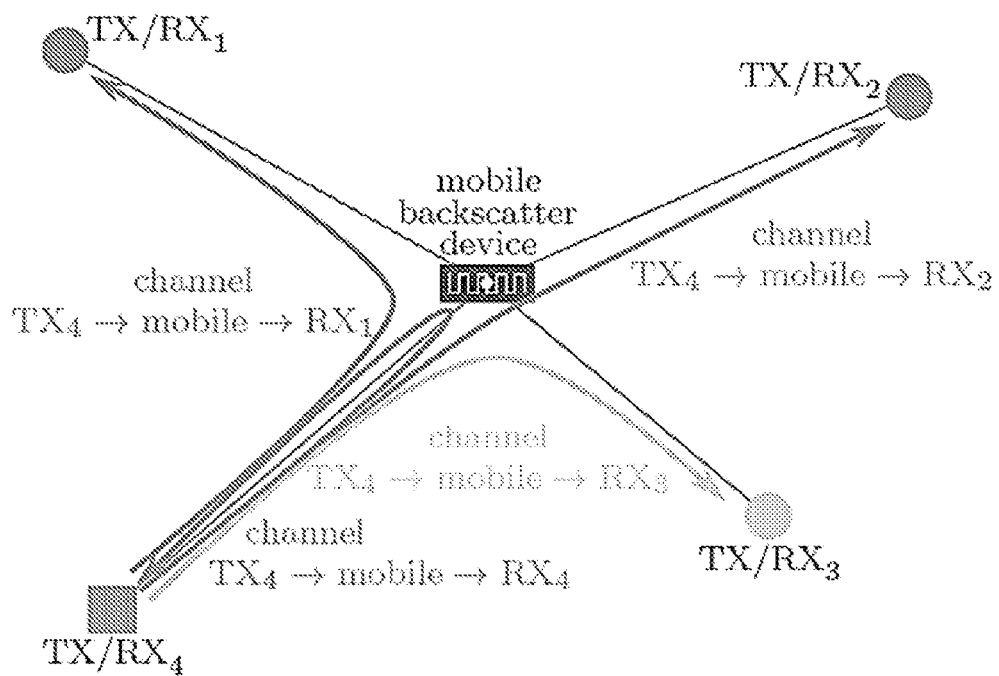
FIG. 6B illustrates an example energy transfer system for a backscatter device.

FIG. 6B illustrates an example energy transfer system for a backscatter device. Here, the signal sent by $TX/RX_4$ and reflected by the backscatter device is recorded by all four receivers of the 4×4 MIMO system. In total, $L^2$ backscatter channels can be recorded by a system with L transceivers (transmitter+receiver). To enable consistent results, the transceivers are synchronized. This can, for example, be achieved by sharing the same master clock/carrier among all transceivers. Synchronization at or calibration up to the antenna ports is not explicitly required. Any part of the system that is not calibrated (e.g., cables, antennas) simply becomes part of the channel and can be factored in to the equations. Moreover, specifically not required are synchronization with the backscatter device or any form of cooperation except for backscattering the transmitted signal(s).

In some implementations, transmitter settings may be updated using a mathematical model of the wave propagation in the corresponding environment. The power optimization and transmitter control may use the mathematical model in place of or in addition to the backscatter (remote power level determination) and direct power information approaches. The mathematical model of the wave propagation can be useful for scenarios where the entire area around a single mobile device is being targeted in the optimization.

A greater understanding of the present invention and of its many advantages may be had from the following examples, given by way of illustration. The following examples are illustrative of some of the methods, applications, embodiments and variants of the present invention. They are, of course, not to be considered in any way limitative of the invention. Numerous changes and modifications can be made with respect to the invention.

MISO Power Optimization with Local (on-Mobile) Power Measurement

Multi-Input Single-Output (MISO) power optimization schemes of certain embodiments of the invention involve mobile units that can actively measure the incoming signal. In one implementation, a mobile unit may be configured to measure channel gains ($c_{lm,k}$), channel impulse responses (for wideband and ultra-wideband systems), frequency-dependent power levels, the total incident power in a frequency band, or a combination thereof. The mobile units can then transmit this information to the system's receivers (e.g., receivers 328 of FIG. 3C) in-band (backscatter or active transmission), out-of-band (e.g., Wi-Fi, Bluetooth), using a different medium (e.g., optical, acoustic), or by any other means. The system can receive the incident power information from the mobile device, determine optimum amplitude and phase for each transmitter in order to transfer an optimum energy to the mobile device, and adjust the signal being transmitted by one or more of the multiple available transmitters of the system.

In another implementation, a model-based approach can be used by the transmitter controller. For the model-based approach, the channels to the users (e.g., mobile units) can be predicted by a mathematical model, which may also be used in conjunction with the information sent by the mobile units. The transmitter system optimizes the energy transfer to the units based on this information.

Figure 7:
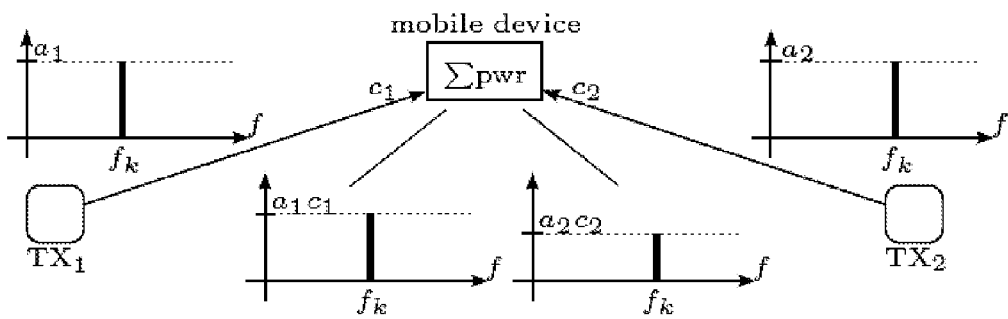
FIG. 7 illustrates a scenario for a system with two transmitters ($TX_1$ and $TX_2$) sending a carrier at frequency $f_k$ to a mobile device.

FIG. 7 illustrates a scenario for a system with two transmitters ($TX_1$ and $TX_2$) sending a carrier at frequency $f_k$ to a mobile device. The available (incident) power level at the mobile unit is $$P_{AV} = ||a_1|e^{j\angle a_1}c_1 + |a_2|e^{j\angle a_2}c_2|^2 \qquad (2.1)$$

where $a_1 \in C$ and $a_2 \in C$ are the complex transmission amplitudes of $TX_1$ and $TX_2$ and $c_1, c_2 \in C$ are the complex channel gains between the transmitters and the mobile device. The control parameters for the energy transfer are the transmitter amplitudes and phases as well as the carrier frequency. This value may be obtained by direct measurements at the mobile device or by calculations based on available measurements provided by the mobile device.

Extending equation 2.1 to l=1 . . . L transmitters, m=1 . . . M mobile devices (or device locations), and k=1 . . . K frequency components, the total power level at the m-th mobile device's location, assuming indiscriminate wide-band power harvesting by the device, can be given as $$P_{AVm} = \sum_{k=1}^{K} \left| \sum_{l=1}^{L} |a_{l,k}|e^{j\angle a_{l,k}} c_{lm,k} \right|^2 \qquad (2.2)$$

$m = 1 \ldots M$ mobile devices.

For equation 2.2, the variables are L transmitters, M mobile device positions, and K frequency components. The complex channel amplitude gain between transmitter l and a mobile device at position m, at frequency k, is given as $c_{lm,k} \in C$ (→channel transfer function at one point in frequency); the amplitude of transmitter l at frequency k is given as $|a_{l,k}| \in R$; and the phase of transmitter l at frequency k is given as $\angle a_{l,k} \in R$.

The device locations can be measured in parallel (e.g., one device per location) or traveled by one or more mobile devices consecutively. Depending on the capability of each mobile device, the device may report carrier amplitude and phase (inner part of the summation shown in equation 2.2), power per frequency component (inner summation including absolute value), or overall power (entire equation 2.2) to the transmitter system, which in turn optimizes the energy transfer based on this information.

Energy optimization for each mobile device can be obtained by the system (via an optimization and transmitter control) using any of the three possible reported measurements described above. A common power measurement technique generates the overall power value (e.g., $P_{AVm}$) and it is this value that may often be reported to the system. Accordingly, the below optimization carried out by the system is described with respect to receiving the overall power value (from equation 2.2). However, similar approaches can be used to optimize the energy transfer when other information is received from the mobile device.

When optimizing the energy available to one or more mobile devices according to equation 2.2, the M device positions in this equation can represent situations such as: several mobile devices with the same optimization goal (e.g., blocked or maximized); one mobile device with multiple antennas in each of several positions; one mobile device with one antenna; an area around the device optimized with model-based predictions; or a combination of these situations.

According to example implementations described herein, optimization may involve optimizing amplitudes $|a|$ and phases $\angle a$ for each transmitter. For example: amplitudes and phases of all transmitters at all frequency components (can be an arbitrary subset):

$$|A| = \begin{bmatrix} |a_{1,1}| & |a_{2,1}| & \cdots & |a_{L,1}| \\ \vdots & & \ddots & \vdots \\ |a_{1,K}| & \cdots & & |a_{L,K}| \end{bmatrix} \quad (2.3)$$

$$\angle A = \begin{bmatrix} \angle a_{1,1} & \angle a_{2,1} & \cdots & \angle a_{L,1} \\ \vdots & & \ddots & \vdots \\ \angle a_{1,K} & \cdots & & \angle a_{L,K} \end{bmatrix}.$$

The cost function for optimization can be derived directly from the available power level of a mobile device (e.g., equation 2.2) and be given as:

$$f_{opt}(|A|, \angle A) = f_{\overline{pos}}(P_{AVm}) = f_{\overline{pos}}\left(\sum_{k=1}^{K} \left| \sum_{l=1}^{L} |a_{l,k}| e^{j\angle a_{l,k}} c_{lm,k} \right|^2 \right) \quad (2.4)$$

where $f_{\overline{pos}}(\bullet)$ is a combination function for different mobile device positions (e.g., a sum over all positions) for the case where the mobile device has an indiscriminate wideband power harvester. For a case where the mobile device does not have an indiscriminate wideband power harvester, then the sum over frequency components can be replaced by different function (e.g., a weighted sum) in order to reflect the harvester's characteristic in the optimization.

Various combination functions may be used, depending on the optimization scenarios and the algorithm used for the optimization. Vector outputs may also be delivered for the combination function $f_{\overline{pos}}(\bullet)$ depending on the system's optimization algorithm. For the optimization, the cost function is minimized or maximized within a set of constraints, $$\operatorname*{argmin}_{|a_{l,k}|, \angle a_{l,k}} f_{opt}(\cdot) \text{ or } \operatorname*{argmax}_{|a_{l,k}|, \angle a_{l,k}} f_{opt}(\cdot) \quad (2.5)$$

$$\text{s.t. } f_{\overline{txa}}(|A|) = 1 \quad (2.6)$$
$$|a_{l,k}| \geq 0$$
$$-\pi \leq \angle a_{l,k} < \pi$$

where $f_{\overline{txa}}(\bullet)$ is an amplitude normalization function. The amplitude normalization function inhibits the optimizer from finding that an infinite amount of energy sent by at least one of the transmitters will maximize $f_{opt}(\bullet)$ and a "zero transmit" energy over the entire array will minimize $f_{opt}(\bullet)$. In the above constraints, the normalization to 1 is arbitrary; it should be understood that any transmit power can be chosen. The cost function constraints can include weights applied for different users and devices in the cost function. These constraints can be derived, at least in part, from an economic aspect of the user/device subscriptions. The economic aspects include, but are not limited to usage fees and bids or auction results.

A nonlinear constrained optimization and genetic algorithm optimization may be used to solve the cost function with constraints as provided in equations (2.5)-(2.6). It should be understood that the nonlinear constrained optimization and genetic algorithm optimization are only two out of many methods that may be used; and that the global optimum does not depend on the optimization method. According to certain embodiments, the optimization computations may be carried out by a processor (either part of the transmitter controller or otherwise available for the system). The optimization can be repeatedly performed as input is received by the system; thus, the outputs of the optimization used by the transmitter controller to adjust amplitude and gain of a signal from any of the transmitters, as needed.

The effects of some different example combination functions $f_{\overline{pos}}(\bullet)$ are provided below. The goal of the optimization is defined by the cost function. In the context of power optimization, the combination function $f_{\overline{pos}}(\bullet)$ and the amplitude normalization function $f_{\overline{txa}}(\bullet)$ can have a significant impact on the result.

The amplitude normalization function defines how the system distributes power among the transmitters. One option for $f_{\overline{txa}}(\bullet)$ is to normalize the entire transmit power of the transmitter array, $$f_{\overline{txa}}(|A|) = \sum_{l=1}^{L} \sum_{k=1}^{K} |a_{l,k}|^2. \quad (2.7)$$

Another option is to normalize the power sent by each transmitter individually:

$$f_{\overline{txa}}(|A|) = \sum_{k=1}^{K} |a_{l,k}|^2 \quad \forall l = 1 \ldots L. \quad (2.8)$$

The function can also be combined with arbitrary weights $w_{l,k} \in \mathbb{R}$ to distribute power between transmitters and between spectral components for each transmitter, e.g., $$f_{\overline{txa}}(|A|) = \sum_{l=1}^{L} \sum_{k=1}^{K} w_{l,k} |a_{l,k}|^2. \quad (2.9)$$

These weights can, for example, incorporate spectral regulations, closeness of a transmitter to a target, or be used to blank out frequencies that are used by other systems in the same spectral range. It should be understood that these are only examples. Ultimately, the choice of weights depends on spectral regulations, available resources, and on the user.

The combination function $f_{\overline{pos}}(\cdot)$ defines how the system treats the spatial domain; it is one of the major tuning parameters for the optimization. Four non-limiting examples are described below. In particular, minimizing the peak power, minimizing the average power, maximizing the average power, and maximizing the minimum ("deep fade") power are described. Of course, it should be understood that these are merely examples and do not represent an exhaustive set of options.

Example 1—Minimizing the Peak Power $$\operatorname*{argmin}_{|a_{l,k}|, \angle a_{l,k}} f_{\overline{pos}}(P_{AVm}) \text{ s.t. } (2.6) \text{ with} \tag{2.10}$$

$$f_{\overline{pos}}(\cdot) = \max(\cdot)$$

Minimizing the peak power keeps the maximum power level for all positions as low as possible. Assuming a set of M blocked users and a device that requires a certain minimum amount of power to work (taking the minimum operating power required for a device into consideration can—to the extent that is under control of the system—inhibit blocked users from operating their devices). The optimization can also be relaxed by stopping if $P_{AVm} \leq P_{thr}$ $\forall m$, where $P_{thr}$ is the devices' power threshold.

Examples 2 and 3—Minimizing and Maximizing the Average Power (Cost Functions as Follows)

$$\operatorname*{argmin}_{|a_{l,k}|, \angle a_{l,k}} f_{\overline{pos}}(P_{AVm}) \text{ or } \operatorname*{argmax}_{|a_{l,k}|, \angle a_{l,k}} f_{\overline{pos}}(P_{AVm}) \text{ s.t. } (2.6) \text{ with} \tag{2.11}$$

$$f_{\overline{pos}}(P_{AVm}) = \sum_{m=1}^{M} P_{AVm}.$$

Minimizing and maximizing the average power level over all positions is equivalent to minimizing/maximizing the sum of the power. It will thus optimize the overall power delivered to the region.

It should be noted that optimizing the average does not necessarily mean that the optimization goal is reached for all individuals. For example, maximizing the average power level will maximize the expected number of operational users, but it will not ensure that all users are above the power threshold. In case of two users, the above optimization could, for example, deliver four times the required minimum power to the first user, while the second user does not receive any power at all; the average is still twice the threshold. Conversely, the fact that the average power is well below the threshold does not mean that there are no locations with extremely high power levels.

Example 4—Maximizing the Minimum ("Deep Fade") Power

To make sure that all locations within a region are above a power threshold, the location with the minimum power in the optimization can be targeted as follows.

$$\operatorname*{argmax}_{|a_{l,k}|, \angle a_{l,k}} f_{\overline{pos}}(P_{AVm}) \text{ s.t. } (2.6) \text{ with} \tag{2.12}$$

$$f_{\overline{pos}}(\cdot) = \min(\cdot).$$

Since maximizing the average power level already maximizes the total power delivered, this means that some power is sacrificed in order to make sure that the worst spot has the highest possible power levels. As with minimizing the peak power, the optimization can optionally be stopped if the minimum power threshold $P_{thr}$ is reached, $P_{AVm} \geq P_{thr}$ $\forall m$.

In some implementations, weighted combinations of different cost functions or composite cost functions are possible, e.g., maximizing the average power available to subscribed users subject to $P_{AVm} \geq P_{thr}$ $\forall m \in$ Subscribers while at the same time minimizing the peak power delivered to blocked users.

MISO Power Optimization with Remote MIMO Power Estimation

The cost functions and optimizations (and constraints) as discussed above are also applicable to devices that do not have the ability to measure their power level (let alone channel gains or channel impulse responses). In this case, the system remotely optimizes the power level at the mobile device without explicit knowledge of the incident power. This is particularly useful for passive mobile devices (i.e., if it does not have a power source of its own) because power measurements tend to consume a lot of power and the available power levels tend to be too low for any complex operation.

Figure 8:
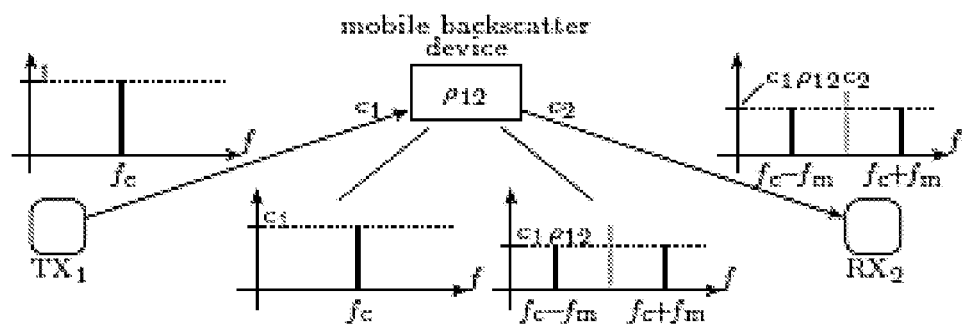
FIG. 8 illustrates a scenario of a backscatter system (with gain factors for modulated backscatter) simplified with a single transmitter and receiver.

FIG. 8 illustrates a scenario of a backscatter system (with gain factors for modulated backscatter) simplified with a single transmitter and receiver. Referring to FIG. 8, a narrowband carrier (center frequency $f_c$) that travels from $TX_1$ to a mobile device is attenuated by a complex channel gain $c_1$ (amplitude and phase shift). The backscatter device reflects this incoming signal during backscatter modulation, which can be seen as a multiplication by the complex differential reflection coefficient $\rho_{12}$. Note that there is a frequency conversion at this point, in that the frequency is switching from the carrier at $f_c$ to the modulation sidebands at $f_c \pm f_m$, where $f_m$ is the modulation frequency. On the way to the receiver, $RX_2$ in this example, the signal is further attenuated by the complex channel gain $c_2$. Between $TX_1$ and $RX_2$, the complex attenuation factor thus is $c_1 \rho_{12} c_2$. Note that the backscatter gain factor $\rho_{12}$ is a function of $f_c$ both for linear and nonlinear backscatter devices; for nonlinear devices the backscatter gain is also a function of the device's power level (particularly: frequency, incident power level, and internal power supply level). Since the backscatter device's antenna is not fully isotropic, the backscatter gain factor furthermore depends on the position of transmitter and receiver as well as on the orientation of the device.

Extending the scenario illustrated by FIG. 8 to L cooperative transceivers (e.g., the four transceivers illustrated in FIG. 6B), the narrowband MIMO gain matrix obtained by the entire transceiver system becomes $$C = \begin{bmatrix} c_1 \rho_{11} c_1 & c_2 \rho_{21} c_1 & \cdots & c_L \rho_{L1} c_1 \\ \vdots & & \ddots & \vdots \\ c_1 \rho_{1L} c_L & \cdots & & c_L \rho_{LL} c_L \end{bmatrix} + V \tag{3.1}$$

where V is additive measurement noise and $V=[v_{ln}]$ with l, n=1 ... L. The symmetry of C reflects the fact that wireless channels are reciprocal (i.e., the channel gain does not depend on the direction of travel between two points in space). Fully exploiting this symmetry also requires that the modulation frequency $f_m$ is well below the coherence bandwidth $B_c$. The matrix C then represents a system of $L^2$ equations with $L^2+L$ variables. Note that this matrix cannot be solved for $c_1$ and $\rho_{ln}$. However, solving the system is not necessary for optimizing the power level at the mobile device; this can be achieved from the backscatter channels alone. Furthermore, the backscatter channel gains $c_l \rho_{ln} c_n$ can be decorrelated if the backscatter gains $\rho_{ln}$ are known.

If $f_m$ approaches or exceeds $B_c$, then the channel gains for forward and return link are not identical any longer. This merely introduces another set of L variables. In its general form, the narrowband MIMO backscatter gain matrix between transmitters l, backscatter devices m, and receivers n, for a carrier frequency $f_k$ and with L=N transceivers, is given as:

$$C_{m,k} = \begin{bmatrix} c_{1m,k}\rho_{1m1,k}c_{m1,k} & c_{2m,k}\rho_{2m1,k}c_{m1,k} & \cdots & c_{Lm,k}\rho_{Lm1,k}c_{m1,k} \\ \vdots & & \ddots & \vdots \\ c_{1m,k}\rho_{1mN,k}c_{mN,k} & & \cdots & c_{Lm,k}\rho_{LmN,k}c_{mN,k} \end{bmatrix} + V, \quad (3.2)$$

where $c_{\bullet m,k}$ are the forward link channel gains at frequency $f_k$ and $c_{m\bullet,k}$ are channel gains at $f_k+f_m$ or $f_k-f_m$ (upper and lower modulation sideband). In total, this creates a system of $2L^2$ (not fully independent) equations of $L^2+2L$ unknown variables. The general approach for solving the problem, however, can be the same. For notational simplicity it can be assumed that $f_m \gg B_c$ and thus the simpler form of C (e.g., matrix 3.1) can be selected below.

Figure 9:
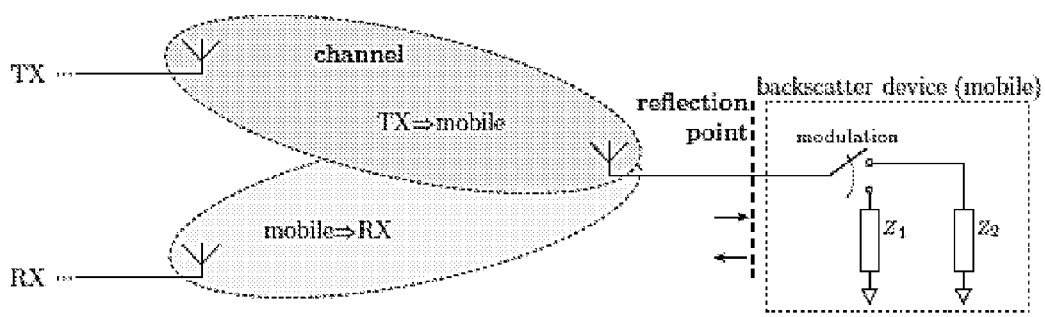
FIG. 9 illustrates channels and backscatter reflection point (simplified with a single transmitter and receiver).

The backscatter gains $\rho$ are used per backscatter channel in matrices 3.1 and 3.2 above to keep the equations generally applicable. In order to account for unknown directions of arrival, in particular in indoor multipath environments, the channels include the antenna gain patterns as well as the wave propagation in between the antennas and thus incorporate all orientation- and position-dependent effects. The backscatter reflection coefficient, on the other hand, is created solely by the relation of antenna impedance and the modulation impedances $Z_1$ and $Z_2$. It thus depends on frequency as well as on any materials in close proximity of the antenna (detuning), but not on the position of transmitter or receiver. This relationship is illustrated by FIG. 9.

For this reason the backscatter gain is identical for all connections, $\rho_{lmn,k}=\rho_{m,k}$, if all transmitters operate in the same frequency range. Only the dependence on frequency (k) and the device (m) remain. This is the standard case that covers almost all backscatter systems. If the transmitters operate at different frequencies, then the backscatter gains are identical for one transmitter, (i.e., lines in matrices 3.1 and 3.2). Multiple-antenna backscatter devices (e.g., cross-polarized) or backscatter systems employing more advanced space-time-frequency coding techniques are examples where the generic "per connection" backscatter gain may find application.

For known backscatter gains, backscatter channel decorrelation can be performed. To illustrate this approach, a solution for an ideal backscatter device, i.e., $\rho_{ln}=1$ is provided. For $\rho_{ln}=1$, the MIMO backscatter channel gain matrix becomes $$C = \begin{bmatrix} c_1 c_1 & c_2 c_1 & \cdots & c_L c_1 \\ \vdots & & \ddots & \vdots \\ c_1 c_L & \cdots & & c_L c_L \end{bmatrix} + V. \quad (3.3)$$

This is a set of $L^2$ linear equations for L variables and can thus be solved for $c_j$. The fact that the channel gains are complex complicates the calculation of a direct solution via logarithm and pseudo-inverse (nonlinear wrapping effects of the phase). The same solution in the minimum mean squared error sense, however, can also be reached by means of optimization. For this, the optimizer merely has to select a set of estimated complex channel gains $\hat{c}_l \in C$, generate an estimated MIMO gain matrix $\hat{C}$ using the Kronecker product, $$\hat{C} = \begin{bmatrix} \hat{c}_1 \hat{c}_1 & \hat{c}_2 \hat{c}_1 & \cdots & \hat{c}_L \hat{c}_1 \\ \vdots & & \ddots & \vdots \\ \hat{c}_1 \hat{c}_L & \cdots & & \hat{c}_L \hat{c}_L \end{bmatrix} \quad (3.4)$$

and solve $$\operatorname*{argmin}_{\hat{c}_l \in C} \sum_{l=1}^{L} \sum_{n=1}^{L} \|\hat{c}_l \hat{c}_n - c_l c_n\|^2 \quad (3.5)$$

for the full MIMO case or $$\operatorname*{argmin}_{\hat{c}_l \in C} \sum_{l=1}^{L} \|\hat{c}_l \hat{c}_l - c_l c_l\|^2 \quad (3.6)$$

if only the diagonal of C is taken into account (monostatic setup). The latter case does not require synchronization between transceivers and could thus also be performed by state-of-the-art UHF RFID interrogators. It is important to note here that the optimizer has access to C and its elements $c_l c_n$, but not to individual channel gains $c_l$.

Any unknown non-ideal backscatter gain $[\rho_{ln}]$ makes solving Equation 3.1 for $c_1$ and $\rho_{ln}$ infeasible. This is particularly true in a likely case of all backscatter gains being identical, i.e., $\rho_{ln}=\rho$. In this case, the system of equations is singular, (i.e., it has two solutions for each choice of $\rho$). If the backscatter gains are known, however, the above solutions can again be obtained.

Assuming prior knowledge of the backscatter gains represented by estimates $\hat{\rho}_{ln}$, C can be divided by $\hat{\rho}_{ln}$ and thus a solvable form can be obtained again:

$$\hat{C} = \begin{bmatrix} \dfrac{(c_1\rho_{11}c_1 + v_{11})}{\hat{\rho}_{11}} & \dfrac{(c_2\rho_{21}c_1 + v_{21})}{\hat{\rho}_{21}} & \cdots & \dfrac{(c_L\rho_{L1}c_1 + v_{L1})}{\hat{\rho}_{L1}} \\ \vdots & & \ddots & \vdots \\ \dfrac{(c_1\rho_{1L}c_L + v_{1L})}{\hat{\rho}_{1L}} & \cdots & & \dfrac{(c_L\rho_{LL}c_L + v_{LL})}{\hat{\rho}_{LL}} \end{bmatrix}. \quad (3.7)$$

This solution for known/pre-characterized backscatter devices does have some drawbacks for consideration. The first drawback is that $\hat{\rho}_{ln}$ act as noise gain, since $|\rho_{ln}|<1$ due to the requirement of passive backscatter. The second drawback is that the terms $\rho_{ln}/\hat{\rho}_{ln}$ create a bias if the estimates are imperfect, i.e., for $\rho_{ln} \neq \hat{\rho}_{ln}$.

Backscatter-Based Optimization of MISO Power Transfer

For cases where power or channel measurements are not available on the mobile device to which the system is attempting to transfer energy, backscatter-based optimization of MISO power transfer can be provided.

From a system point of view the remote optimization of power is a desirable feature. Remote optimization refers to optimizing the power level of a device without actively measuring the device's power level. Among others, this would also enable the remote power optimization of passive UHF transponders, which are widely used but not able to determine their own power level.

The remote power optimization works by exploiting the properties of passive backscatter signals, i.e., the modulated reflection used by backscatter devices to communicate with other devices (typically a base station). The goal is to optimize the incident power level at the backscatter device without active involvement of the device itself, specifically without measuring the optimized power level directly.

In some scenarios, the backscatter coefficient is known (e.g., characterization measurements have been or can be taken), then the system can determine the single-channel gains from the backscatter gain using the backscatter channel decorrelation for known backscatter gains techniques (e.g., equation 3.7). In such a scenario, single-channel based optimization is enabled and optimization can be performed as if the power level of the device has been provided by the device (e.g., using cost function 2.4 with constraints 2.5 and 2.6 with parameters such as provided in equations 2.7-2.12).

In some scenarios, the optimization can be performed based on the backscattered signal received by the base stations. This method is referred to as remote backscatter-based power optimization and utilizes the connection between the power available to the mobile device ($P_{AV}$) and the backscatter power levels at the receiver ($P_{RX}$).

Figure 10A:
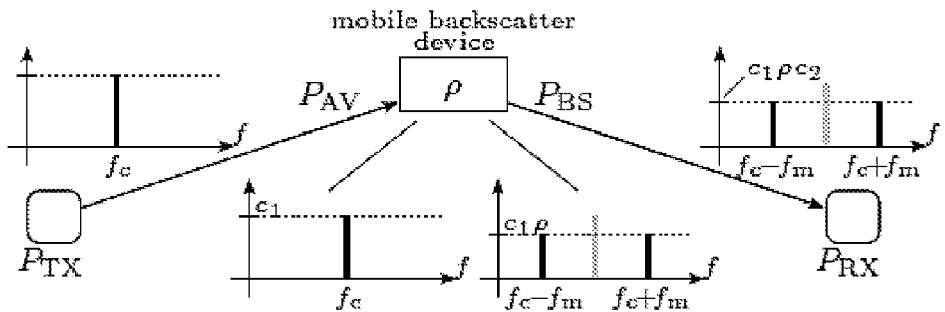
FIGS. 10A and 10B illustrate operational principles for remote power optimization with passive backscatter.

The principles of remote backscatter-based power optimization can be explained by looking at a single-transmitter, single-device, single-receiver case as illustrated in FIG. 10A. Power ($P_{TX}$) sent by a transmitter 1000 is attenuated by the wireless propagation on its way to the mobile device 1010. This is a linear operation, i.e., increasing the power output of the transmitter 1000 increases the incident power level at the mobile device 1010. The device 1010 reflects part of the incident power and backscatters the part of the incident power ($P_{BS}$) to the receiver. The frequency conversion from fc to $f_c \pm f_m$ due to the modulated backscatter is immaterial here. Subsequently, the backscattered signal travels over a linear channel again, after which it is received by the receiver 1020 at a power level of $P_{RX}$. Assuming for now that all channels and the backscatter device are linear, the transmit power level $P_{TX}$, the incident power $P_{AV}$ at the mobile device and the received power level $P_{RX}$ are connected by the squared magnitudes of the gain factors in each signal path, $c_1$ (power link) and $c_1 \rho c_2$ (backscatter link) respectively. Since all gains are linear and thus power-independent, increasing the power level at a transmitter 1000 will increase the power level at the mobile device 1010 and thus the received power $P_{RX}$ at the receiver 1020. Moreover, once again due to linearity, superposition holds and the same reasoning can be applied to the entire MIMO system and to different frequencies.

For nonlinear backscatter devices the backscatter gain becomes a function of frequency and power, $\rho(f_c, P_{AV})$, and superposition does not hold for the entire system. The nonlinearity is limited to the backscatter gain, i.e., an increased backscatter power level $P_{BS}$ still leads to an increased receive power level $P_{RX}$. This can be used for optimization provided that the nonlinearity of the gain factor does not destroy the link between $P_{AV}$ and $P_{RX}$.

Figure 10B:
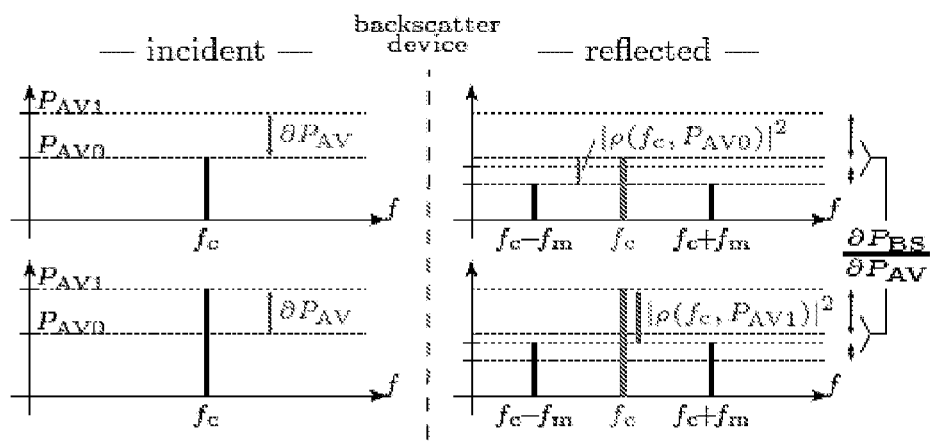

The backscattering process for nonlinear devices is illustrated in FIG. 10B. Upper and lower row correspond to different input power levels, $P_{AV0}$ and $P_{AV1}$, with difference $\partial P_{AV}$. A fully passive device is usually matched to its lowest power state. This is also where the mismatch created by switching on the modulation load is largest (see FIGS. 26A and 26B). Consequently, the power reflection coefficient $|\rho(f_c, P_{AV})|^2$ is typically larger for the lower power level. This counteracts the higher incident power level (i.e., the backscattered power may decrease for increasing incident power levels). This represents a challenge for the remote power optimization and may inhibit an optimum from being found. In order for the optimization to work, the global optimum of the incident power level at the mobile device should coincide with the global optimum of the MIMO received power, which can be fulfilled if the backscattered power is a strictly monotonically increasing function with $P_{AV}$ (i.e., $\partial P_{BS}/\partial P_{AV} > 0$).

Additional measures can be included at the receiver side to increase robustness in case the backscatter power level is not monotonic.

Remote sensing of the incident power presents the system with several challenges: 1) the optimization target is a hidden variable (the power levels after the first channel); 2) all channels c and all backscatter gains ρ are unknown, time-variant, and inherently random even from a physical perspective; and 3) the backscatter gain ρ can be highly nonlinear and highly variable due to detuning, making characterization infeasible in most cases.

Figure 11:
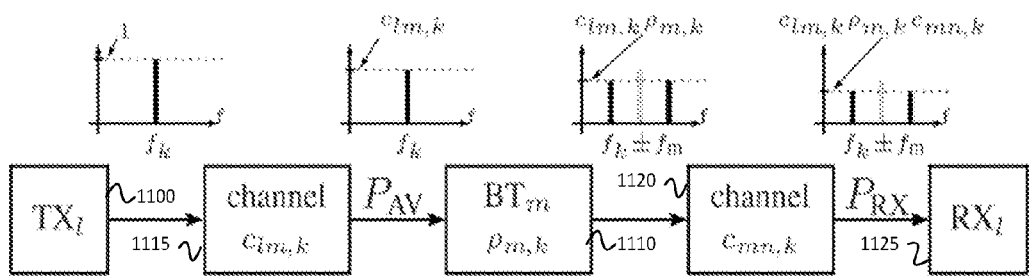
FIG. 11 illustrates narrowband backscatter channel gain factors for an energy transfer scheme.

FIG. 11 illustrates narrowband backscatter channel gain factors for an energy transfer scheme. The backscatter channel may be modeled as a concatenation of forward link channel, differential backscatter reflection coefficient, and reverse channel. A carrier at frequency $f_k$ that travels from $TX_l$ 1100 to a mobile backscatter device (or transponder) $BT_m$ 1110 is attenuated by the stochastic complex channel gain $c_{lm,k} \in \mathbb{C}$ as it propagates through the channel 1115. Transponder $BT_m$ (1110) reflects a portion of the incoming signal forming backscatter modulation, which is modeled by the complex differential reflection coefficient $\rho_{m,k} \in \mathbb{C}$. For the linear backscatter case, $\rho_{m,k}$ does not depend on incident power. The channel 1120 to the receiver $RX_n$ 1125 adds another gain, $c_{mn,k} \in \mathbb{C}$, thus resulting in an overall backscatter channel gain of $c_{lm,k} \rho_{m,k} c_{mn,k}$. Over the full system (between L transmitters and N receivers), the MIMO gain matrix (see matrix 3.7) can be obtained as $$B_{m,k} = \begin{bmatrix} c_{1m,k}\rho_{m,k}c_{m1,k} & \cdots & c_{Lm,k}\rho_{m,k}c_{m1,k} \\ \vdots & \ddots & \vdots \\ c_{1m,k}\rho_{m,k}c_{mN,k} & \cdots & c_{Lm,k}\rho_{m,k}c_{mN,k} \end{bmatrix}.$$

The individual channel gains $c_{lm,k}$ include signal shaping, antenna directivities, multipath propagation channels, as well as losses in cables. Symmetry (e.g., transmitter and receiver signal shaping are identical) and identical channel gains for energy carrier and backscatter modulation sidebands are assumed. The latter implies flat fading and places upper bounds on the backscatter modulation bandwidth (typically a few tens of kilohertz in indoor environments).

The elements of $B_{m,k}$ can be obtained directly from the constellation scaling/phase of the modulated backscatter signal at each receiver, provided that the transmit signals from $TX_1, \ldots, TX_L$ can be separated (e.g., through time-division multiple access or coding). For state-of-the art RFID readers, this can be done by switching through the transmit antennas while recording on all channels. Alternatively, if the backscatter gain matrix $B_{m,k}$ cannot be obtained, wireless power transfer can be optimized using only the power levels received at the MIMO base station (described below).

The available (incident) power level at the m-th mobile device position and frequency $f_k$, can be given as $$P_{AVm,k} = \left| \sum_{l=1}^{L} |a_{l,k}| e^{j \angle a_{l,k}} c_{lm,k} \right|^2. \quad (3.8)$$

This equation can be extended by the m-th backscatter device's differential reflection coefficient between transmitter l and receiver n at frequency $f_k$, the backscatter gain $\rho_{lmn,k}$ to obtain the power reflected by this backscatter device at frequency $f_k$ and for the link between transmitter l and receiver n:

$$P_{BSlmn,k} = \left| \sum_{l=1}^{L} |a_{l,k}| e^{j \angle a_{l,k}} c_{lm,k} \rho_{lmn,k} \right|^2. \quad (3.9)$$

From there, the backscattered signal travels over the wireless channels to the respective receivers, and the received power level at receiver n is $$P_{RXlmn,k} = \left| \sum_{l=1}^{L} |a_{l,k}| e^{j \angle a_{l,k}} c_{lm,k} \rho_{lmn,k} c_{mn,k} \right|^2. \quad (3.10)$$

Note that Equation 2.2 for on-device power sensing and Equation 3.10 for remote power sensing are identical except for one minor detail: instead of a single channel $c_{lm,k}$, the equation now contains the (possibly nonlinear) backscatter channel gain, $c_{lm,k}\rho_{lmn,k}c_{mn,k}$. Moreover, these gains are also the entries of the MIMO backscatter gain matrix C (see matrix 3.2).

If feasible, the channel gains are decorrelated and $P_{AV}$ is optimized directly. If this is not possible, then the system optimizes $P_{RX}$ instead of $P_{AV}$. This leads to the same optimum for all linear backscatter devices, and also for nonlinear devices provided that the some restrictions hold for the nonlinearity. Strictly monotonic backscatter power, $\partial P_{BS}/\partial P_{AV} > 0$, is sufficient for the optimization to lead to the same optimum in all cases. Using optimization algorithms that are able to find the global optimum in the presence of multiple local optima (i.e., stochastic algorithms such as genetic algorithms, simulated annealing, or particle swarm optimization), the only requirement is that the global optimum of $P_{RX}$ and $P_{AV}$ are identical.

For equation 3.10, the variables are L=N transmitters=receivers, M mobile device positions, and K frequency components. The complex backscatter channel amplitude gain between transmitter l, mobile device at position m, and receiver n, at frequency k is given as $c_{lm,k}\rho_{lmn,k}c_{mn,k} \in \mathbb{C}$ (→backscatter channel transfer function at one point in frequency, linearized for the current power level); and the amplitude and phase of transmitter l at frequency is given as $|a_{l,k}| \in \mathbb{R}$ and $\angle a_{l,k} \in \mathbb{R}$, respectively.

Similar to that described with respect to equation 2.2, optimization may involve optimizing amplitudes and phases of all transmitters at all frequency components:

$$|A| = \begin{bmatrix} |a_{1,1}| & |a_{2,1}| & \cdots & |a_{L,1}| \\ \vdots & & \ddots & \vdots \\ |a_{1,K}| & \cdots & & |a_{L,K}| \end{bmatrix} \quad \angle A = \begin{bmatrix} \angle a_{1,1} & \angle a_{2,1} & \cdots & \angle a_{L,1} \\ \vdots & & \ddots & \vdots \\ \angle a_{1,K} & \cdots & & \angle a_{L,K} \end{bmatrix}. \quad (3.11)$$

The target of the optimization is the backscatter link gain (e.g., $P_{AV}$) from the TX→mobile→RX (see also FIG. 6B). This value can be measured at the MIMO transceivers without the help of the mobile device (instead the mobile device only has to modulate). Instead of the power level itself, the system can also optimize solely based on changes, provided that monotony holds. Even one bit of information "better or worse" is sufficient for the optimization.

If the channel gains can be decorrelated, the cost function 2.4 may be used. Otherwise, the cost function for optimization is derived from the received power level (equation 3.10), and is given as:

$$f_{opt}(|A|, \angle A) = f_{\overline{pos}}\left( \sum_{k=1}^{K} \left| f_{\overline{rx}}\left( \sum_{l=1}^{L} |a_{l,k}| e^{j \angle a_{l,k}} c_{lm,k} \rho_{lmn,k} c_{mn,k} \right) \right|^2 \right). \quad (3.12)$$

$f_{\overline{pos}}(\cdot)$ is again a combination function for different mobile device positions and $f_{\overline{rx}}(\cdot)$ combines the signals recorded by different receivers. $f_{\overline{rx}}(\cdot)$ and $f_{\overline{pos}}(\cdot)$ can also have vector outputs (not shown here). Once again, wideband power harvesting by the mobile device (sum over frequency components) is assumed.

The cost function in Equation 3.12 may be minimized or maximized within a set of constraints, $$\operatorname*{argmin}_{|a_{l,k}|, \angle a_{l,k}} f_{opt}(\cdot) \text{ or } \operatorname*{argmax}_{|a_{l,k}|, \angle a_{l,k}} f_{opt}(\cdot) \quad (3.13)$$

$$\text{s.t. } f_{\overline{txa}}(|A|) = 1 \quad (3.14)$$
$$|a_{l,k}| \geq 0$$
$$-\pi \leq \angle a_{l,k} < \pi$$

where $f_{\overline{txa}}(\cdot)$ is an amplitude normalization function. These constraints are the same as that presented as equations 2.5 and 2.6. The amplitude normalization to 1 is again purely arbitrary; any transmit power can be chosen. In addition, cost function constraints may be included that are derived, at least in part, by economic aspects of the subscriptions.

Choice of Receiver Combination Function

The receiver combination function can be selected to best suit the MIMO processing and/or algorithm used in a particular implementation. For the illustrative example of an unknown linear backscatter device provided below, a simple summation was chosen, i.e., $$f_{\overline{pos}}(\cdot) = \sum_{n=1}^{N} (\cdot). \quad (3.15)$$

The adaptation that increases robustness for nonlinear backscatter devices with non-monotonic $P_{BS}(P_{AV})$ adds the transmitter gains to this function by applying the transmit gains again at the receiver side, $$f_{pos}(\alpha) = \sum_{n=1}^{N} (|a_{n,k}|e^{j \angle a_{l,k}} \cdot \alpha). \quad (3.16)$$

Figure 32A:
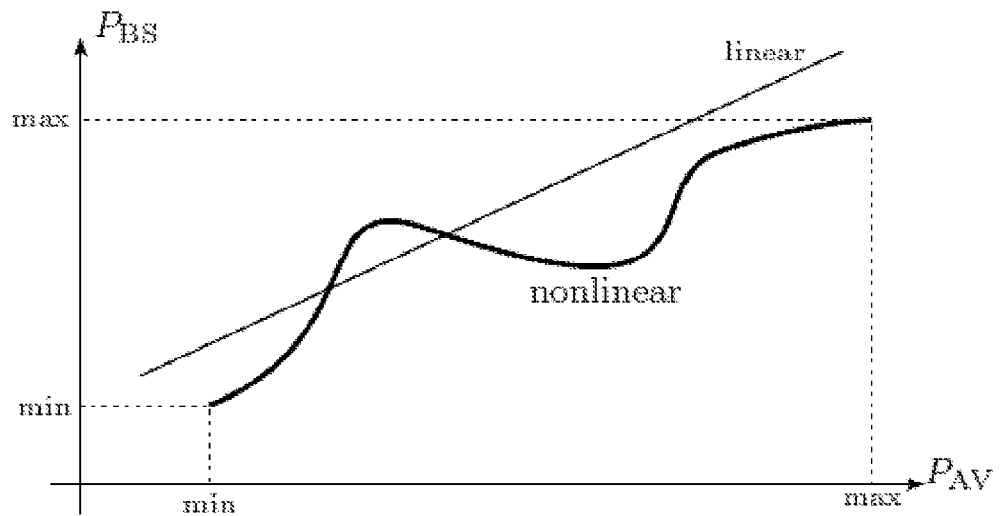
FIGS. 32A and 32B illustrate plots of nonlinearities and their effect on backscatter-based remote power optimization in which extreme values are preserved (FIG. 32A) and extreme values are not preserved (FIG. 32B).

A block diagram representation of the resulting system is provided by FIG. 32, which illustrates a mode of operation for nonlinear backscatter devices (mirroring the forward link).

In addition to selecting a receiver combination function based on the MIMO processing and/or algorithm used, the receiver combination function may also be determined by the optimizer (e.g., cost function optimization). For example, algorithms that use vectorized cost functions require a function with vector output.

Figure 12:
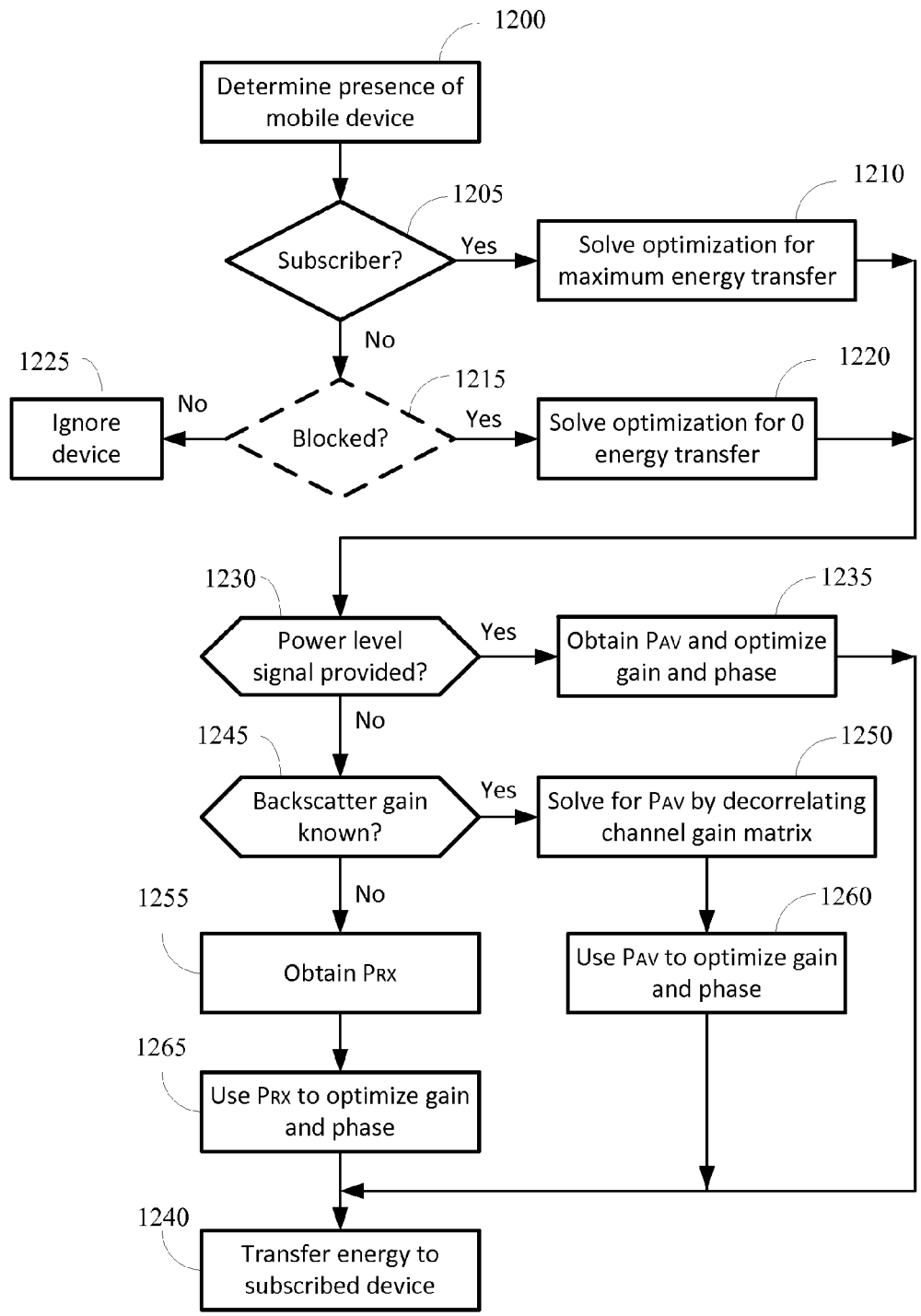
FIG. 12 is a process flow diagram of a method of subscription based MIMO wireless energy transfer according to an embodiment.

FIG. 12 is a process flow diagram of a method of subscription based MIMO wireless energy transfer according to an embodiment. At operation 1200, the system can determine the presence of a mobile device. This may be accomplished through any suitable technique, for example, by communication between the mobile device and a WiFi access point or RF reader. For any device in the vicinity (or range), the system can determine whether the device is a subscriber (1205). If the mobile device is determined to be a subscriber (for example, by matching an entry in a look-up table), then optimizations for that device are performed to enable maximum energy transfer (1210).

If the mobile device is not a subscriber (and the system is arranged to enable blocking of specific devices), the device may be a blocked device so the system also determines whether the non-subscribed mobile device is a blocked device (1215). If the mobile device is determined to be a blocked device, then optimizations for that device are performed to generate a "0" energy transfer (1220). In some cases the "0" energy transfer may not be able to achieve exactly no energy transfer, and instead achieves a minimum possible energy transfer. If the device is not a subscriber and not blocked, the system may ignore the device (1225), resulting in random incident energy to the device.

Moving to operation 1230, it is determined whether a power level signal is being provided by the mobile device. If the system receives a power level signal, then the incident power $P_{AV}$ is obtained and a gain and phase for the transmitters of the system are optimized (1235). The optimized gain and phase are used by a transmitter controller to transfer energy to the mobile device (1240).

If the power level signal is not provided by the mobile device, then it is determined whether the backscatter gain is known (1245). If the backscatter gain is known, then incident power $P_{AV}$ is determined by decorrelating a channel gain matrix (1250) and the $P_{AV}$ is used to optimize gain and phase for the transmitters (1255). The optimized gain and phase are used by a transmitter controller to transfer energy to the mobile device (1240).

If the backscatter gain is not known, then the received power level $P_{RX}$ is obtained (1260). This received power level $P_{RX}$ is used to optimize gain and phase for the transmitters (1265). The optimized gain and phase are used by a transmitter controller to transfer energy to the mobile device (1240).

Principles of Multipath Propagation

Figure 13A:
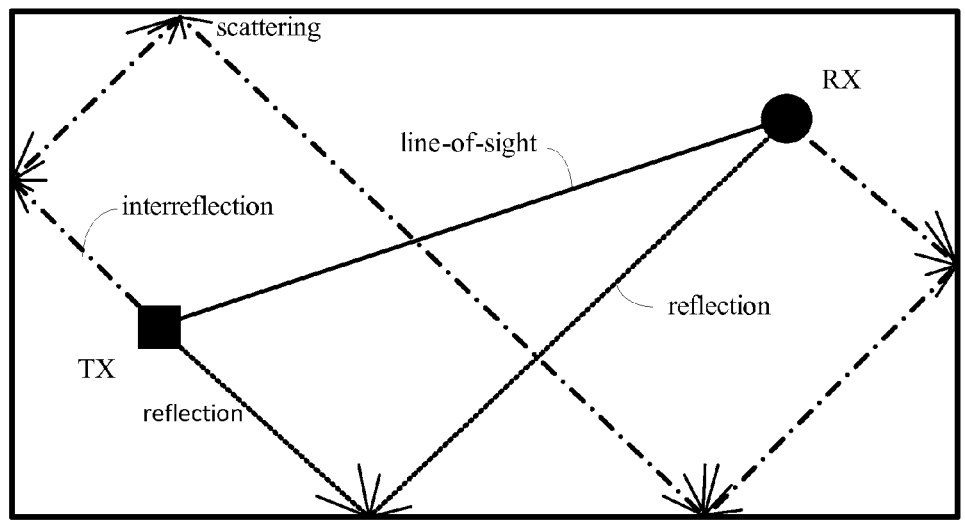
FIG. 13A illustrates multipath propagation.

FIG. 13A illustrates multipath propagation. The wireless channel between a transmitter (TX) and a receiver (RX) consists of countless individual paths (in particular in indoor environments). Among them are the direct (line-of-sight) path, reflections and interreflections in surfaces, as well as a high number of scattered components. Each path is governed by several physical effects such as free space power loss, refraction, diffraction, and waveguiding.

Figure 13B:
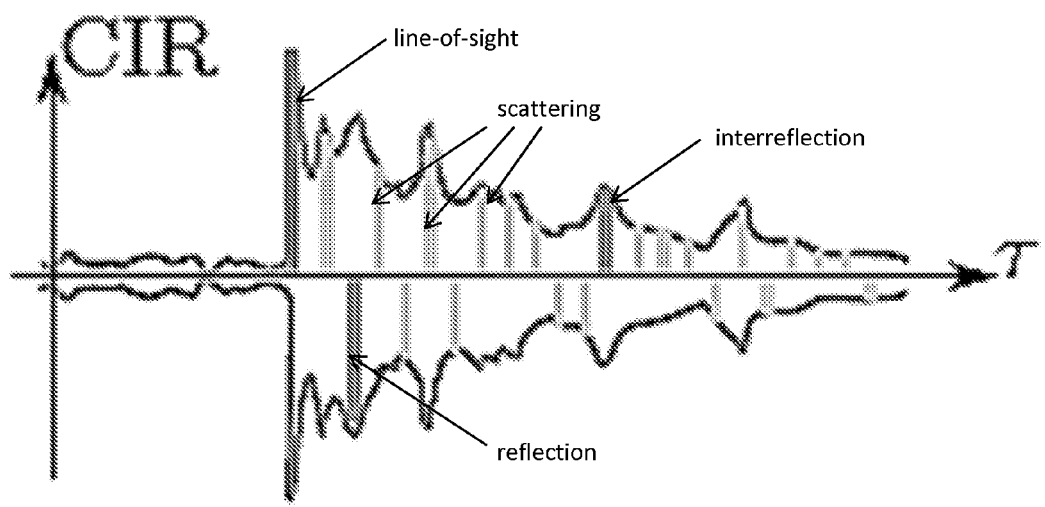
FIG. 13B illustrates a channel impulse response (CIR).

The sum of all paths constitutes the channel impulse response (CIR), for example, as shown in FIG. 13B. The CIR, due to the linearity of wireless channels, is a complete representation of the channel for a given bandwidth. Individual components of the CIR are called multipath components. The multipath components other than the direct line-of-sight component are referred to as non-line-of-sight parts of the CIR. In any realistic environment, several physical paths overlap and thus form one multipath component. This makes the CIR, and in particular the non-line-of-sight part, appear profoundly random. Notably, the non-line-of-sight part of the CIR is often dominant in indoor environments even though the line-of-sight is not blocked.

Figure 13C:
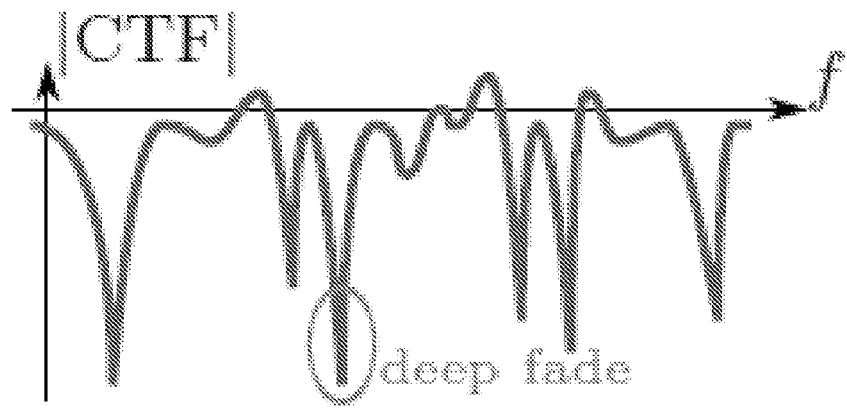
FIG. 13C illustrates a channel transfer function (CTF).
Figure 14A:
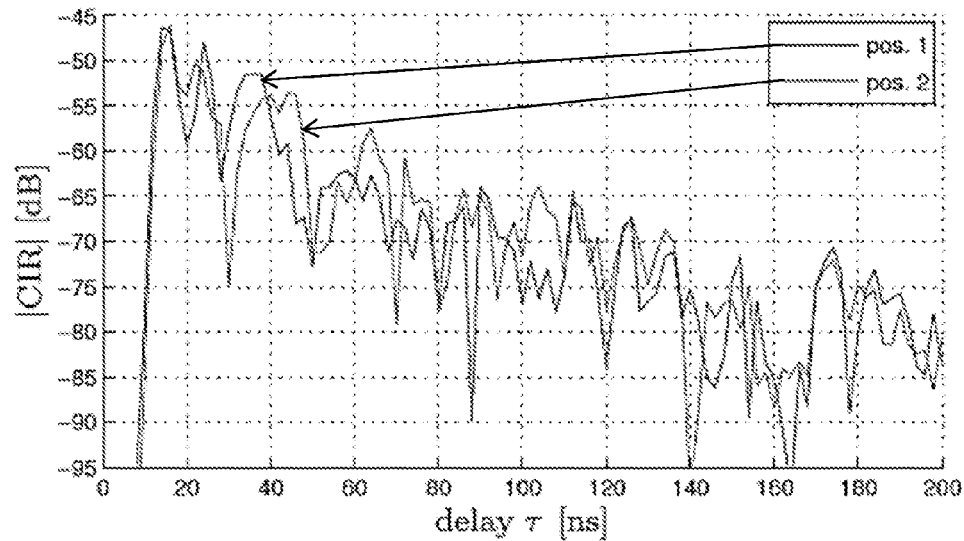
FIGS. 14A and 14B illustrate measured CIR and CTF, respectively, for two positions 1 m apart.
Figure 14B:
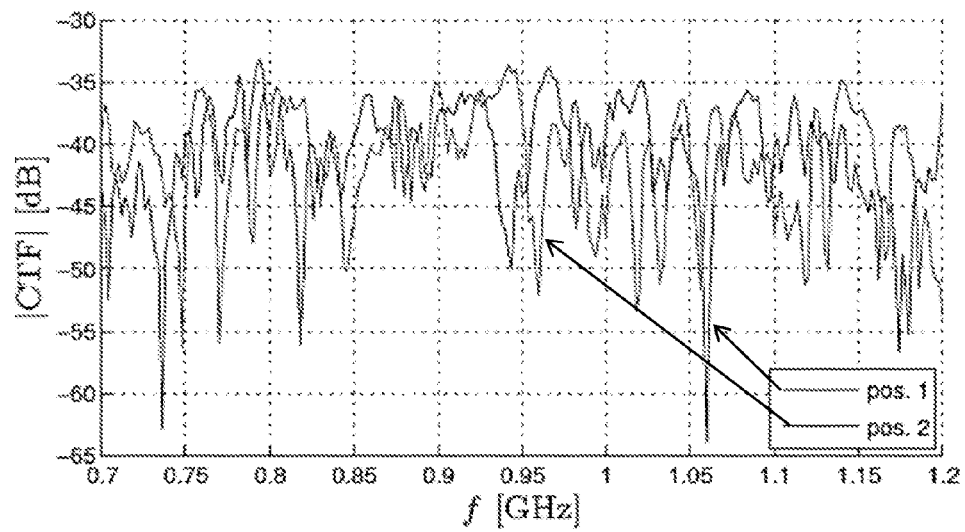
Figure 15B:
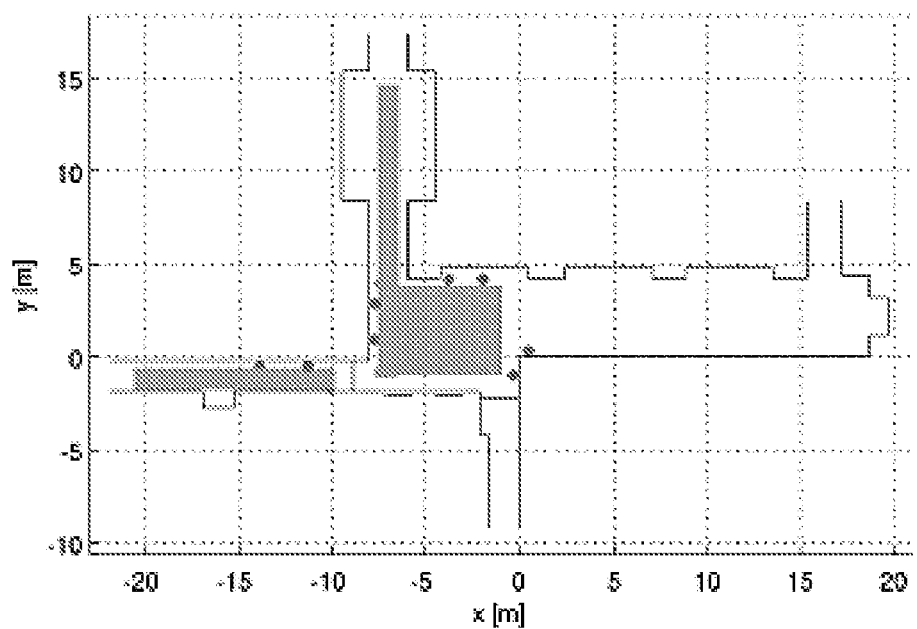
Figure 15C:
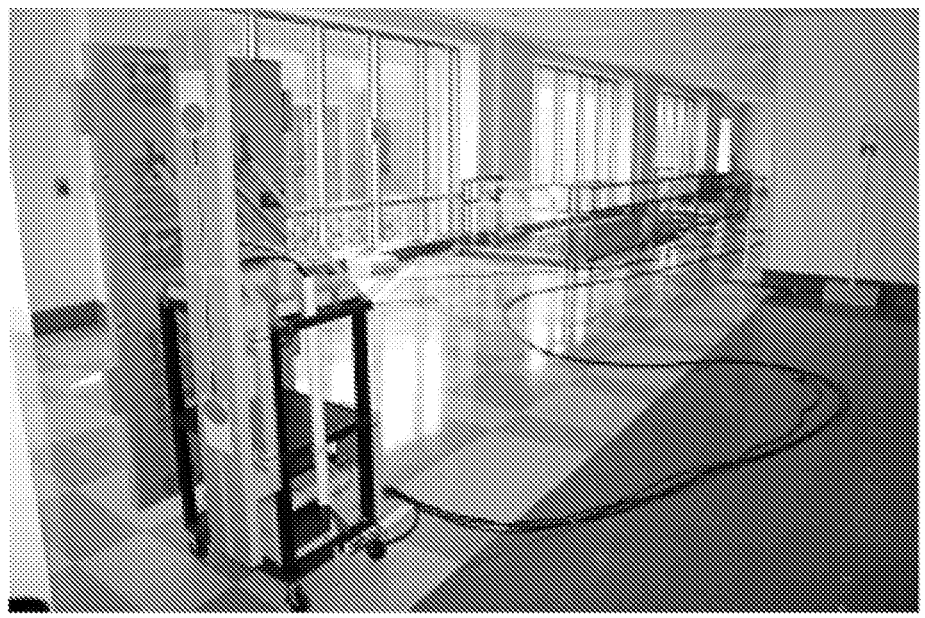
Figure 16A:
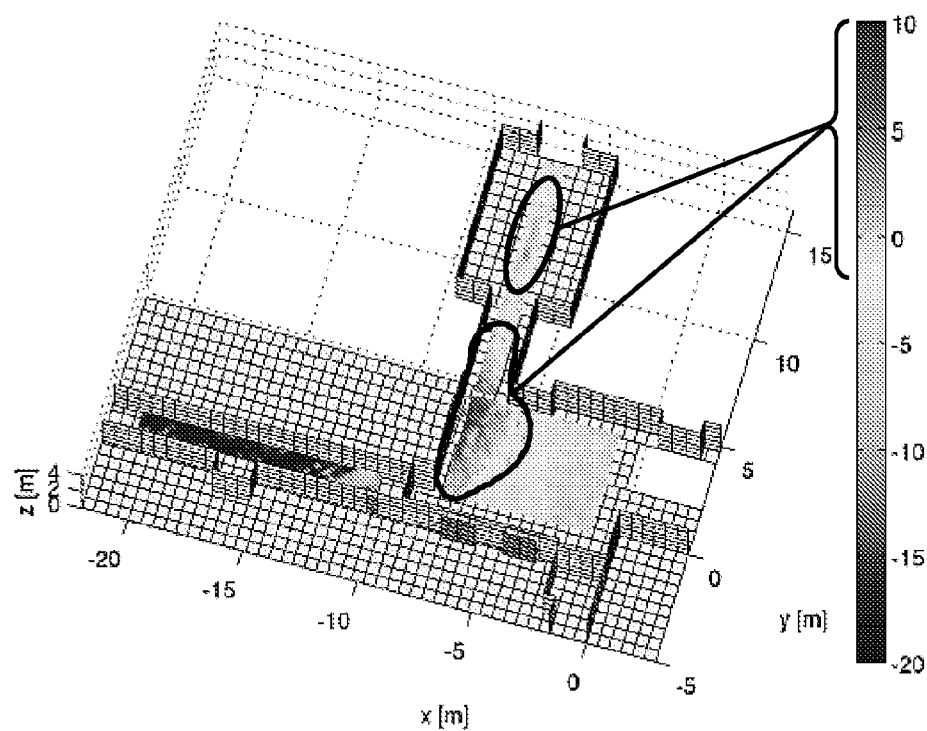
FIGS. 16A-16D illustrate wideband channel statistics in measurement area (500-1500 MHz).
Figure 16B:
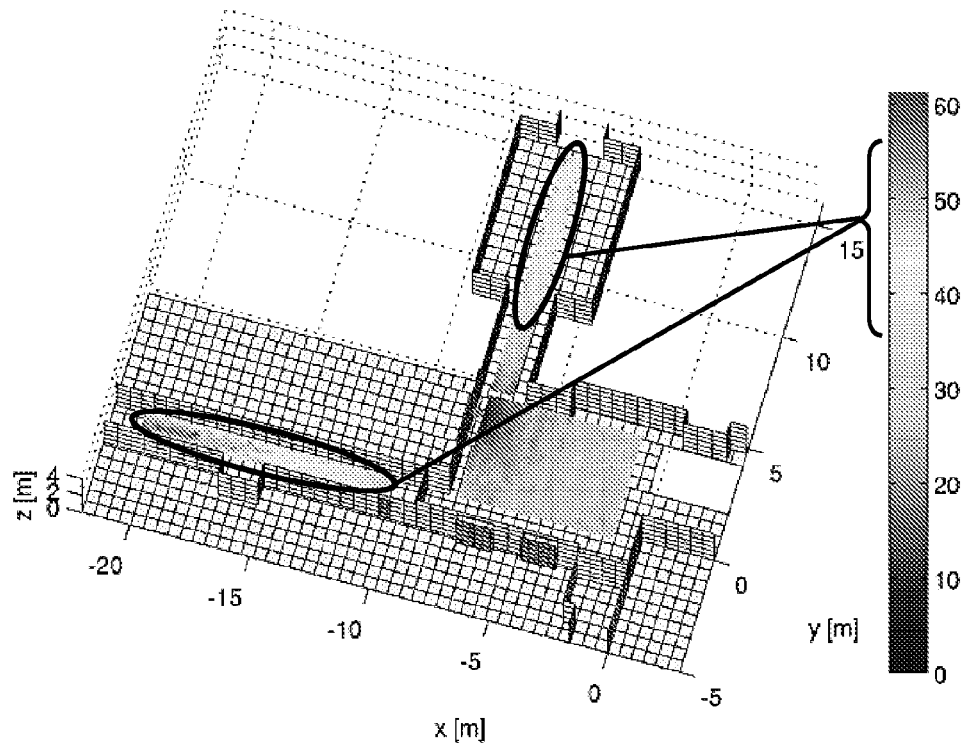
Figure 16C:
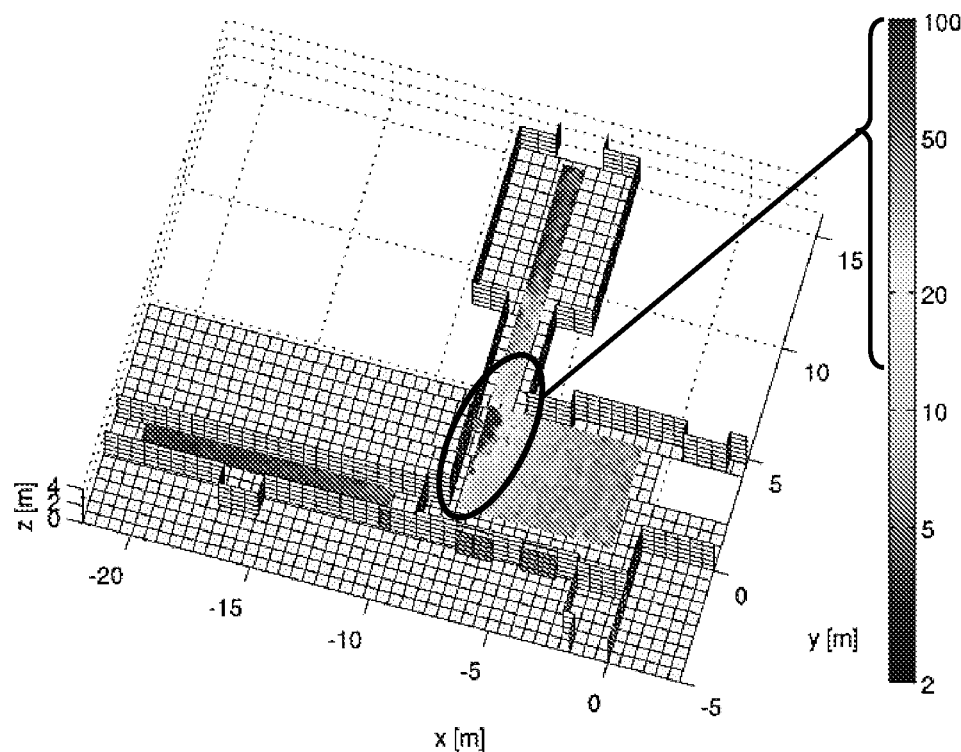
Figure 16D:
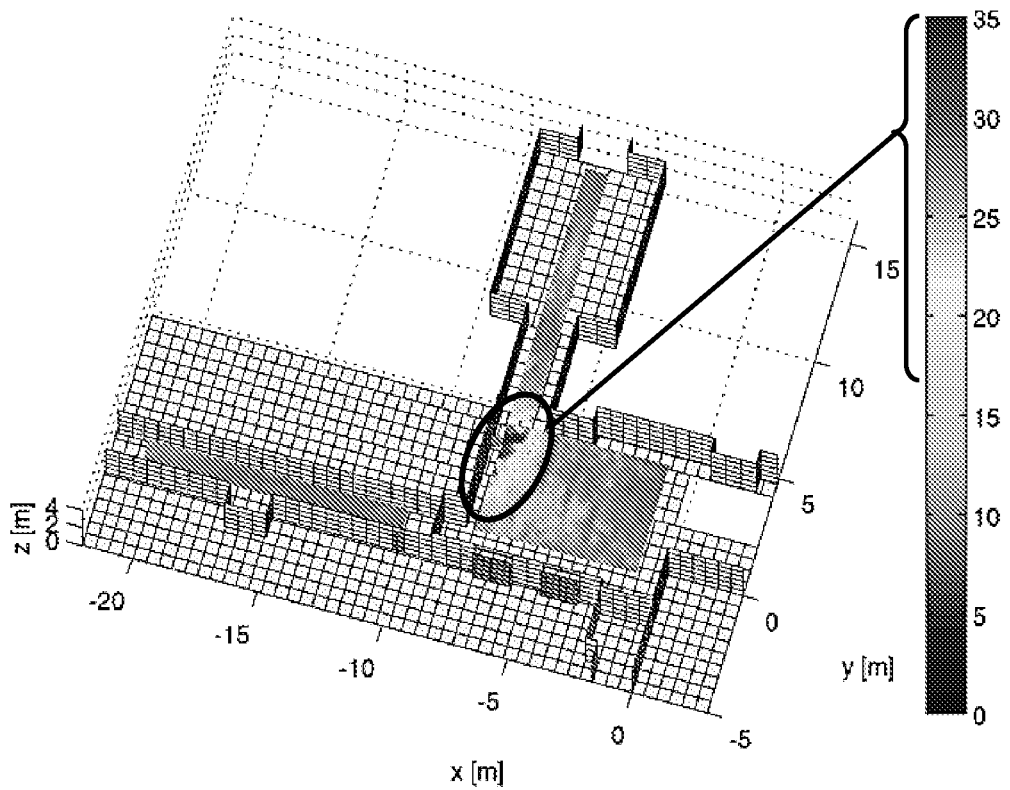

The frequency domain representation of the channel impulse response is called channel transfer function (CTF). An illustrative representation of the CTF's logarithmic magnitude ([dB]) in indoor environments is shown in FIG. 13C. A measured example of a CIR is shown in FIG. 14A and a measured example of CTF is shown in FIG. 14B. The measurements were taken from two points 1 m apart (measured in FCIEMAS building, Duke University). It can be seen from the plots that the deep fades for the first position and the second position are at completely different locations from each other.

Returning to FIG. 13C, it can be seen that the CTF has several peaks created by constructive interference between multipath components, leading to low attenuation for this frequency component, but also areas of extremely low power (deep fades) caused by destructive interference. Different positions are associated with different physical paths, causing both CTF and CIR to change quickly with position (see FIGS. 14A and 14B). Since wireless channels are usually time-variant due to changes in the environment, both CTF and CIR will also quickly change over time even without moving transmitter or receiver. In combination with the inherent randomness of CIR and CTF, this makes any prediction of which frequency component will experience a deep fade extremely difficult.

Figure 13D:
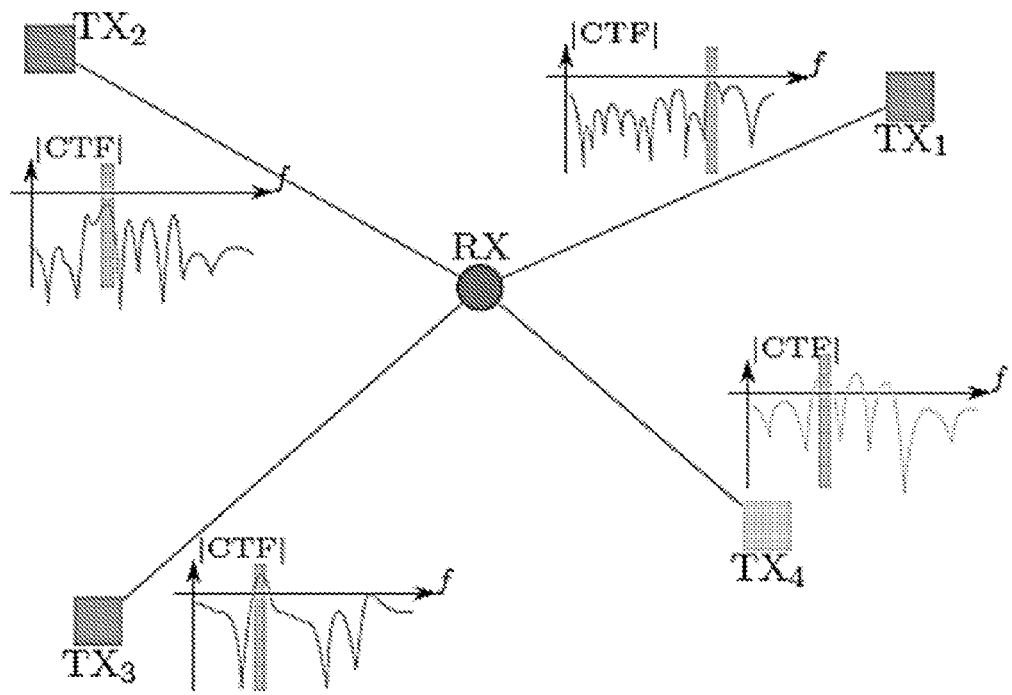
FIG. 13D illustrates multiple-transmitter energy transfer.

For multiple-transmitter power optimization, it is desirable to find an ideal set of transmitter frequencies, amplitudes, and phases, such that the energy at a particular mobile receiver is maximized or minimized as desired. FIG. 13D illustrates a simple example of a multiple transmitter to mobile device (e.g., single input) configuration. Since the system in FIG. 13D has multiple (four) inputs and only a single output (at the receiver), this configuration may be referred to as a MISO system. The MISO system may handle multiple mobile units (e.g., multiple receivers), but transfer of the energy is directed from multiple transmitters to an individual mobile unit.

Referring to FIG. 13D, each transmitter ($TX_1$, $TX_2$, $TX_3$, and $TX_4$) chooses its frequency band (indicated by the gray bands in the associated CTF plots) close to a maximum in the CTF's magnitude in order to maximize the energy observed at the receiver (RX). It should be recognized that this is a simplified example; energy transfer optimization may optimize more than the frequency band of each transmitter.

Prototype, Simulations, and Results

A transmitter system prototype was implemented and measurements were taken on the third floor of the FCI- EMAS building at Duke University (Durham, N.C., USA) using a vector network analyzer (VNA) to record channel transfer functions between 8 static transmitters and 3012 receiver locations. Photographs and a 3-D schematic drawing are shown in FIGS. 15A-15D. The measurements cover a frequency range of 100-3000 MHz. Results in this document were generated for the 902-928 MHz ISM band; wide-band results use the entire band (26 MHz), while narrowband results have been generated for a single carrier at 902 MHz.

The environment in which the system was deployed is an indoor office building, with light but dense multipath propagation. The floor and some walls are composed of reinforced concrete; most walls are drywalls. There are several large metal reflectors in the environment; most prominent among those are two large metal elevator doors and a long window front with metal-coated glass. RMS delay spreads, K-factors with respect to the line-of-sight, and coherence bandwidths for the measured locations are shown in FIGS. 16A-16D, respectively, for one of the central transmitters. The noise floor in the power-delay-profiles is between −90 dB and −110 dB for the presented measurements, depending on the line-of-sight conditions to a transmitter.

Figure 17A:
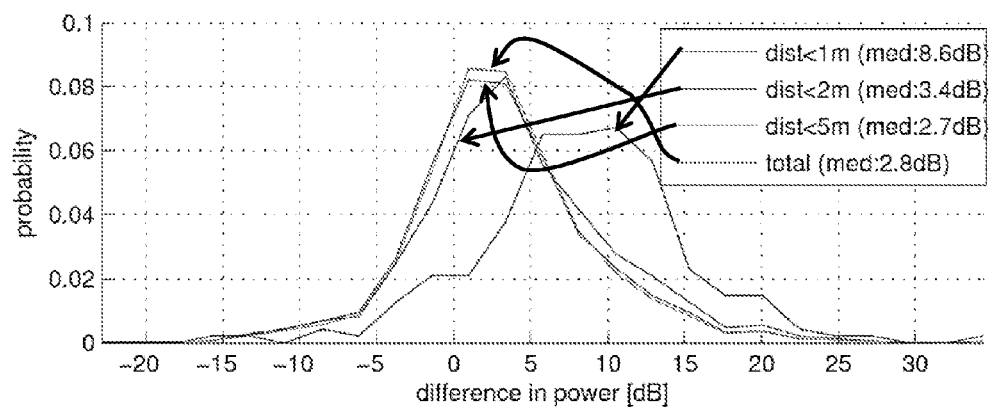
FIGS. 17A and 17B illustrate measured differences in incident power level at a mobile device when switching closest transmitter on/off (all other transmitters are on, power is normalized per transmitter) for narrowband (2 MHz) (FIG. 17A) and wideband (200 MHz) (FIG. 17B).
Figure 17B:
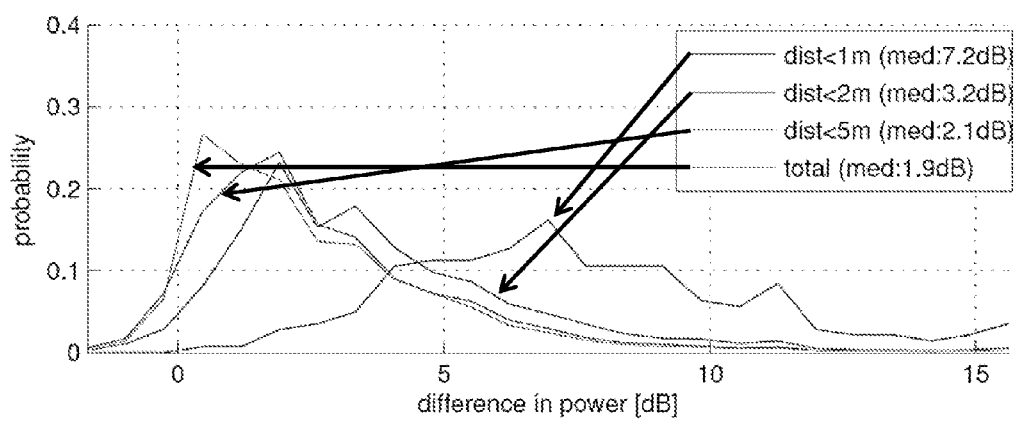

The effects on incident power level at a mobile device when switching a transmitter that is closest to the mobile device on/off are illustrated in FIGS. 17A and 17B. One of the simplest forms of influencing the incident power level at the mobile device is to switch a transmitter closest to the device on or off. Naturally, this system offers only very limited control, in particular, in multi-user environments. Nonetheless, there are significant changes in the power level for wideband and narrowband signals, as illustrated by comparing the plots of FIG. 17A (narrowband) and FIG. 17B (wideband). The assumption here is that all transmitters have identical output phase and amplitude; power is thus normalized per transmitter, i.e., switching on an additional TX will increase the overall energy transmitted.

Most notably, the effects of switching the closest transmitter on/off are largest in close proximity to the switched transmitter, with median differences in the incident power level of around 7 dB up to 1 m from the switched transmitter. This value decreases to 2-3 dB for distances smaller than 5 m to the transmitter. Note that the power level can also decrease if the transmitter is switched on due to destructive interference. The probability of decreasing the power level and the amount of this decrease are considerably smaller for the wideband system.

Figure 18A:
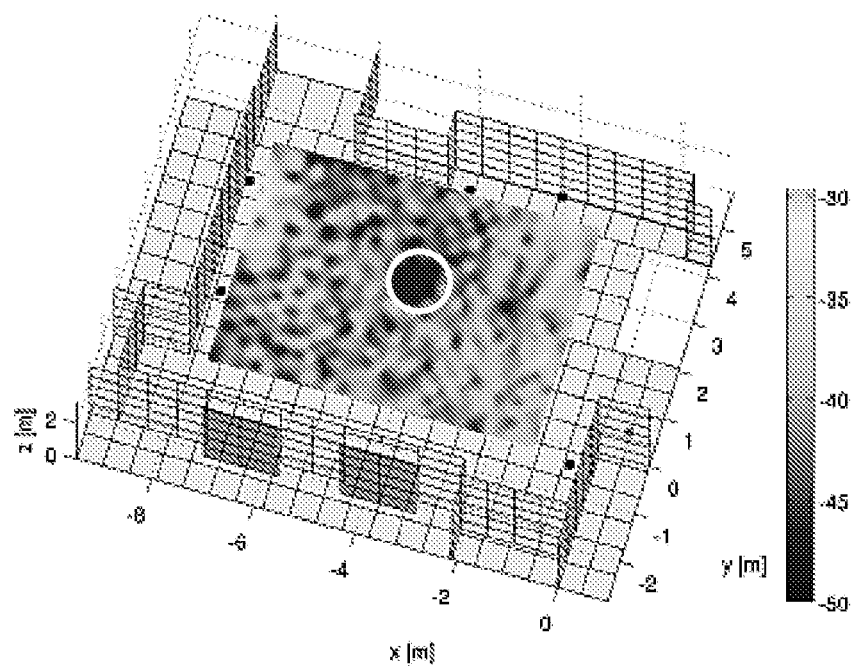
FIGS. 18A-18D illustrate measured power distribution when optimizing the power within the marked area (bandwidth: 26 MHz, diameter of optimized region: 100 cm).
Figure 18B:
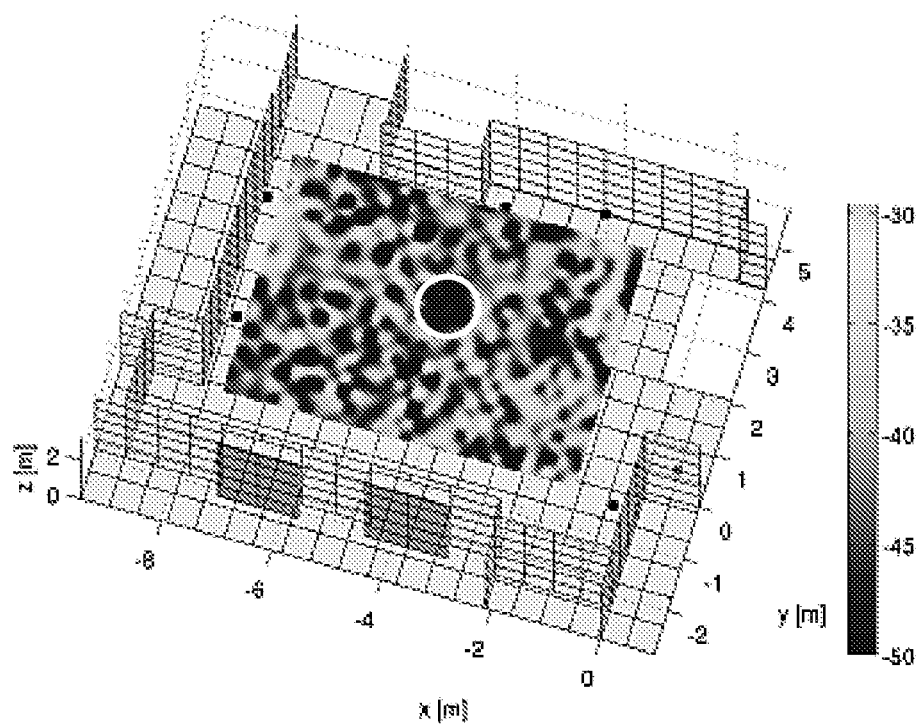
Figure 18C:
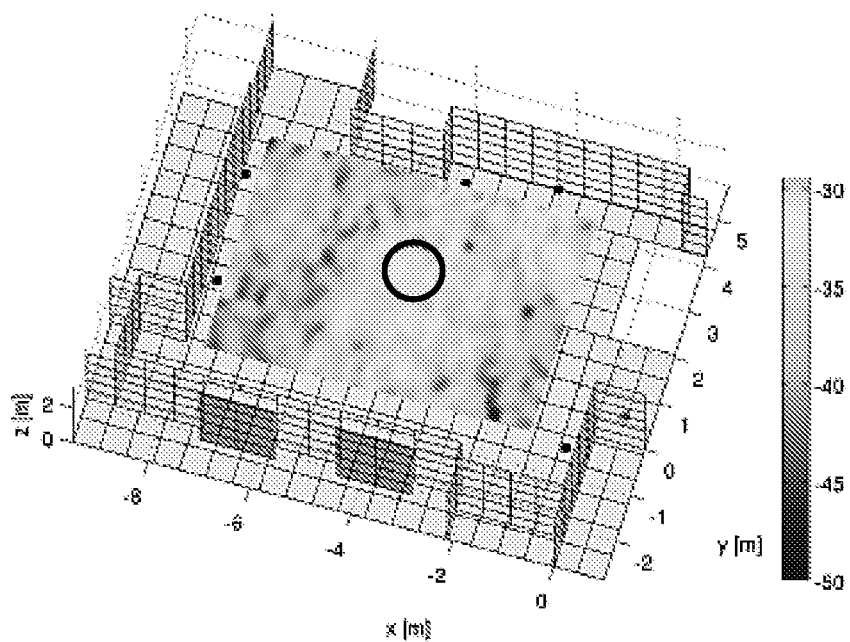
Figure 18D:
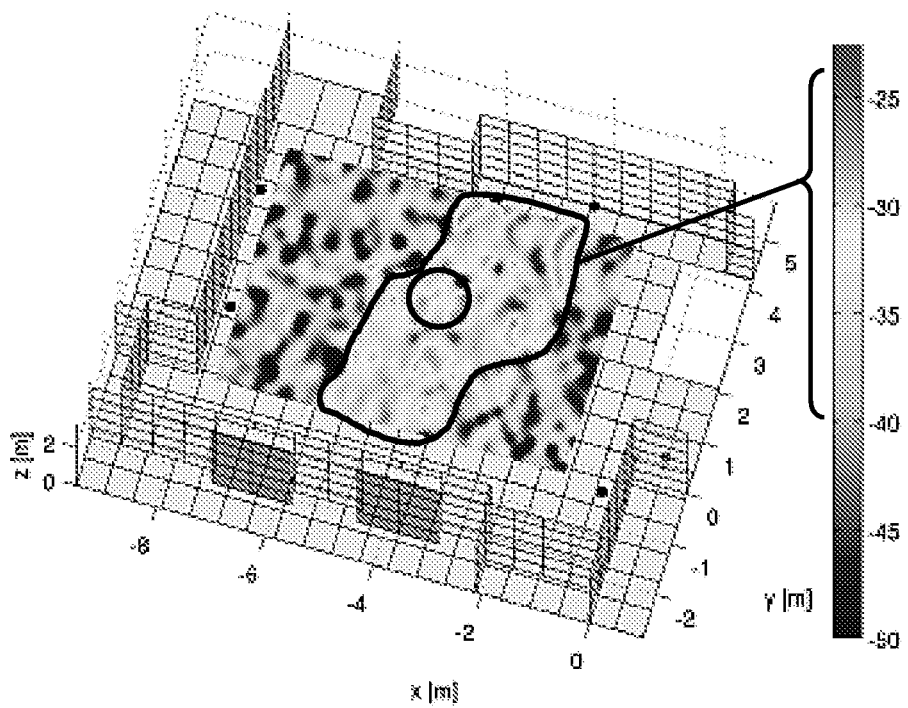

The effect of different cost functions are explored in FIGS. 18A-18D. FIG. 18A illustrates minimized peak power, FIG. 18B illustrates minimized average power, FIG. 18C illustrates maximized minimum power (deep fades), and FIG. 18D illustrates maximized average power.

Spatial distributions of incident power levels for optimized transmitter amplitude/phase settings are shown in FIGS. 18A-18D. The settings for each plot shown in FIGS. 18A-18D was been created using a different cost function, minimizing/maximizing averages or extreme values in a region with 100 cm diameter (approx. three wavelengths at 900 MHz, marked by a circle in the plots). Transmit power levels are kept constant over the entire MISO array with six transmitters using equation (2.6) as the constraint for the cost functions.

The plots clearly show that the power level inside the optimized region is different from the power levels in all other areas, in particular for minimization (FIG. 18A). It should be noted that maximizing the power in a certain region does not necessarily mean that this region will have the highest power in the entire area (see FIG. 18D), but only that the power in this area is as high as possible within the given constraints (number and position of transmitters, frequency region, etc.).

Targeting extreme values (peak and minimum power) generally leads to a considerably smoother solution. This is because the system tries to avoid large peaks or deep fades and thus resorts to a more wideband solution. Optimizing average values (and thus allowing narrowband energy transfer) leads to comparably higher average power values in maximization and to lower average power values in minimization. The system thus clearly sacrifices average power values in order to reach the target of optimizing extreme values.

Figure 19A:
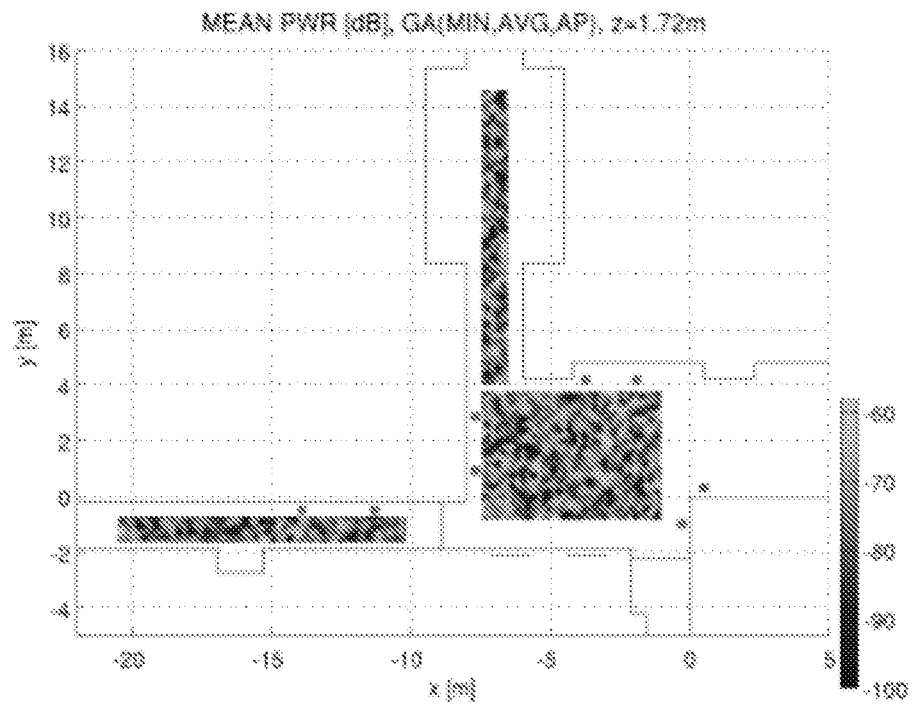
FIGS. 19A and 19B illustrate measured optimized power levels relative to average power in a location (bandwidth: 2 MHz, diameter of optimized region: 20 cm).
Figure 19B:
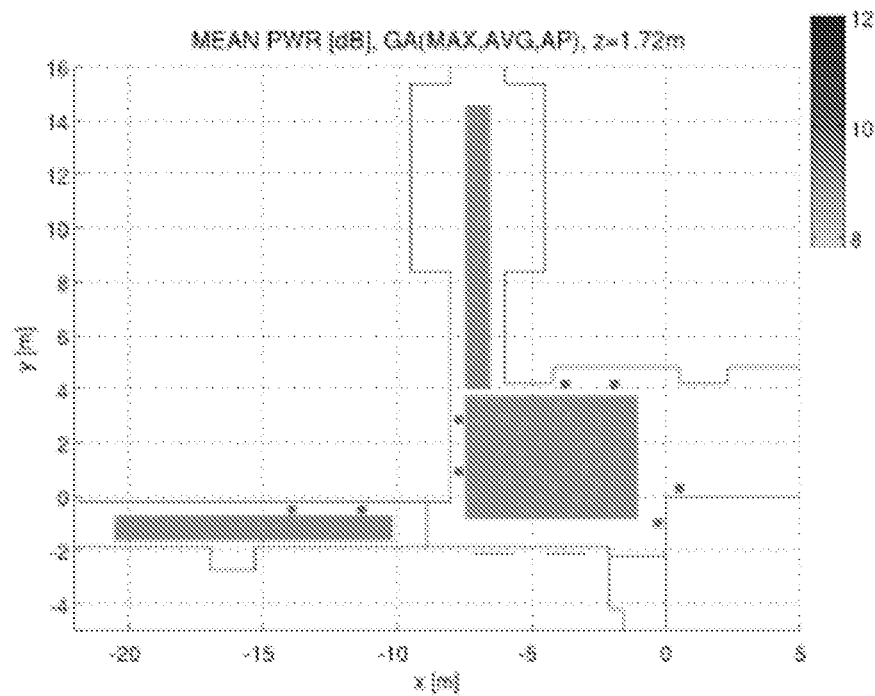

The achievable single-user dynamic range for narrowband energy transfer (2 MHz bandwidth; 20 cm diameter for optimized region) is shown in FIGS. 19A and 19B. The maximized power level is consistently 9 dB above the average (random) power level throughout the environment. At the same time, the power can be reduced to 60 to 90 dB below the average power. Note that this result is identical throughout the environment, i.e., does not depend on a high number of transmitters being close-by.

Figure 20A:
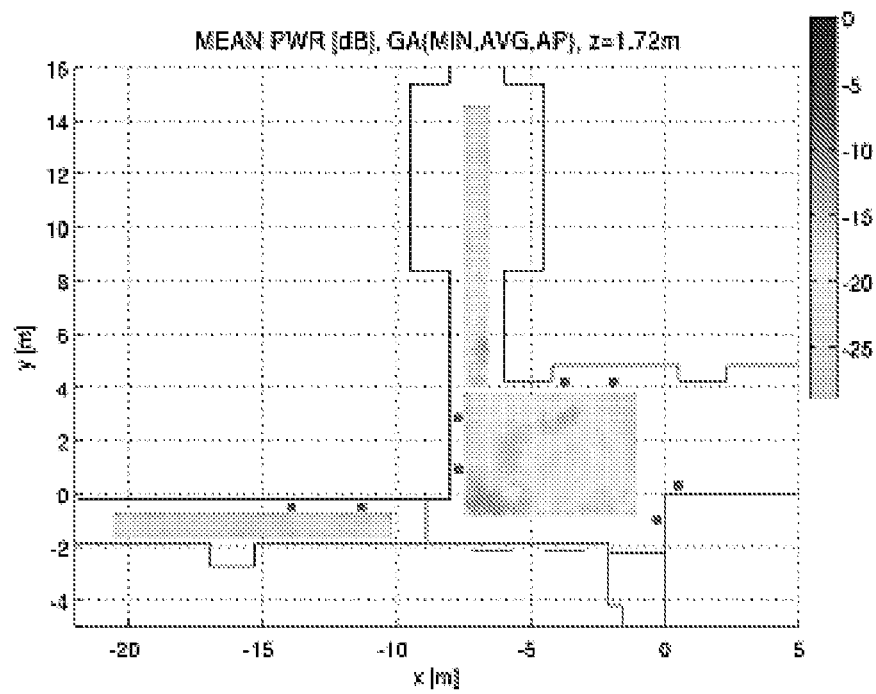
FIGS. 20A and 20B illustrate measured optimized power levels relative to average power in a location (bandwidth: 2 MHz, diameter of optimized region: 100 cm; plots show mean power in region).
Figure 20B:
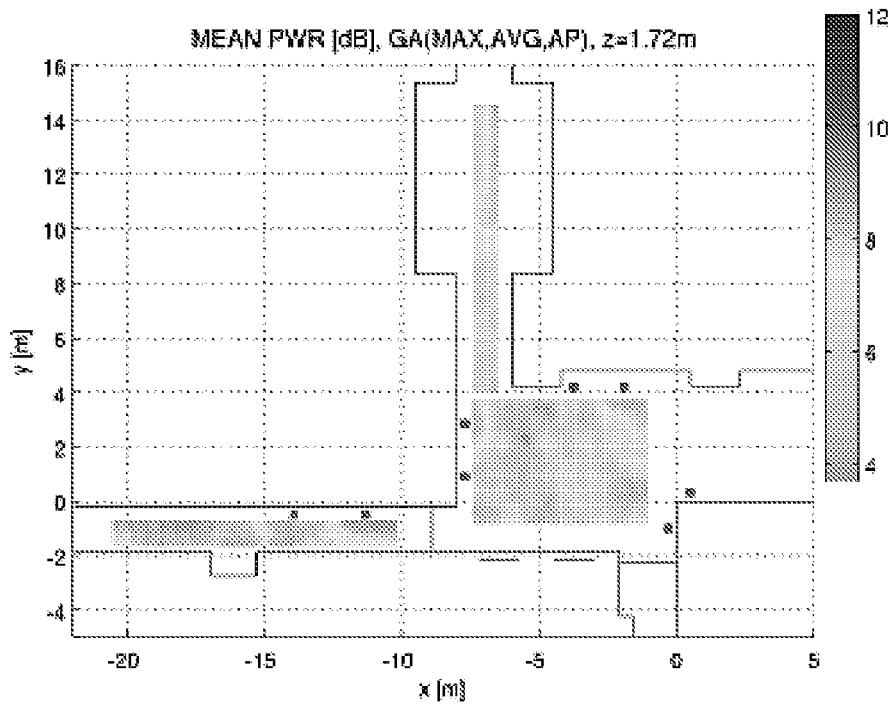

The dynamic range decreases with the number of objectives, i.e., locations to optimize. Optimizing the average power level in a region 1 m across still results in power levels of −20 dB (minimization) to 6 dB (maximization) relative to the average (expected) level, as illustrated in FIGS. 20A and 20B (2 MHz bandwidth; 100 cm diameter). Note that the worst-case dynamic range here is still 15 dB. The 1 m diameter represents more than three wavelengths at the given frequency range. A region of this size already contains several minima and maxima (see FIGS. 18A-18D).

Figure 21A:
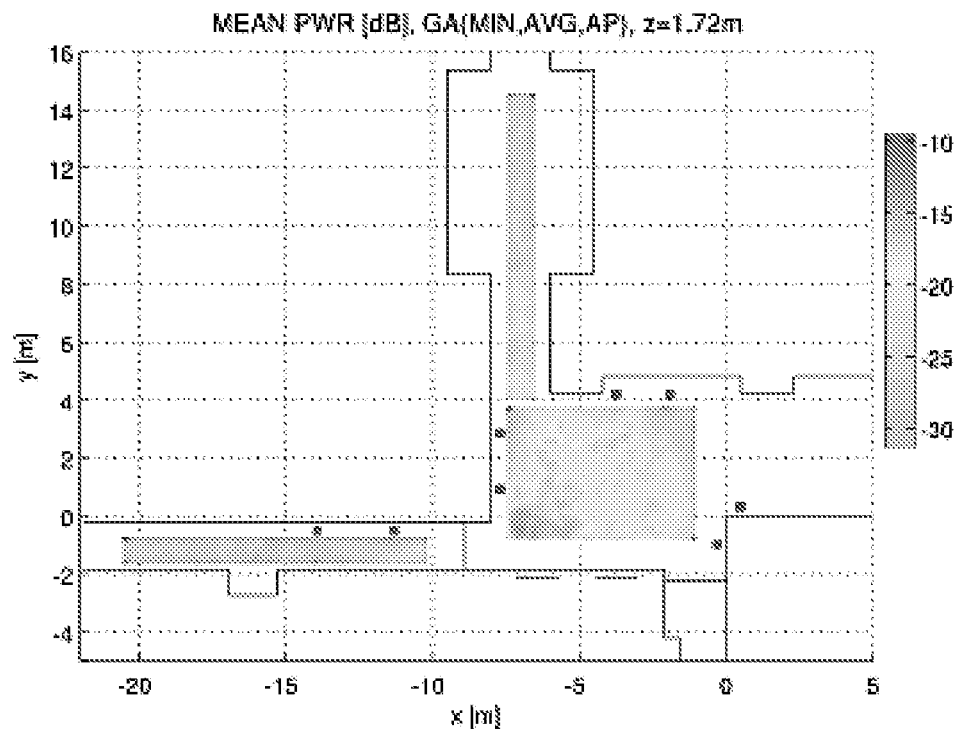
FIGS. 21A and 21B illustrate measured optimized power levels relative to average power in a location (bandwidth: 26 MHz, diameter of optimized region: 100 cm; plots show mean power in region).
Figure 21B:
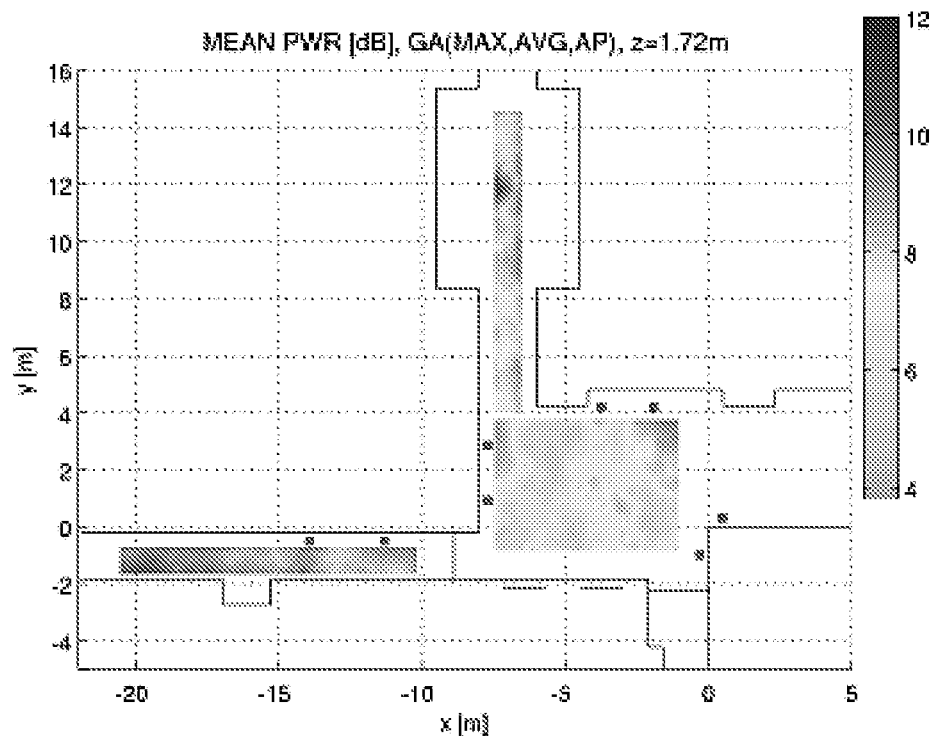

Increasing the bandwidth to 26 MHz compensates for some of the problems with large-region (multi-objective) optimization, in particular for power maximization. The 26 MHz bandwidth represents a larger than average coherence bandwidth in this area, which is around 10 MHz (see e.g., FIG. 16C). For a bandwidth of 26 MHz the achievable dynamic range increased by several dB to 20-40 dB (depending on location) (see FIGS. 21A and 21B). The higher dynamic range compared to the narrowband optimization is due to higher maximum power levels as well as lower minimum power. It should also be mentioned that the minimum power level in particular might not be the global optimum. Multiple runs of the optimization have produced slightly different results (by a few dB).

Figure 22A:
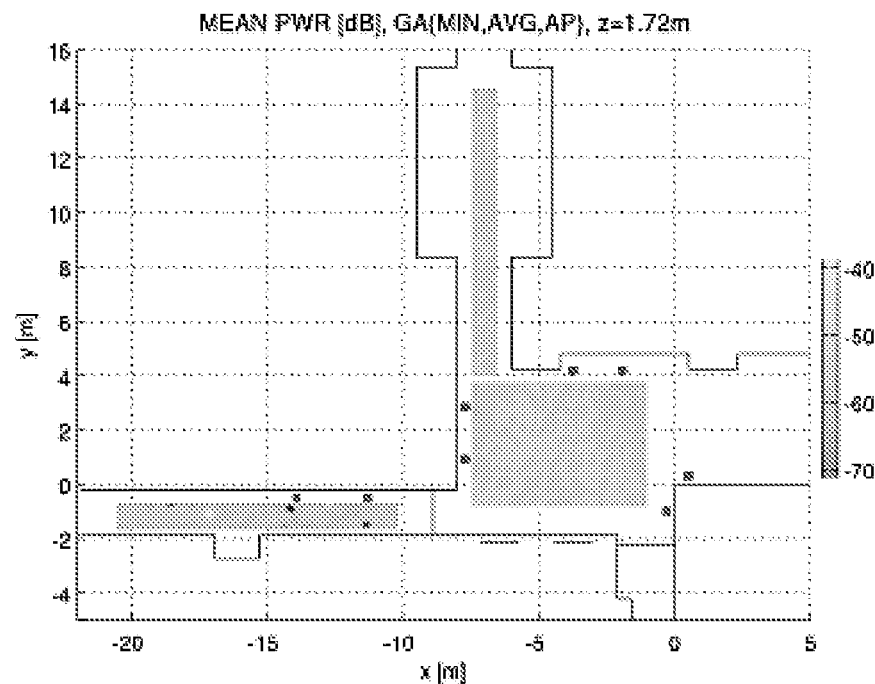
FIGS. 22A and 22B illustrate measured optimized power levels relative to average power in a location (bandwidth: 26 MHz, diameter of optimized region: 20 cm).
Figure 22B:
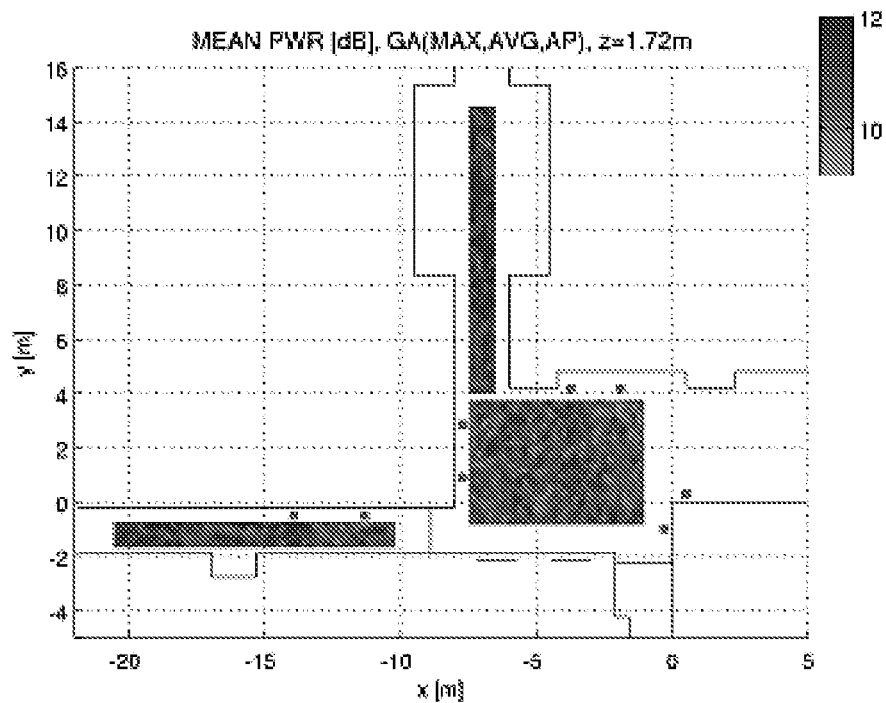

The increased bandwidth also increases the achievable maximum power level for smaller regions, as illustrated by FIGS. 22A and 22B. Here, the changes in the maximum power level are the most noticeable (plus 2-3 dB). The minimum achievable power level, on the other hand, deteriorates by 30 dB compared to the 2 MHz system. This is due to the much larger search space for the higher bandwidth. In other words: the plot does not represent the global optimum. The genetic algorithm used for these plots tends to keep results wideband, thus not performing very well for small areas with large bandwidths. Preliminary tests with particle-based approaches have shown that the minimum power levels of FIG. 19A can be achieved. It can be intuited that the global optimum for a larger search space cannot be worse that the global optimum of any subspace within the larger space. Spending more time for optimization thus again decreases the minimum power level to around −80 dB, leading to a dynamic range of 90 dB and above. Also, note that even with the higher minimum power levels the dynamic range is still around 60 dB (i.e., a million to one).

Figure 23A:
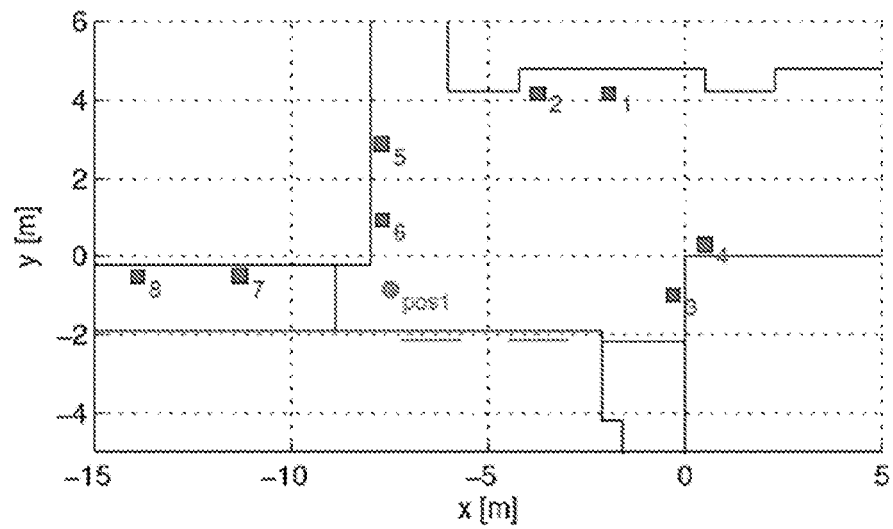
FIG. 23A illustrates an 8×8 MIMO system.
Figure 23B:
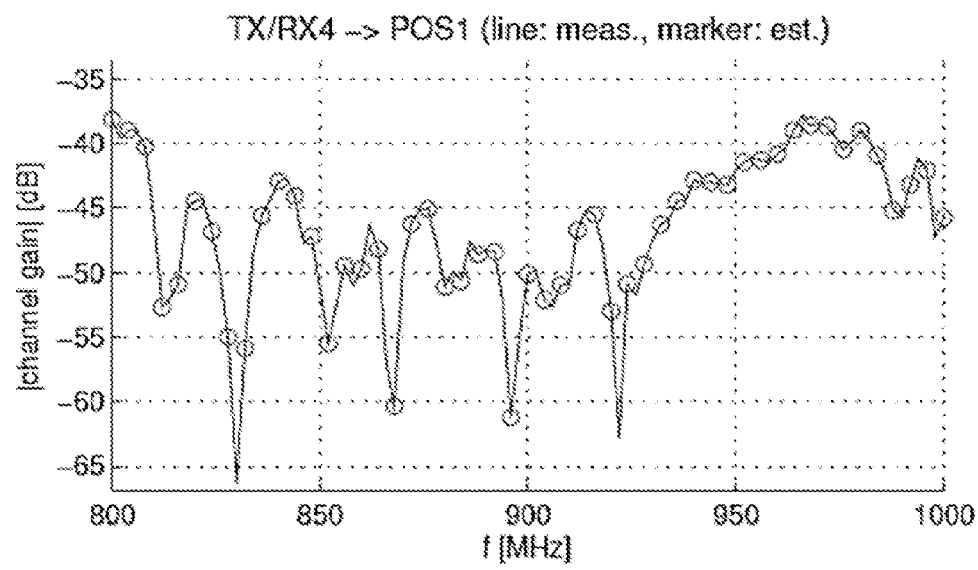
FIGS. 23B-23D illustrate the decorrelation of individual channel gains from backscatter channel for an ideal backscatter device in the system shown in FIG. 23A.
Figure 23C:
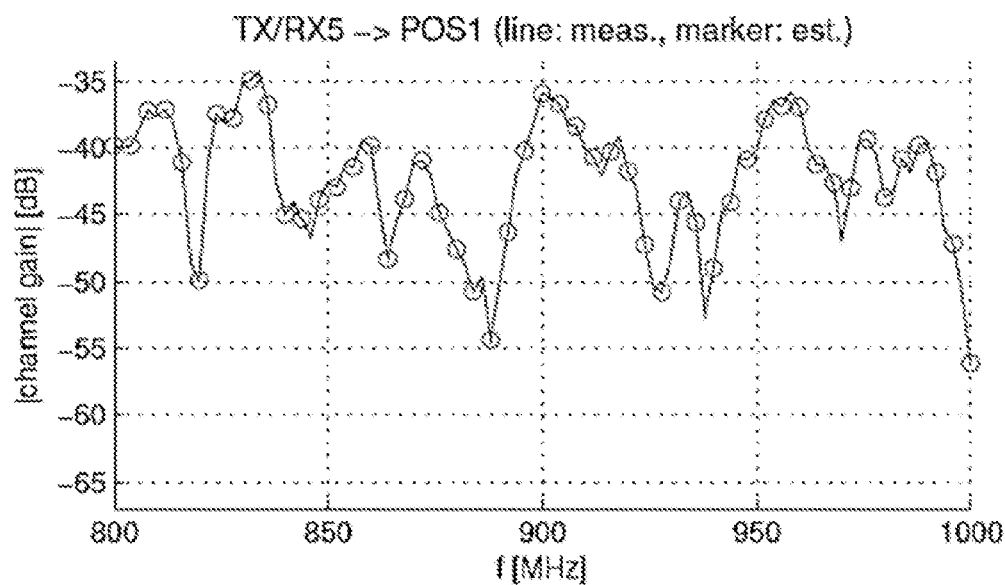
Figure 23D:
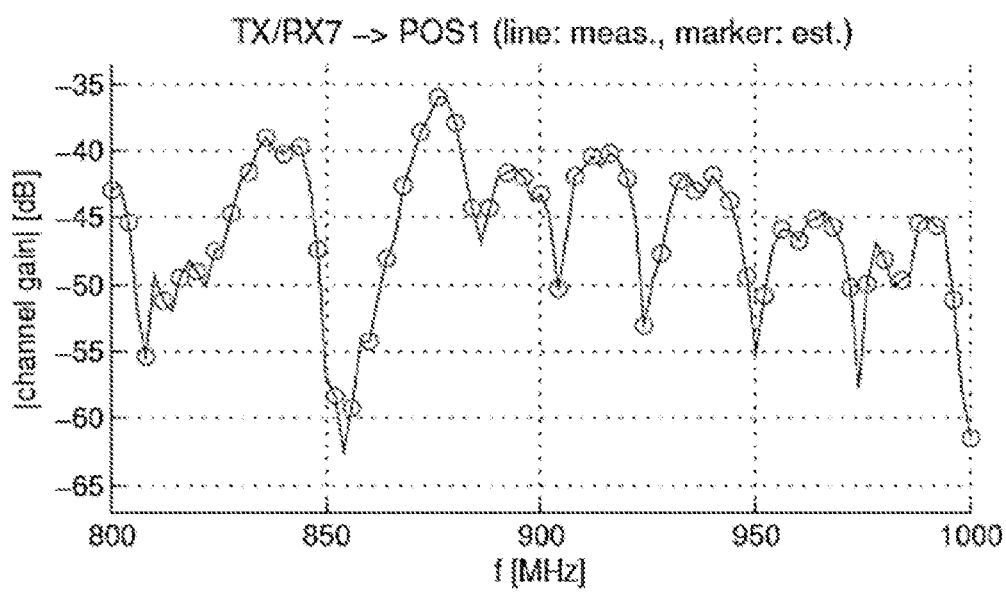

A MISO power optimization may be carried out with MIMO power estimation. FIG. 23A illustrates an 8×8 MIMO system. FIGS. 23B-23D illustrate the reconstruction of the channel transfer function (CTF) magnitude—i.e., $|c_l|$ over frequency—for measured channels around the 915 MHz ISM band using the 8×8 MIMO system arranged as illustrated in FIG. 23A. Note that the CTFs show several deep fades, that $c_l$ very much depends on frequency, and that the channels to the individual transceivers are very different.

Figure 24A:
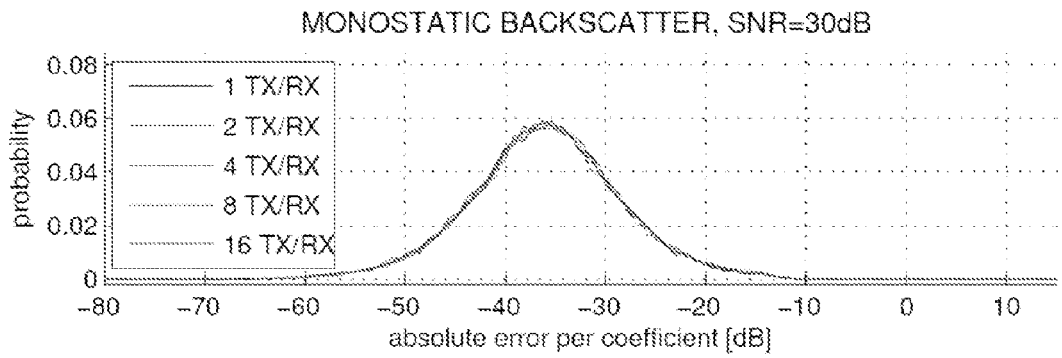
FIGS. 24A-24D illustrate decorrelation of individual channel gains from backscatter channel for ideal backscatter characteristics.
Figure 24B:
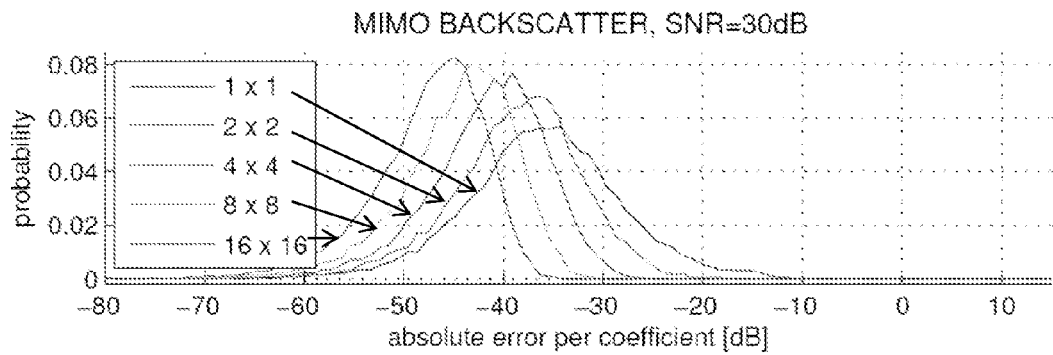
Figure 24C:
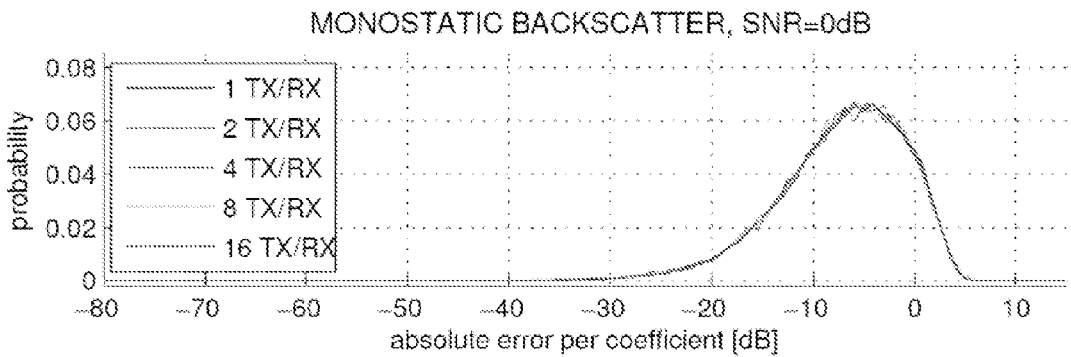
Figure 24D:
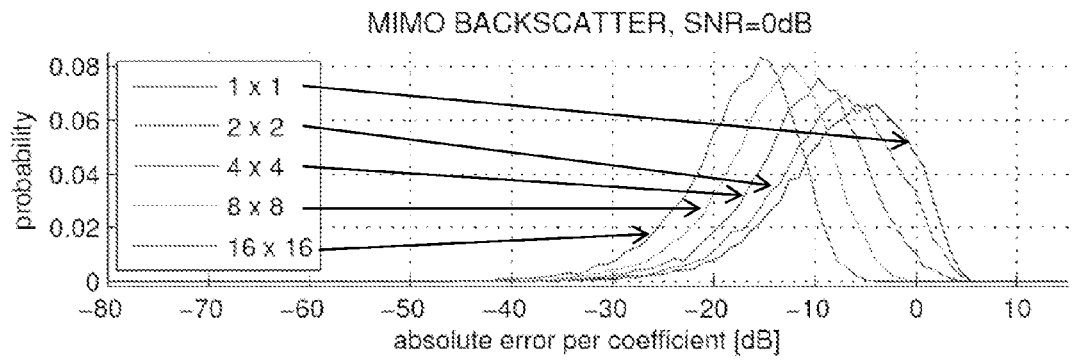
Figure 25A:
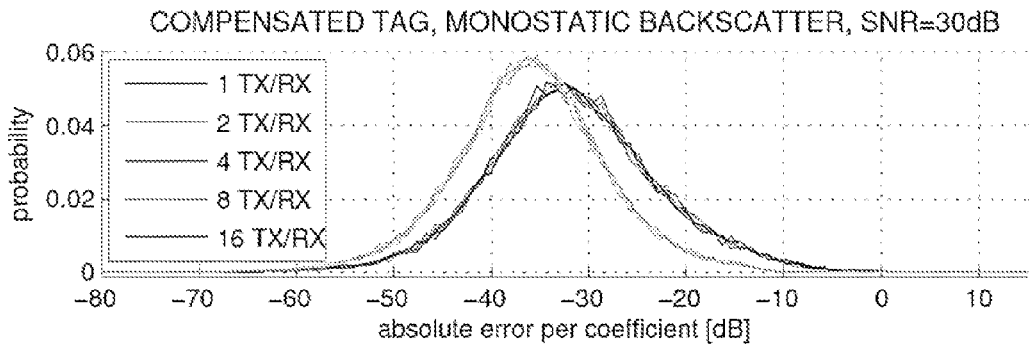
FIGS. 25A-25D illustrate decorrelation of individual channel gains from backscatter channel for known backscatter device ("tag") characteristics.
Figure 25B:
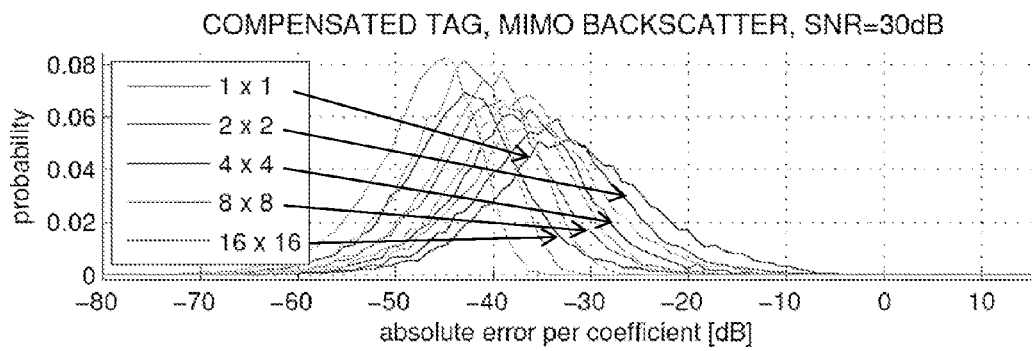
Figure 25C:
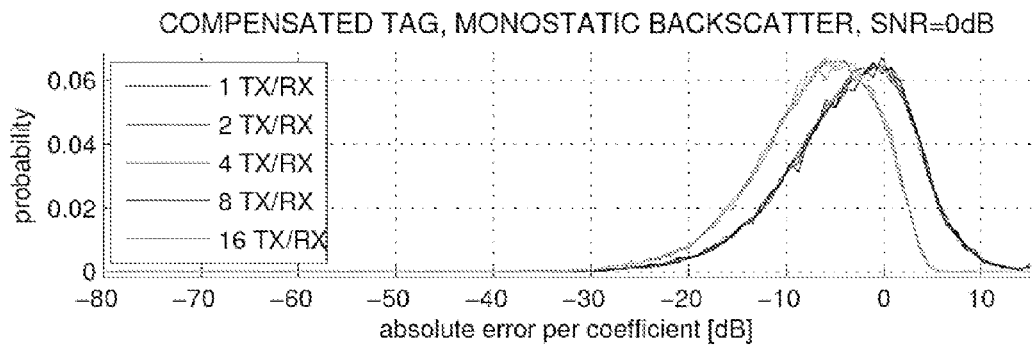
Figure 25D:
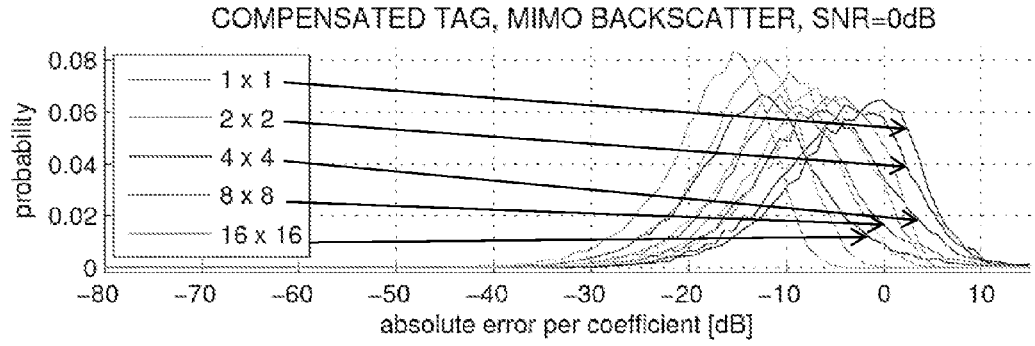

Resulting residual errors for solving equation 3.5 and equation 3.6 for independent and identically distributed (i.i.d.) circulant symmetric Gaussian noise V are provided in FIGS. 24A and 24B. Note that the multiplicative structure of the backscatter channel gains $c_l c_n$ creates a ±180° ambiguity that cannot be resolved ($c_l c_n = (-c_l)(-c_n)$), i.e., the system of equations formed by Matrix 3.3 has two perfect solutions. The error curves in FIGS. 24A and 24B correspond to a desired solution. In the context of wireless power transfer, the ambiguity due to the multiplicative structure of the backscatter channel gains can be resolved by simply testing both solutions and selecting the solution that maximizes/minimizes the power. For example, the incident power level at the mobile device is determined by the single-channel gains $c_1$, not by $c_l c_n$, and is sensitive to the phase shift. That is, only one solution will maximize/minimize the power.

Referring to FIGS. 24A and 24B, the plots show that it is possible to determine the individual channel gains from the MIMO backscatter gains. The remaining error is roughly in the order of the SNR. Adding more base stations does not change the error distribution for monostatic (non-MIMO) case, since this systems solves L equations for L variables, and adding a new base station also adds new channel gains. For the MIMO system ($L^2$ equations for L variables), adding base stations decreases the error; there is a 3 dB gain for doubling the number of transceivers.

The effect of the noise gain when using estimated backscatter gains is apparent in FIGS. 25A-25D, which illustrate the residual coefficient error for solving Equation 3.7 with perfect knowledge of the backscatter gain, $\rho_{ln} = \hat{\rho}_{ln}$. Backscatter gains in this simulation are modeled by i.i.d. random variables with uniform magnitude $|\rho_{ln}| < 1$ and uniform phase. The median performance loss compared to ideal backscattering is 4 dB under those assumptions. This value increases with decreasing backscatter gain magnitude due to the noise gain effect. Other than that, the decorrelation with perfectly known backscatter gains shows the same performance characteristics as for the ideal backscatter device.

To illustrate a transceiver system for transferring energy to a backscatter device, an 8×8 wideband MIMO system was deployed and backscatter channels were generated by concatenating the measured forward- and return-link channels and adding different backscatter responses. The backscatter device characteristics were taken from prior measurements of backscatter devices.

FIGS. 27-31 provide a comparison of the power optimization results based on power measurements provided by a mobile device (single-channel) and remote power optimization (backscatter channel for measured data). The experiments assume a linear backscatter device (e.g., a semi-passive or battery assisted passive backscatter device).

Figure 27A:
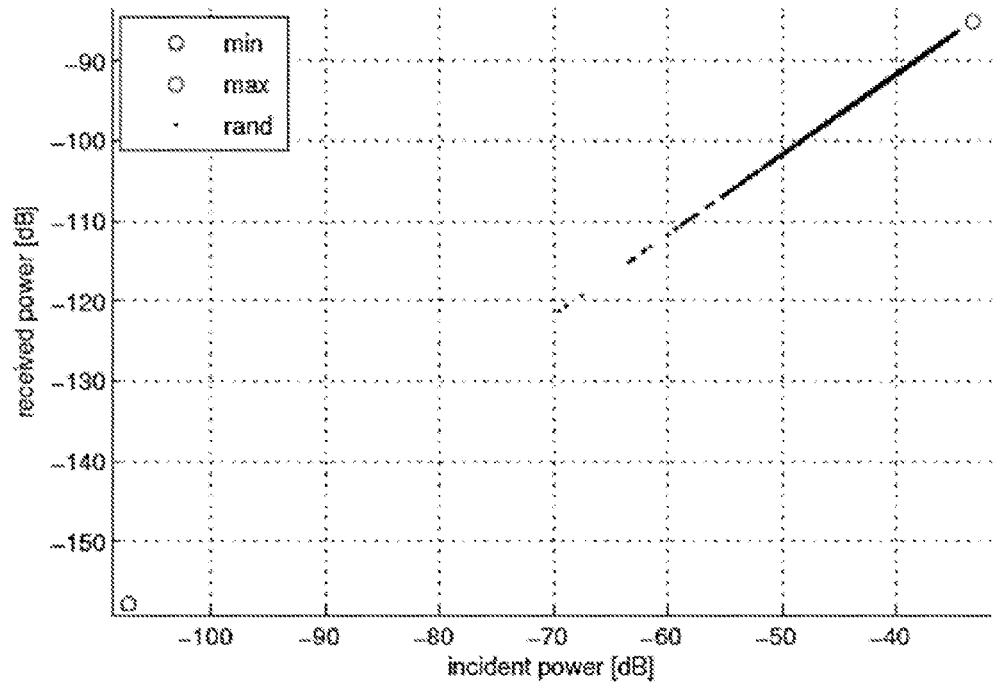
FIGS. 27A and 27B illustrate the joint distribution of the power level, $P_{AV}$, measured at a mobile device (single position) and the received backscatter power level $P_{RX}$ for a realistic UHF RFID tag, respectively.
Figure 27B:
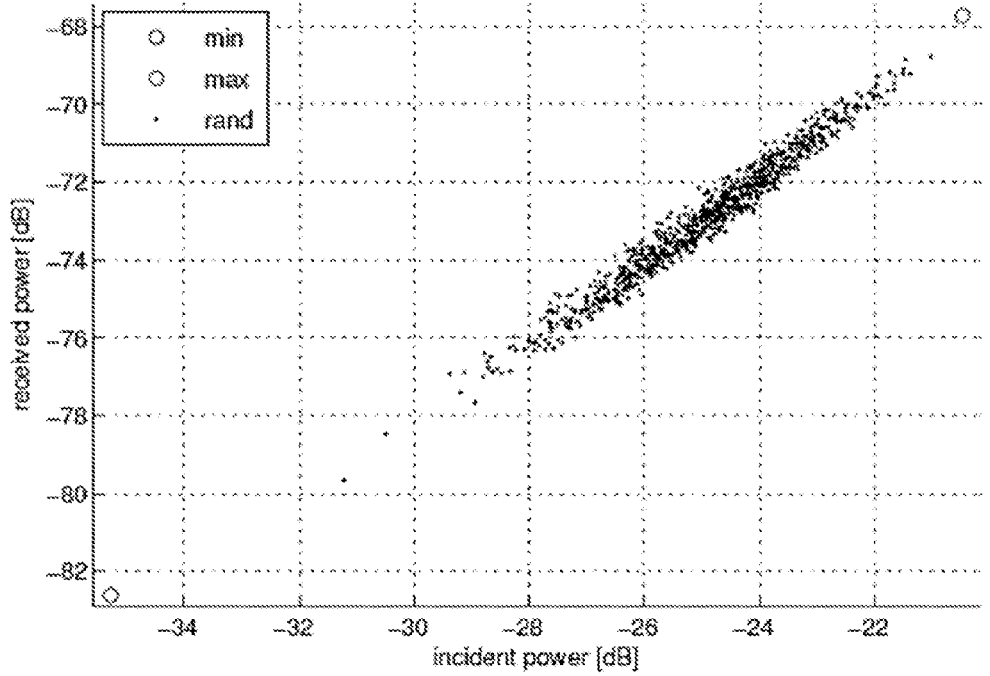

FIGS. 27A and 27B illustrate the joint distribution of the power level, $P_{AV}$, measured at a mobile device (single position) and the received backscatter power level $P_{RX}$ for a realistic UHF RFID tag, respectively. The plots present a scenario of an unknown linear backscatter device and provide a comparison of measured available narrowband power level $P_{AV}$ vs. 8×8 MIMO received backscatter power level $P_{RX}$ for 103 random transmitter magnitudes/phases. Optimized settings have been calculated for $P_{AV}$ and $P_{RX}$ independently. FIG. 27A shows a single position while FIG. 27B shows a region with a diameter of 98 cm.

Figure 28A:
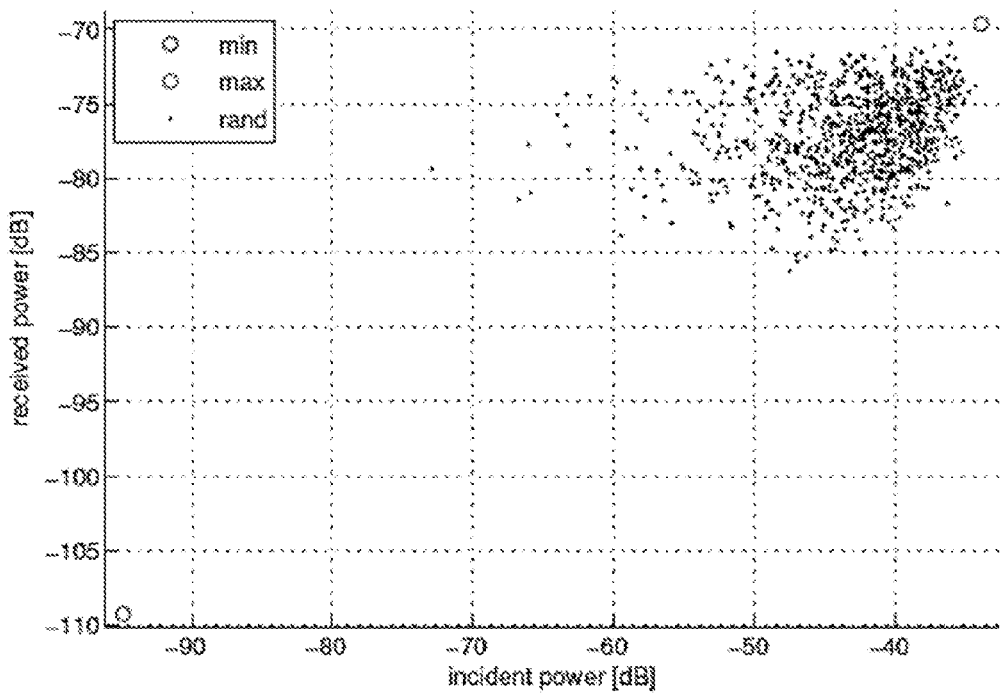
FIGS. 28A and 28B illustrate the joint distribution of the power level, $P_{AV}$, measured at the mobile device (single position) and the received backscatter power level $P_{RX}$ for a random (worst-case) backscatter device.
Figure 28B:
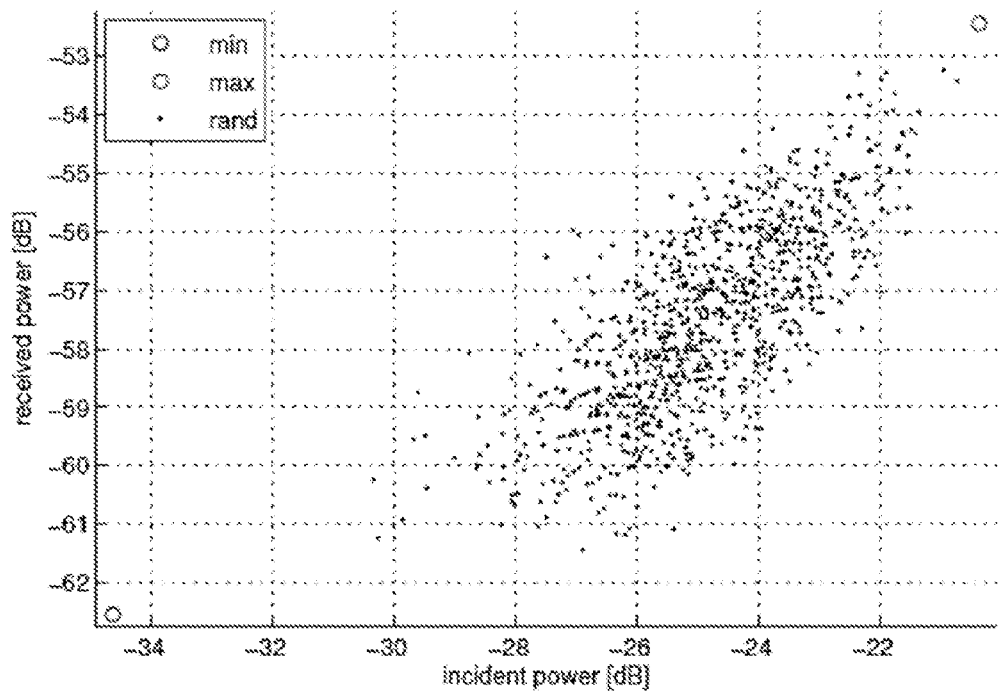

FIGS. 28A and 28B illustrate the joint distribution of the power level, $P_{AV}$, measured at the mobile device (single position) and the received backscatter power level $P_{RX}$ for a random (worst-case) backscatter device. The plots present a scenario for an unknown i.i.d. uniform (worst-case) linear backscatter device and provide a comparison of measured available narrowband power level $P_{AV}$ vs. 8×8 MIMO received backscatter power level $P_{RX}$ for 103 random transmitter magnitudes/phases. Optimized settings have been calculated for $P_{AV}$ and $P_{RX}$ independently. FIG. 28A shows a single position while FIG. 28B shows a region with a diameter of 98 cm.

Figure 26A:
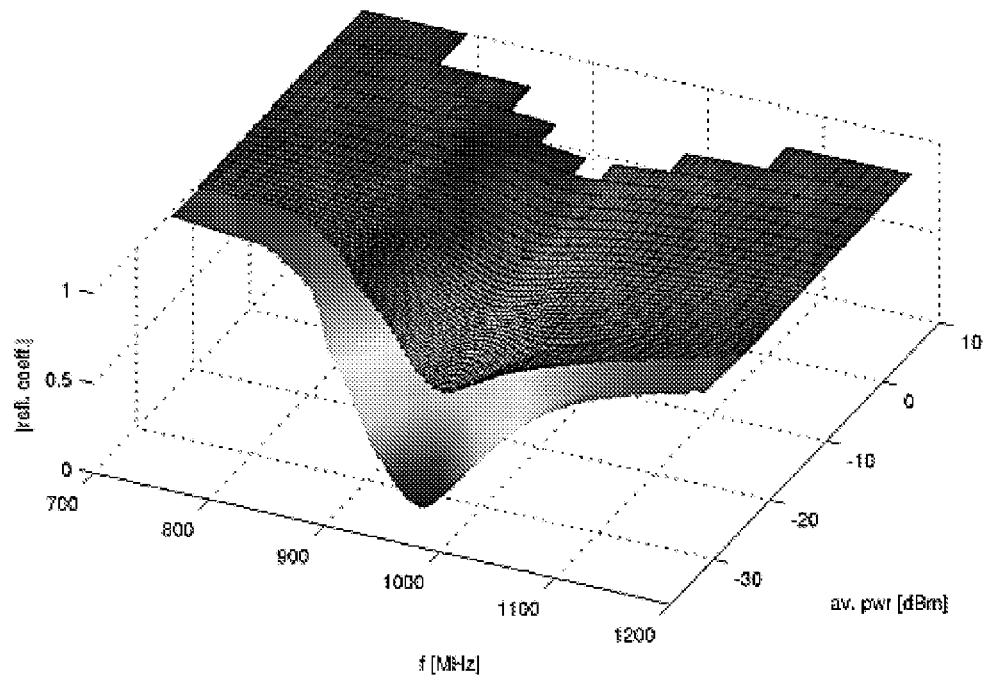
FIGS. 26A and 26B illustrate backscatter device characteristics for a nonlinear (passive) and linear (battery assisted passive), respectively.
Figure 26B:
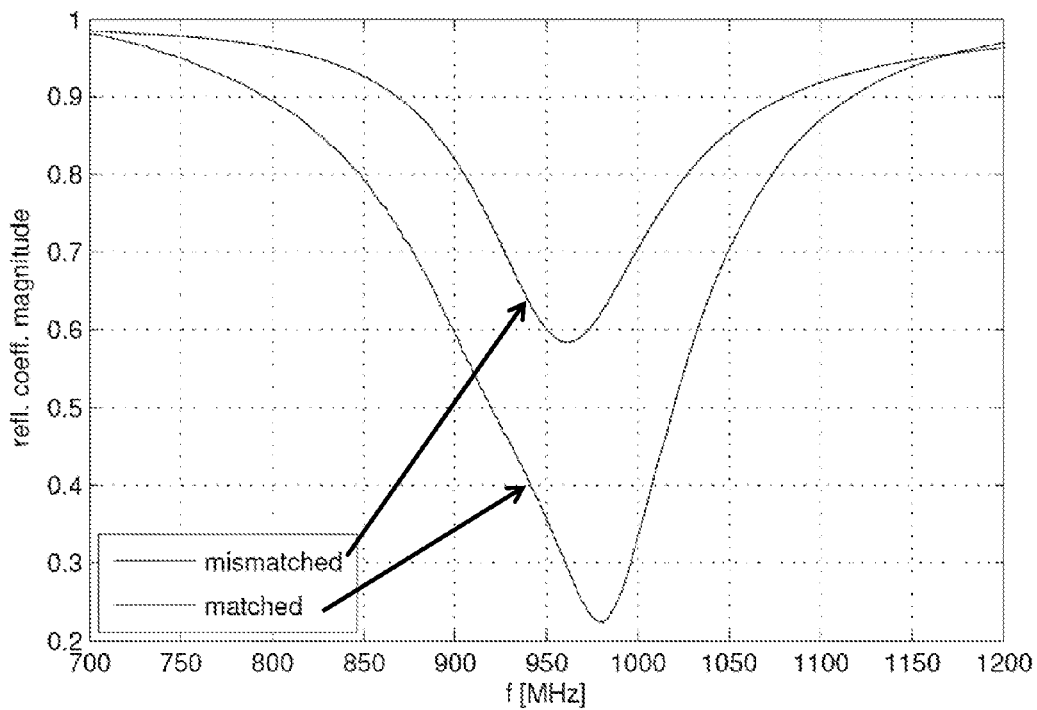

The characteristics of a UHF RFID tag (realistic backscatter device) are shown in FIGS. 26A and 26B. The characteristics for this transponder (the UHF RFID tag) were taken from the PARIS framework (The PARIS Simulation Framework. Graz University of Technology/NXP Semiconductors. Open-Source (GNU GPL v3). The characteristics were created from measurements of a (semi-)passive UHF RFID tag introduced by NXP around 2007 and thus represent a realistic backscatter device. Linearization has been done by selecting the reflection coefficients at the tag's power threshold.

Both the aforementioned UHF RFID tag (as an example of a realistic backscatter device) and the random (worst-case) backscatter devices are unknown to the MIMO system, i.e., there is no prior calibration knowledge. Minimized and maximized power levels have been calculated from $P_{RX}$ and $P_{AV}$ independently and added as 2-D point to these plots. Power levels clustering around a straight line in these plots indicate a linear dependency between $P_{AV}$ and $P_{RX}$ and ultimately mean that both power levels can be replaced in the optimization without changing the optimization result.

Apart from an ideal backscatter device, this desired behavior (linear dependency) can also be observed for the linear backscattering, as illustrated in FIGS. 27A and 27B. Since the power values for arbitrarily selected transmitter magnitude/phase settings form an almost perfect line, remote power optimization is equivalent to local power optimization for this type of device. The average power over a larger region shown in FIG. 27B shows some randomness. Nonetheless correlation between $P_{AV}$ and $P_{RX}$ is still extremely high. Consequently, remote- and local-power optimization can lead to the same result with realistic semi-passive/battery assisted passive backscatter devices.

Introducing a fully random "worst-case" backscatter device reduces the correlation between $P_{AV}$ and $P_{RX}$ drastically as illustrated in FIGS. 28A and 28B. The random linear backscatter device here represents a worst-case assumption for any linear backscatter device, i.e., the backscatter gains $\rho_{lmn,k}$ are i.i.d. uniformly distributed within the unit circle. It should be understood that the illustrated "worst-case" scenario is a theoretical absolute worst-case scenario that is not expected to be reached in reality. Although the backscatter channel gains display maximized randomness, the optimization based on $P_{RX}$ still works. This is because the joint distribution of $P_{AV}$ and $P_{RX}$ narrows down at the extreme values of the power levels, in particular for the maximum.

The joint distribution illustrated in FIG. 28A, for example, has a triangular structure towards high power levels, with the maximum power being at the tip. This means that power maximization based on $P_{AV}$ and maximization based on $P_{RX}$ both lead to virtually identical results, as proven by the maximum power marker in the plot of FIG. 28A. This is, on the other hand, not completely the case for power minimization. Here, local optima are present, which are influenced by the random backscatter device such that the global optimum changes its position. Nonetheless the minimization of $P_{RX}$ still leads to a very good result despite the fact that the global minima of $P_{RX}$ and $P_{AV}$ are not identical under these conditions. Once again, it should be noted that this is under unrealistic worst-case assumptions for the backscatter gain.

Figure 29A:
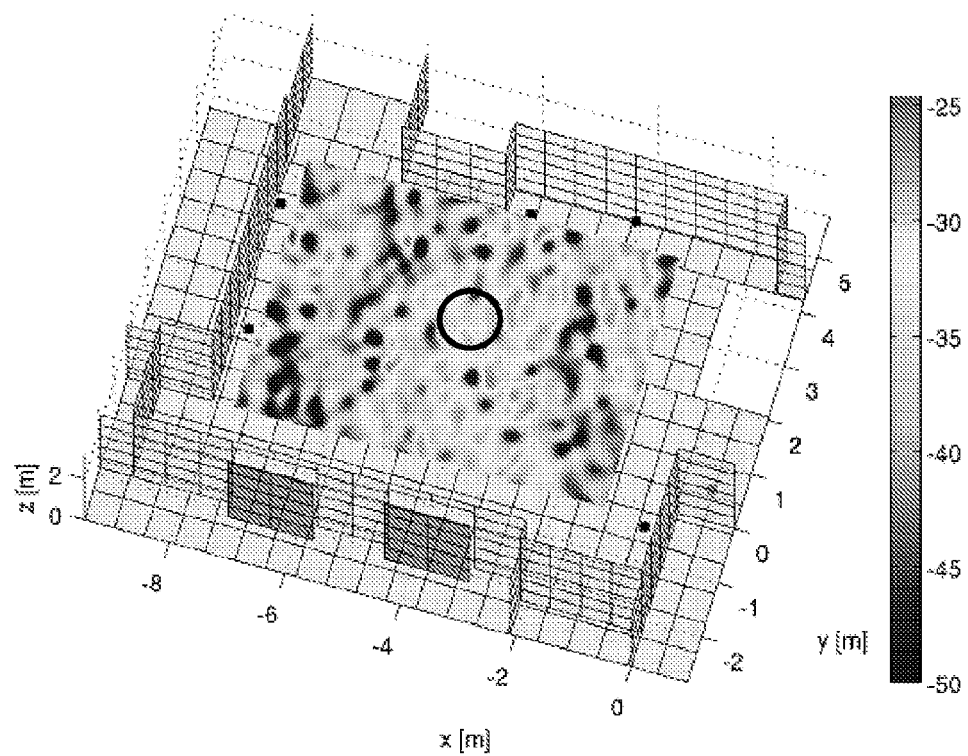
FIGS. 29A and 29B illustrate measured power distribution for an unknown linear backscatter device when maximizing the power within the marked area; providing a comparison between single-channel and 8×8 MIMO backscatter channel based optimization (bandwidth: 2 MHz, diameter of optimized region: 98 cm).
Figure 29B:
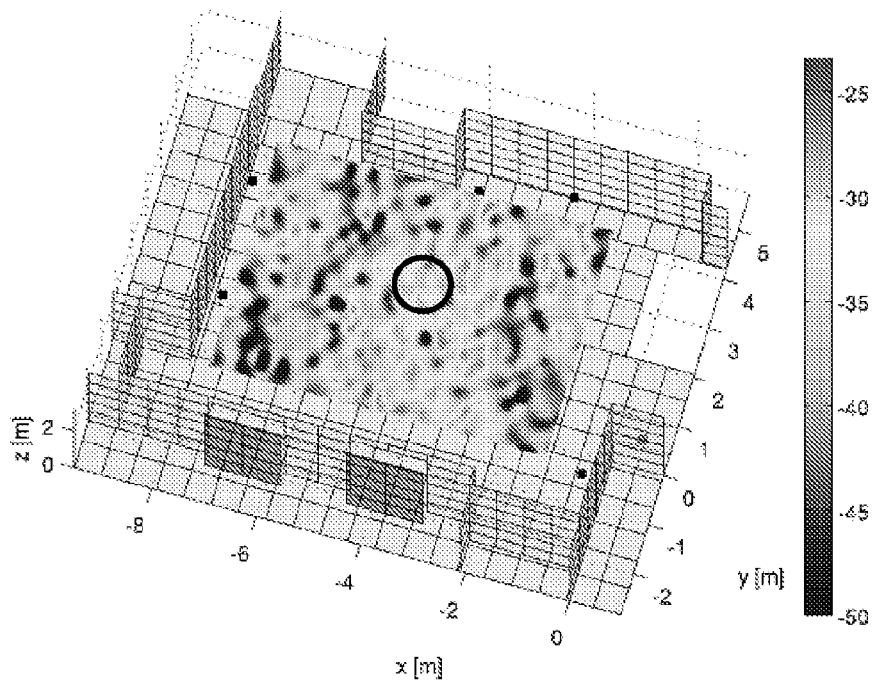
Figure 30A:
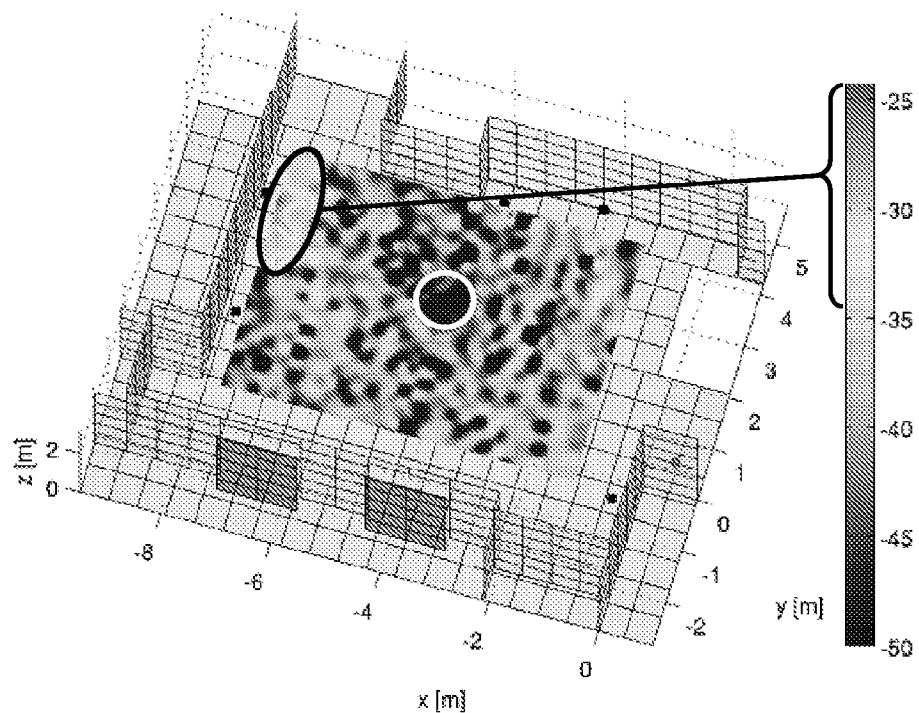
FIGS. 30A and 30B illustrate measured power distribution for an unknown linear backscatter device when minimizing the power within the marked area; comparison between single-channel and 8×8 MIMO backscatter channel based optimization (bandwidth: 2 MHz, diameter of optimized region: 98 cm).
Figure 30B:
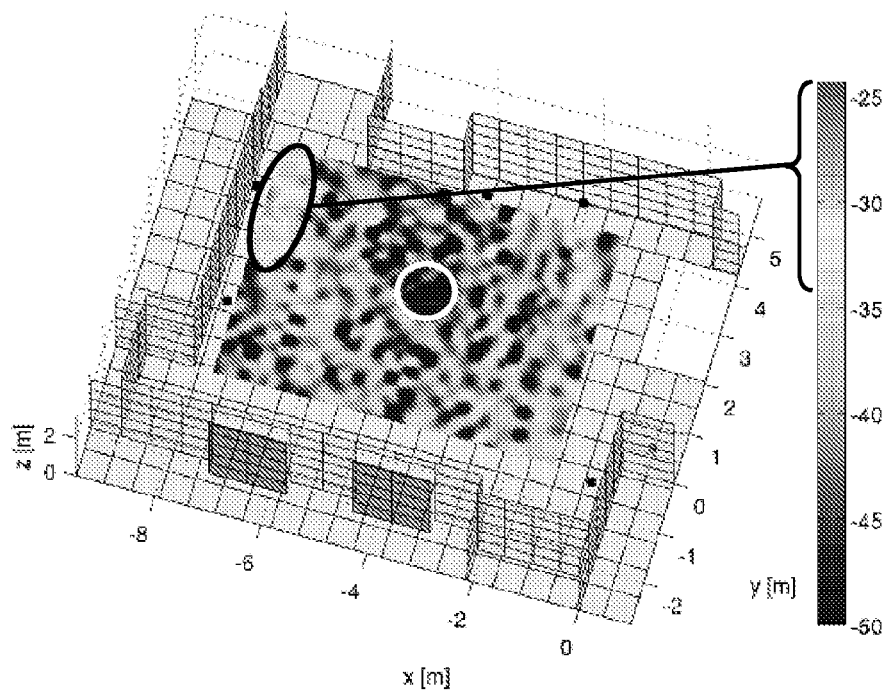
Figure 31A:
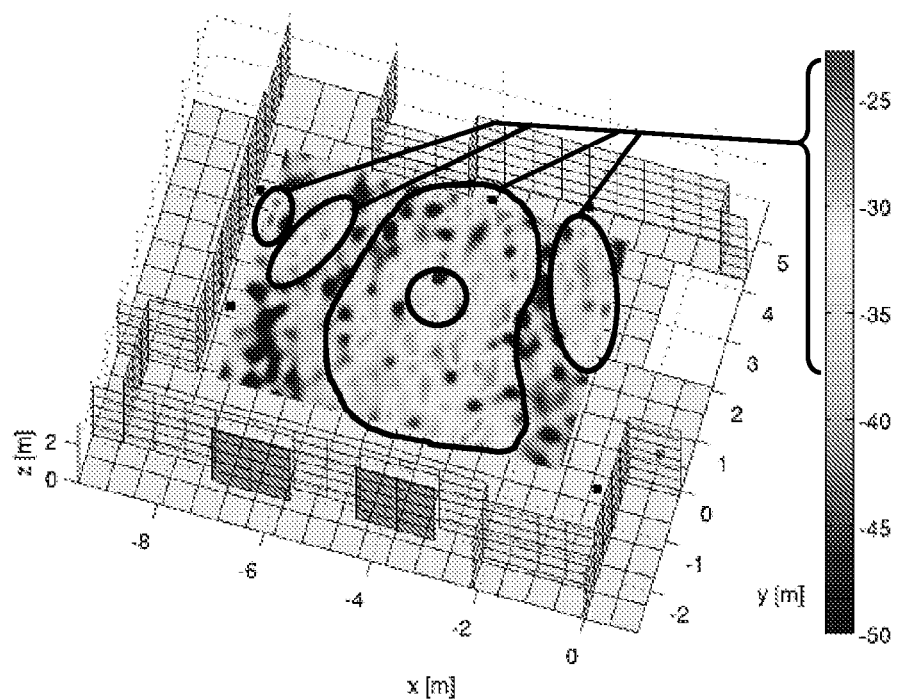
FIGS. 31A and 31B illustrate measured power distribution for an unknown i.i.d. uniform (worst-case) linear backscatter device when maximizing the power within the marked area; 8×8 MIMO backscatter channel based optimization (bandwidth: 2 MHz, diameter of optimized region: 100 cm).
Figure 31B:
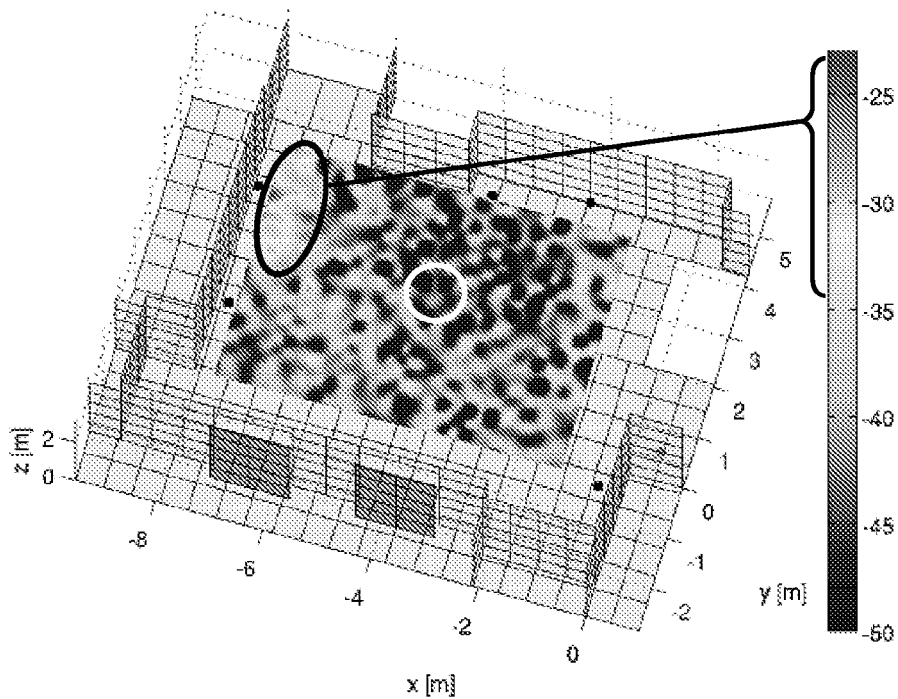

Power distributions over the entire measurement area are shown in FIGS. 29-30 for optimized transmitter settings, comparing the global results for optimization based on $P_{RX}$ and $P_{AV}$. The assumed backscatter device in this example is a linearized UHF RFID tag with characteristics according to FIGS. 26A and 26B. Note that the results are almost identical, (i.e., optimization based on $P_{RX}$ without actual knowledge of the incident power level $P_{AV}$ leads to virtually the same results as optimization based on the incident power level directly).

This is also the case for power maximization with the worst-case linear backscatter device (i.i.d. uniform random reflection). The associated power distributions can be found in FIGS. 31A and 31B. Comparing these power levels to FIGS. 29A and 30A, it can be seen that the maximization leads to a very similar result even for this unrealistic worst-case. Also the power minimization leads to a good, albeit not perfect, result; the incident power level is minimized, but does not reach its global minimum.

Figure 32B:
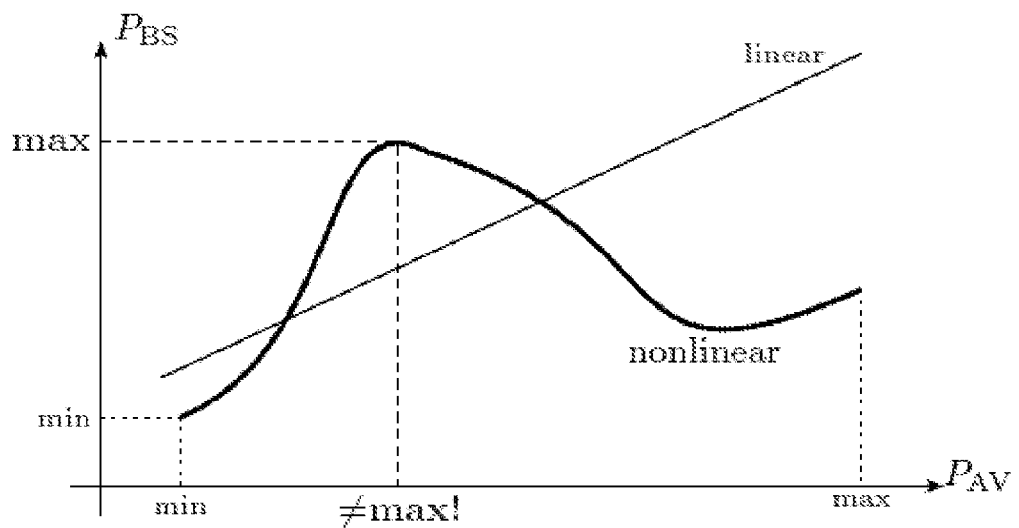

Nonlinear backscatter devices represent a particularly challenging scenario for the remote power optimization. With respect to the power optimization there are three categories of nonlinearities that may be considered. The first is monotonically increasing backscatter power, i.e., $\partial P_{BS}/\partial P_{AV} > 0$. The second is not monotonically increasing, but preserving the extreme values of $P_{BS}$ and $P_{AV}$ (FIG. 32A); and the third is not monotonically increasing and the extreme values of $P_{BS}$ and $P_{AV}$ are not preserved (FIG. 32B).

In the first case, the optimization method for linear devices will work, including deterministic (gradient descent) optimization algorithms. This is because any strictly monotonic function will preserve the extreme values, i.e., the extreme values of $P_{RX}$ and $P_{AV}$ coincide. The second case is already harder to deal with. The local optima created by the nonlinearity will disrupt any deterministic optimization, such as gradient descent algorithms. A slight modification of the receiver combination function increases the robustness in these cases dramatically. With the modified function, the transmitter amplitudes and phases are also applied at the receivers. This modification increases the gradient $\partial P_{RX}/\partial P_{AV}$ relative to $\partial P_{BS}/\partial P_{AV}$ and thus can result in monotonically increasing $P_{RX}$ even if $P_{BS}$ is constant.

Figure 33:
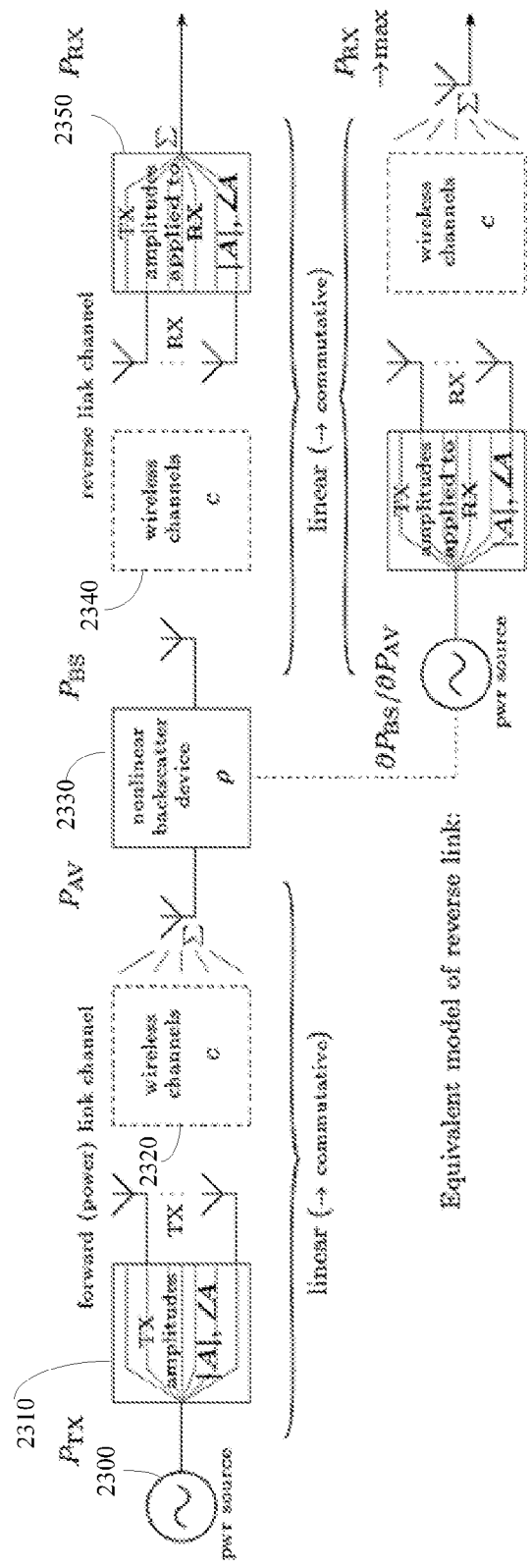
FIG. 33 illustrates a block diagram representation of an energy transfer system.

FIG. 33 illustrates a block diagram representation of an energy transfer system. A power source 2300 provides a signal ($P_{TX}$) that is transmitted via transmitters 2310 over wireless channels 2320 to a non-linear backscatter device 2330. The signal $P_{TX}$ is provided through optimized transmitters over a forward (power) link channel where each transmitter is optimized with a corresponding amplitude and phase. At the backscatter device 2330, the incident energy from the signal transmitted by the transmitters 2310 is combined as $P_{AV}$.

Assume for now that the backscatter power is constant for all incident power levels and thus violates the monotony assumption (and a constant backscatter power does not convey any information about the incident power level). The backscattered signal ($P_{BS}$) propagates through the reverse link channel 2340 to be picked up by the receivers 2350. The receivers 2350 can have the transmitter amplitudes and phases applied. Accordingly, applying $|A|$ and $\angle A$ (which is applied at the transmitter side) on the receive side "mirrors" the forward (power) link channel on the reverse link. On the transmitter side, $|A|$ and $\angle A$ distribute the power delivered by the power source over multiple transmitters and channels and thus enable maximization or minimization of the incident power level $P_{AV}$ even though the power source delivers constant amounts of power.

Since the reverse link is now identical to the forward link, the same reasoning can be applied to this side of the backscatter channel: the backscatter power level $P_1$ is maximized/minimized by the same settings that maximized/minimized $P_{AV}$ even if the backscatter power is constant. If the "upwards tilt" of $\partial P_{RX}/\partial P_{AV}$ provided by this modification causes $P_{RX}$ to be monotonically increasing with $P_{AV}$ even though $P_{BS}$ is not, the algorithms for linear backscatter devices again apply. If $P_{RX}$ is not monotonically increasing despite the modified combination function, algorithms that find the global optimum (stochastic algorithms) can be used.

Figure 34A:
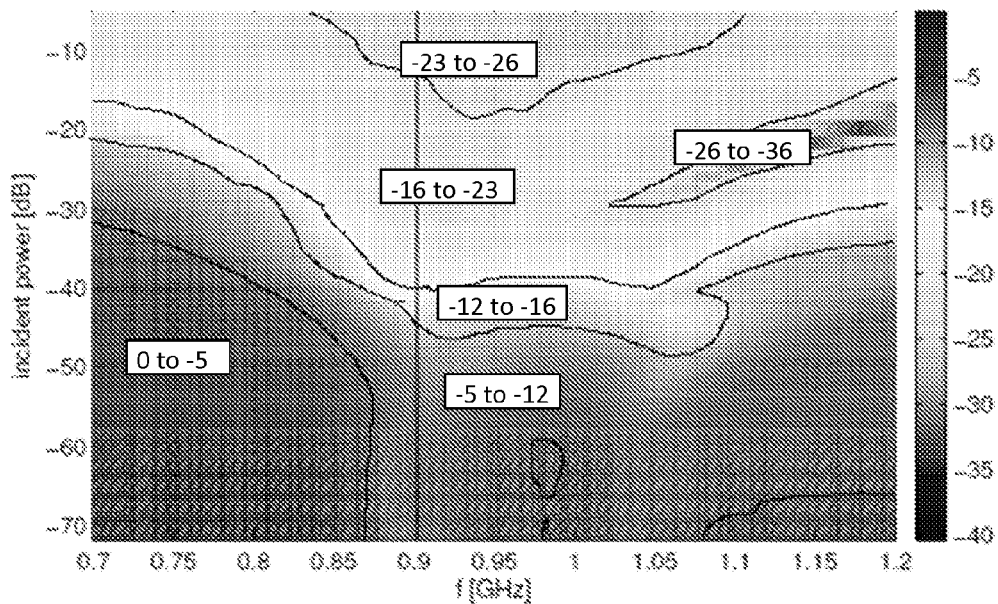
FIGS. 34A and 34B illustrate backscatter characteristics and power levels for an unknown nonlinear backscatter device (bandwidth: 2 MHz, diameter of optimized region: 20 cm; 103 random transmitter magnitudes/phases).
Figure 34B:
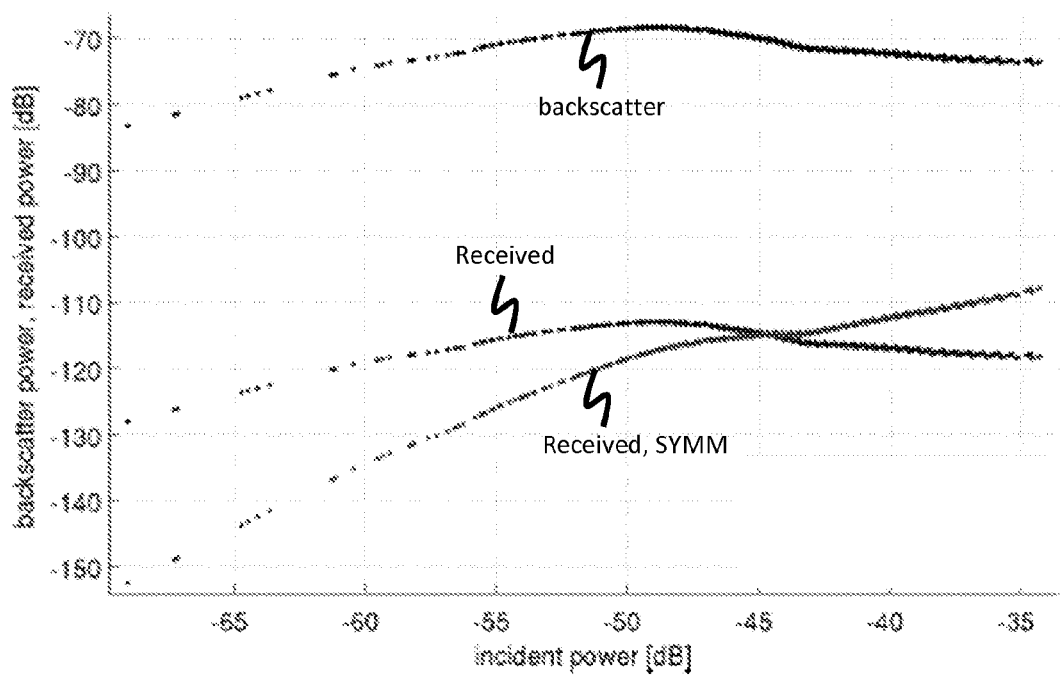

The third case, i.e., a non-monotonic nonlinearity that does not preserve the extreme values, can be the most difficult to deal with. If the extreme values of $P_{RX}$ and $P_{AV}$ (global optima) are preserved for the modified receiver combination function, then global optimization based on $P_{RX}$ will again yield the desired result. Moreover, if the increased power gradient is sufficient to make the function strictly monotonic again, also deterministic optimization algorithms will converge to this result. This is the case for the results presented in FIG. 34B. FIGS. 34A and 34B illustrate backscatter characteristics and power levels for an unknown nonlinear backscatter device. The nonlinearity in this case has once again been derived from the measured UHF RFID tag characteristic shown in FIG. 26B. It thus represents one of the nonlinearities remote power optimization might have to face.

Notably, the resulting backscatter power level (matched) in FIG. 34B is non-monotonic and did not preserve the extreme values (maximum of $P_{AV}$ does not coincide with maximum of $P_{BS}$). Without the receiver-side modifications, $P_{BS}$ (black) and $P_{RX}$ (blue) are parallel due to the linearity of the wireless channels. Applying the modified receiver combination function results in a significant increase of $\partial P_{RX}/\partial P_{AV}$ (red curve) and thus in a significant "upwards tilt" of the curve. The resulting overall nonlinearity is even strictly monotonic, so deterministic optimization works.

Software code and algorithms described herein can be stored on one or more storage media, which may include any device or medium that can store code and/or data for use by a computer or other processing system. When a computer system reads and executes the code and/or data stored on a storage medium, the computer system performs the methods and processes embodied as data structures and code stored within the storage medium.

Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal.

For the purposes of promoting an understanding of the principles of the present disclosure, reference will now be made to certain embodiments of the invention and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e. at least one) of the grammatical object of the article. By way of example, "an element" means at least one element and can include more than one element.

Unless otherwise defined, all technical terms used herein have the same meaning as commonly understood by one of ordinary skill in the art to which this disclosure belongs.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

Any patents or publications mentioned in this specification are indicative of the levels of those skilled in the art to which the invention pertains. These patents and publications are herein incorporated by reference to the same extent as if each individual publication was specifically and individually indicated to be incorporated by reference.

It should be understood that the examples and embodiments described herein are for illustrative purposes only and that various modifications or changes in light thereof will be suggested to persons skilled in the art and are to be included within the spirit and purview of this application. One skilled in the art will readily appreciate that the present invention is well adapted to carry out the objects and obtain the ends and advantages mentioned, as well as those inherent therein. The present examples along with the methods described herein are presently representative of preferred embodiments, are exemplary, and are not intended as limitations on the scope of the invention. Changes therein and other uses will occur to those skilled in the art which are encompassed within the spirit of the invention as defined by the scope of the claims.

What is claimed is:

1. A subscription based MIMO radio-frequency energy transfer system, comprising:
one or more storage media having instructions stored thereon at least directing the system to:
determine a presence of one or more devices in an area, wherein the one or more devices derive at least part of their operating energy from incident radio-frequency energy;
verify that the one or more devices are subscribed devices; and
transfer radio-frequency energy to the one or more subscribed devices according to a power level representing radio-frequency energy incident upon the subscribed devices;
a plurality of transmitters;
a transmitter controller for controlling the plurality of transmitters, the transmitter controller configured to adjust an amplitude and phase of each transmitter of the plurality of transmitters for transferring the energy to the subscribed devices; and
a plurality of receivers and a receiver processor configured to at least combine signals from the plurality of receivers.

2. The system of claim 1, wherein the plurality of transmitters are spatially dispersed around the area.

3. The system of claim 2, wherein the one or more devices comprise at least two devices independently moving within and out of the area.

4. The system of claim 1, wherein the transmitter controller is further configured to select a subset of the plurality of transmitters to transfer the energy to the subscribed devices, the subset selected according to radio-frequency channel information of the subscribed devices.

5. The system of claim 4, wherein the subset of the plurality of transmitters comprise at least two transmitters with a maximum channel gain to the subscribed devices.

6. The system of claim 1, wherein the one or more storage media have instructions stored thereon at least directing the system to further:
determine an optimized set of transmitter amplitudes (|A|) and phases (∠A) using information about the power level received from the subscribed devices, the optimized set being used by the transmitter controller to adjust the amplitude and phase of the plurality of transmitters.

7. The system of claim 1, wherein the one or more storage media have instructions stored thereon at least directing the system to further:
determine an optimized set of transmitter amplitudes (|A|) and phases (∠A) using information about the power level obtained from a backscatter signal of the subscribed devices received from the plurality of receivers, the optimized set being used by the transmitter controller to adjust the amplitude and phase of the plurality of transmitters.

8. The system of claim 7, wherein using the information about the power level obtained from the backscatter signal of the subscribed devices received from the plurality of receivers comprises:
optimizing a receiver power level representing energy of the backscatter signal of each of the subscribed devices incident upon the plurality of receivers.

9. The system of claim 7, wherein using the information about the power level obtained from the backscatter signal of the subscribed devices received from the plurality of receivers comprises:
generating a backscatter gain matrix from the backscatter signal of each of the subscribed devices received from the plurality of receivers;
performing a decomposition of the backscatter gain matrix to generate an autocovariance matrix, and
solving the autocovariance matrix for channel gain and phase.

10. The system of claim 1, wherein in response to a plurality of subscribed devices being determined to be in the area, the system maximizes the total energy transferred to all the subscribed devices.

11. The system of claim 10, wherein each device is assigned a designated frequency range at which the energy is transferred.

12. The system of claim 1, wherein the one or more storage media have instructions stored thereon at least directing the system to further identify a blocked device in the area and actively deny power to the blocked device, wherein the transmitter controller is further configured to adjust amplitudes and phases of the plurality of transmitters to minimize energy incident upon the blocked device.

13. The system of claim 1, wherein the radio-frequency energy is transferred to at least one subscribed device of the one or more subscribed devices at a first frequency, the transmitter controller being further configured to adjust amplitudes and phases of the plurality of transmitters to minimize energy incident upon the at least one subscribed device at a second frequency while maximizing energy incident the at least one subscribed device at the first frequency.

14. The system of claim 13, wherein the second frequency is a frequency in a communication frequency range of the at least one subscribed device.

15. The system of claim 1, wherein the radio-frequency energy is transferred to at least one subscribed device of the one or more subscribed devices such that maximum available energy is transmitted to each of a plurality of antennas of the at least one subscribed device.

16. The system of claim 1, wherein the radio-frequency energy is transferred to the subscribed devices such that maximum available energy is transmitted to at least one subscribed device of the one or more subscribed devices and an area extending a distance around the at least one subscribed device.

17. One or more storage media having instructions stored thereon for performing a method of subscription based MIMO radio-frequency energy transfer comprising:
   determining a presence of a device in an area;
   verifying that the device is a subscribed device; and
   transferring radio-frequency energy from a MIMO system to the subscribed device according to a power level representing radio-frequency energy incident the subscribed device wherein the power level is determined by the system by:
   analyzing backscatter signals received by a plurality of receivers associated with the MIMO system to generate a backscatter gain matrix; and
   performing channel decorrelation of the backscatter gain matrix to obtain a total power level ($P_{Avm}$).

18. The one or more storage media of claim 17, wherein the power level is the total power level ($P_{Avm}$) given by $$\sum_{k=1}^{K} \left| \sum_{l=1}^{L} |a_{l,k}| e^{j\angle a_{l,k}} c_{lm,k} \right|^2,$$

where M is a number of mobile devices or device locations receiving energy, m represents each mobile device or device location (1, . . . , M), L is a number of transmitters in the MIMO system, l represents each transmitter (1, . . . , L), K is a number of frequency components, k represents each frequency component (1, . . . , K), $a_{l,k}$ is the amplitude of a signal transmitted from transmitter l at frequency k and $\angle a_{l,k}$ is its phase, $c_{lm,k}$ is channel gain between transmitter l and mobile device m.

19. The one or more storage media of claim 18, wherein the channel gain $c_{lm,k}$ is received from the mobile device m.

20. The one or more storage media of claim 18, wherein a carrier amplitude and phase $|a_{l,k}|e^{j\angle a_{l,k}}c_{lm,k}$ is received from the mobile device m.

21. The one or more storage media of claim 18, wherein a power per frequency component $$\left| \sum_{l=1}^{L} |a_{l,k}| e^{j\angle a_{l,k}} c_{lm,k} \right|^2$$

is received from the mobile device m.

22. The one or more storage media of claim 18, wherein the total power level is received from the mobile device m.

23. One or more storage media having instructions stored thereon for performing a method of subscription based MIMO radio-frequency energy transfer comprising:
   determining a presence of a device in an area;
   verifying that the device is a subscribed device; and
   transferring radio-frequency energy from a MIMO system to the subscribed device according to a power level representing radio-frequency energy incident the subscribed device, wherein the power level is given by:

$$P_{RXlmn,k} = \left| \sum_{l=1}^{L} |a_{l,k}| e^{j\angle a_{l,k}} c_{lm,k} \rho_{lmn,k} c_{mn,k} \right|^2$$

where $P_{RXlmn,k}$ is a received power level at receiver n of 1, . . . , N receivers of the MIMO system, M is a number of mobile devices or device locations receiving energy, m represents each mobile device or device location (1, . . . , M), L is a number of transmitters of the MIMO system, l represents each transmitter (1, . . . , L), K is a number of frequency components, k represents each frequency component (1, . . . , K), $a_{l,k}$ is the amplitude of a signal transmitted from transmitter l at frequency k and $\angle a_{l,k}$ is its phase, $c_{lm,k}$ is channel gain between transmitter l and mobile device m, $c_{ln,k}$ is channel gain between mobile device m and receiver n, and $\rho_{lmn,k}$ is a differential reflection coefficient of the signal transmitted from transmitter l at frequency k to the mobile device m.

24. A method of subscription based MIMO wireless energy transfer, the method comprising:
   determining a presence of a mobile device wherein the mobile device derives at least part of its operating energy from incident wireless energy;
   determining whether the mobile device is a subscriber or a blocked device;
   in response to a determination that the mobile device is the subscriber, optimizing a gain and phase of a plurality of transmitters to enable maximum energy transfer to the mobile device;
   in response to a determination that the mobile device is the blocked device, optimizing a gain and phase of a plurality of transmitters to enable minimum possible energy transfer to the mobile device;
   determining whether a backscatter gain or an estimated backscatter gain of the mobile device is available to the MIMO system;
   generating a channel gain matrix from backscatter signals received by the MIMO system;
   decorrelating the channel gain matrix using the backscatter gain or the estimated backscatter gain to determine the power level; and
   using the power level to optimize the gain and phase of the plurality of transmitters.

25. The method of claim 24, further comprising:
in response to receiving a power level signal from the mobile device, using the power level signal to optimize the gain and phase of the plurality of transmitters.

26. The method of claim 24, further comprising:
determining a received power level from backscatter signals received by receivers of the MIMO system; and
using the received power level to optimize the gain and phase of the plurality of transmitters.

27. The method of claim 24, wherein optimizing the gain and phase of the plurality of transmitters comprises solving a maximum or a minimum of a cost function with constraints on amplitude normalization, magnitude of the amplitude, and the phase.

28. The method of claim 27, wherein the cost function comprises a combination function such as minimizing peak power, minimizing average power, maximizing average power, or minimizing minimum power, subject to constraints derived at least in part from an economic aspect of the subscription.

* * * * *